(12) United States Patent
Hadden

(10) Patent No.: US 12,435,067 B2
(45) Date of Patent: Oct. 7, 2025

(54) TRUNCATED ITRACONAZOLE ANALOGUES AND METHODS OF USE THEREOF

(71) Applicant: University of Connecticut, Farmington, CT (US)

(72) Inventor: Matthew Kyle Hadden, Ellington, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 810 days.

(21) Appl. No.: 17/633,679

(22) PCT Filed: Aug. 7, 2020

(86) PCT No.: PCT/US2020/045341
§ 371 (c)(1),
(2) Date: Feb. 8, 2022

(87) PCT Pub. No.: WO2021/030174
PCT Pub. Date: Feb. 18, 2021

(65) Prior Publication Data
US 2022/0324849 A1    Oct. 13, 2022

Related U.S. Application Data

(60) Provisional application No. 62/884,988, filed on Aug. 9, 2019.

(51) Int. Cl.
C07D 405/12    (2006.01)
A61P 35/00     (2006.01)
C07D 317/22    (2006.01)

(52) U.S. Cl.
CPC ............ *C07D 405/12* (2013.01); *A61P 35/00* (2018.01); *C07D 317/22* (2013.01)

(58) Field of Classification Search
CPC ...... C07D 405/12; C07D 317/22; A61P 35/00
See application file for complete search history.

(56) References Cited

U.S. PATENT DOCUMENTS

| | | | |
|---|---|---|---|
| 4,456,605 A | 6/1984 | Heeres et al. | |
| 4,619,931 A | 10/1986 | Heeres et al. | |
| 4,791,111 A | 12/1988 | Heeres et al. | |
| 5,075,309 A | 12/1991 | Heeres et al. | |
| 5,693,626 A | 12/1997 | Saksena et al. | |
| 6,384,030 B1 | 5/2002 | Meerpoel et al. | |
| 6,881,745 B2 | 4/2005 | Hayes et al. | |
| 7,732,450 B2 * | 6/2010 | Whitefield | A61K 47/14 514/254.07 |
| 8,771,739 B2 | 7/2014 | Hayes et al. | |
| 8,921,374 B2 | 12/2014 | Mudge et al. | |
| 9,211,286 B2 * | 12/2015 | Borgman | A61K 31/4196 |
| 9,650,365 B2 | 5/2017 | Hadden et al. | |
| 9,839,636 B2 | 12/2017 | Hadden et al. | |
| 2009/0203713 A1 | 8/2009 | Beachy et al. | |
| 2012/0283194 A1 | 11/2012 | Atwood et al. | |
| 2016/0340346 A1 | 11/2016 | Hadden et al. | |
| 2017/0209436 A1 | 7/2017 | Hadden et al. | |
| 2020/0317649 A1 | 10/2020 | Hadden | |

FOREIGN PATENT DOCUMENTS

| | | | |
|---|---|---|---|
| CN | 109305963 A * | 2/2019 | ........... C07D 405/06 |
| EP | 0625899 | 11/1994 | |
| EP | 1886695 A1 | 2/2008 | |
| WO | 9315719 A1 | 8/1993 | |
| WO | 2009110955 A2 | 9/2009 | |
| WO | 2013036866 A1 | 3/2013 | |
| WO | 2015116947 A1 | 8/2015 | |
| WO | 2016094570 A1 | 6/2016 | |
| WO | 2018178338 A1 | 10/2018 | |
| WO | 2019040363 A1 | 2/2019 | |

OTHER PUBLICATIONS

Pyrgaki et al, Stereoselective Determination of the epimer mixtures of itraconazole in human blood plasma using HPLC and fluorescence detection, Chirality, 23: 495-503, 2011 (Year: 2011).*
CN 109305963 English Translation (Year: 2019).*
Skoda Bosnian Journal of Basic Medical Sciences, 2018 (Year: 2018).*
Blackadar, World Journal of Clinical Oncology, Feb. 10, 2016; 7(1): 54-86 (Year: 2016).*
The American Cancer Society, cancer.org, Can Acute Lymphocytic Leukemia Be Prevented?, https://web.archive.org/web/20241209175137/https://www.cancer.org/cancer/types/acute-lymphocytic-leukemia/causes-risks-prevention/prevention.html, Last updated Oct. 17, 2018 (Year: 2018).*

(Continued)

*Primary Examiner* — Andrew D Kosar
*Assistant Examiner* — Phillip Matthew Rzeczycki
(74) *Attorney, Agent, or Firm* — CANTOR COLBURN LLP

(57) ABSTRACT

Disclosed herein are analogues of itraconazole that are potent hedgehog signaling pathway inhibitors. The compounds are expected to be useful in the treatment of cell proliferation disorders such as cancer, particularly cancers that are dependent upon the hedgehog signaling pathway such as basal cell carcinoma and medulloblastoma.

15 Claims, 2 Drawing Sheets

(56) References Cited

OTHER PUBLICATIONS

The American Cancer Society, cancer.org, Can Hodgkin Lymphoma be Prevented?, https://web.archive.org/web/20231211145704/ https://www.cancer.org/cancer/types/hodgkin-lymphoma/causes-risks-prevention/prevention.html, Last updated May 1, 2018 (Year: 2018).*
Hassanpour, Journal of Cancer Research and Practice, 4, 2017, 127-129 (Year: 2017).*
Chen Mol Cancer Ther; 15(5) May 2016 (Year: 2016).*
Chen, Mol Cancer Therap, 15 5, May 2016 (Year: 2016).*
Anil K. Saksena et al., "SCH 51048, A Novel Borad-Spectrum Orally Active Antifungal Agent: Synthesis and Preliminary Structure-Activity Profile", Bioorganic & Medicinal Chemistry Letters, vol. 5, No. 2, 1995, pp. 127-132.
Banerjee et al.; "Evaluation of vitamin D3 A-ring analogues as Hedgehog pathway inhibitors"; Bioorg. Med. Chem. Lett. 2012, 22 (3), 1330-1334.
Brun et al.; "Survivin as a therapeutic target in Sonic hedgehog-driven medulloblastoma"; Oncogene 2015, 34 (29), 3770-3779.
Chen et al.; "Posaconazole, a Second-Generation Triazole Antifungal Drug, Inhibits the Hedgehog Signaling Pathway and Progression of Basal Cell Carcinoma"; Molecular Cancer Therapeutics; 15(5); pp. 866-876; (2006).
Chong et al.; "Inhibition of Angiogenesis by the Antifungal Drug Itraconazole"; ASC Chemical Biology: 2(4); pp. 263-270; (2007).
Costa et al.; "Liposome Formation Using a Coaxial Turbulent Jet in Co-Flow"; Pharm Res; 33(2); pp. 404-416; (2016).
Heeres et al.; "Antimycotic Azoles. 7. Synthesis and Antifungal Properties of a Series of Novel Triazol-3-ones"; J. Med. Chem. 1984, 27 (7), 894-900.
International Search Report for International Application No. PCT/US2020/045341, International Filing Date Aug. 7, 2020, p. 1-6.
Mishra et al.; "Radiation Damage of Myoglobin Crystals in Weak Stationary Electric and Magnetic Fields"; J. Phys. Conf. Ser. 2014, 534 (1), 1-8.
Pace et al.; "Repurposing the Clinically Efficacious Antifungal Agent Itraconazole as an Anticancer Chemotherapeutic"; Journal of Medicinal Chemistry; 59; pp. 3635-3649; (2016).
Pondugula, Satyanarayana R. et al.; "Pregnane X Receptor and Cancer: Context-Specificity is Key"; Nuclear Receptor Research, vol. 3, (2016), Article ID 101198, 12 pages.
Power, Eoin C. et al.; "Partial structures of ketoconazole as modulators of the large conductance calcium-activated potassium channel (BKCa)"; Bioorganic & Medicinal Chemistry Letters 16 (2006) 887-890.
Shi et al.; "Impact of Absolute Stereochemistry on the Antiangiogenic and Antifungal Activities of Itraconazole"; ACS Medicinal Chemistry Letters, 2010, 1 (4), 155-159.
Shi et al; Itraconazole Side Chain Analogues: Structure-Act. Relationship Studies for Inh. of Engothellal Cell Proliferation, Vascular Endothellal Growth Factor Receptor 2 (VEGFR2) Glycosylation, & Hedehog Signaling, J. Med. Chem. 2011, 54:20, 7363-74.
Tanoury et al., "Total synthesis of (2R,4S,2,S,3,R)-hydroxyitraconazole: implementations of a recycle protocol and a mild and safe phase-transfer reagent for preparation of the key chiral units"; Tetrahedron: Asymmetry 2003, 14 (22), 3487-3493.
Wen, Jiachen et al.; "Truncated Itraconazole Analogues Exhibiting Potent Anti-Hedgehog Activity and Improved Drug-like Properties". ACS Med. Chem. Lett. 2019, 10, 1290-1295.
Written Opinion for International Application No. PCT/US2020/045341, International Filing Date Aug. 7, 2020, 6 pages.

* cited by examiner

Scheme 1. General Synthesis of Amides and Hydrazides[a]

[a]Reagents and conditions: (a) Appropriate carboxylic acid, EDCI, DMAP, TEA, DMF, RT, overnight, 31–89%; (b) $Cs_2CO_3$, DMSO, 60°C, 4 h, 51–93%; (c) Pd/C, hydrazine hydrate, EtOH, reflux, 4 h, 91%; (d) $NaBH_4$, $I_2$, THF, RT, 2 h, 31–62%; (e) Phenyl chloroformate, $K_2CO_3$, DCM, 0°C to RT, 4 h, 62%; (f) Hydrazine hydrate, 1,4-diox, reflux, 12 h, 89–91%; (g) Appropriate benzaldehyde, EtOH, reflux, 4 h, 62–92%.

Scheme 2. Synthesis of Metabolites 21, 22 and Amine 23[a]

[a]Reagents and conditions: (a) Di-tert-butyl dicarbonate, TEA, DCM, RT, 2 h, 93%; (b) 25, Cs$_2$CO$_3$, DMSO, 60°C, 4 h, 39–98%; (c) TMSOTf, 2,6-lutidine, DCM, 0°C to RT, overnight, 72%; (d) 3,4-Bis-allyloxybenzenepropanoic acid, EDCI, DMAP, TEA, DMF, RT, overnight, 81%; (e) NaBH$_4$, I$_2$, THF, RT, 2 h, 41–71%; (f) 30, K$_2$CO$_3$, DMF, 40°C, 4 h, 41%.

TRUNCATED ITRACONAZOLE ANALOGUES AND METHODS OF USE THEREOF

CROSS-REFERENCE TO RELATED APPLICATIONS

This application is a U.S. National Stage entry of International Application No. PCT/US2020/045341, filed Aug. 7, 2020, which claims the benefit of U.S. Provisional Application No. 62/884,988 filed Aug. 9, 2019, each of which is hereby incorporated by reference in its entirety for all purposes.

STATEMENT REGARDING FEDERALLY SPONSORED RESEARCH & DEVELOPMENT

This invention was made with government support under CA190617 awarded by the National Institutes of Health/National Cancer Institute. The government has certain rights in the invention.

BACKGROUND

The Hh pathway is a developmental signaling pathway that plays a key role in directing growth and tissue patterning during embryonic development. Dysregulation of Hh signaling has been linked to the development of a variety of human tumors; most notably, basal cell carcinoma (BCC) and medulloblastoma (MB). Recent years have seen the development of numerous small molecule Hh pathway inhibitors, the majority of which directly bind Smoothened (Smo), a 7-transmembrane GPCR-like receptor and key regulator of pathway signaling. The most advanced of these compounds, the small molecule GDC-0449 (Vismodegib/Erivedge™), was approved by the FDA for the treatment of metastatic BCC, highlighting the clinical relevance of Hh pathway inhibition. The importance of angiogenesis in tumor formation, growth, and metastasis is well-documented and numerous small molecules and biologics that inhibit angiogenesis are clinically useful anti-cancer agents.

The approval of vismodegib and sonidegib as treatments for advanced BCC confirmed the clinical efficacy of small molecule pathway inhibitors for the treatment of Hh-dependent cancers. Of continued concern in the development of Hh pathway inhibitors is the identification of multiple mutations in Smoothened, the molecular target of vismodegib and sonidegib, which reduce binding affinity for the drugs and decrease overall efficacy.

Recent years have seen the identification and exploration of itraconazole (ITZ), an FDA approved antifungal agent, as an Hh pathway inhibitor. Strong evidence exists to suggest that ITZ binds and directly inhibits Smo, a key component of the Hh pathway; however, ITZ retains potent Hh inhibitory activity in vitro and in vivo in the presence of vismodegib-resistant Smo mutants. With this in mind, the ITZ scaffold represents a promising anti-cancer strategy that has the possibility to address the acquired resistance after treatment associated with the clinically approved Smo antagonists.

There remains a need in the art for novel compounds exhibiting potent Hh inhibitory activity.

BRIEF SUMMARY

In one aspect, included herein is a compound having the structure of Formula (I)

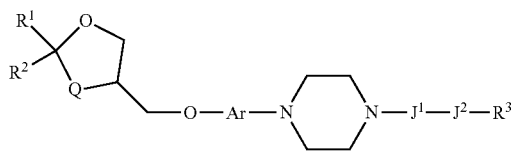

(I)

wherein
Q is O or $CH_2$;
Ar is unsubstituted or substituted aryl or heteroaryl;
$J^1$ is absent, —C(=O)—, —C(=O)O—, —C(=O)NH—, —C(=O)NH—NH—, or —C(=O)NH—N=CH—;
$J^2$ is absent, $C_{1-4}$ alkyl, $C_{2-4}$ alkenyl, or $C_{2-4}$ alkynyl;
$R^1$ is $C_{1-6}$ alkyl optionally substituted with an amino, $C_{1-6}$ alkylamino, $C_{1-6}$ dialkylamino, N-acylamino, —COOH, aryl, heterocycle, pyrrolidine, pyrrole, or pyridinyl group;
$R^2$ is $C_{1-6}$ alkyl or unsubstituted or substituted aryl or heteroaryl;
$R^3$ is H, $C_{1-6}$ alkyl, $C_{1-6}$ alkoxy, $C_{2-6}$ alkanoyl, $C_{1-6}$ alkoxycarbonyl, $C_{1-6}$ haloalkyl, $C_{3-8}$ cycloalkyl, heterocycloalkyl, or unsubstituted or substituted aryl or heteroaryl, wherein each substituted aryl or heteroaryl individually is substituted with 1, 2, or 3 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy; or
a pharmaceutically acceptable salt, a stereoisomeric form thereof, or a combination thereof.

In another aspect, included are pharmaceutical compositions including the disclosed compounds and a pharmaceutically acceptable excipient.

In yet another aspect, included herein are methods of treating cell proliferation disorders such as cancer, particularly Hh-signaling pathway-dependent cell proliferation disorders, with the compounds or pharmaceutical compositions disclosed herein.

Figure 1:
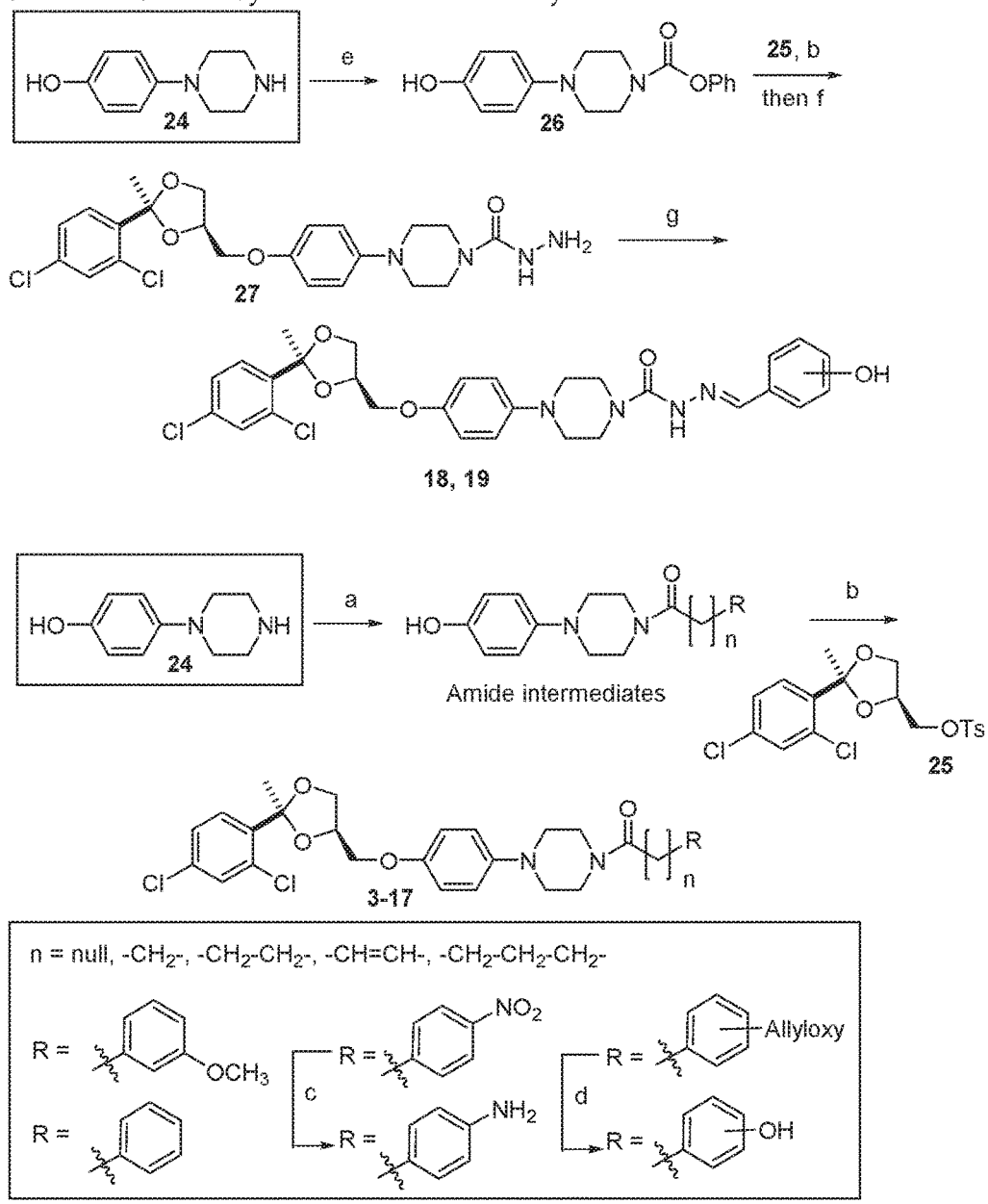
FIG. 1 is Scheme 1 describing the general synthesis of amides and hydrazide ITZ analogues.

The above-described and other features will be appreciated and understood by those skilled in the art from the following detailed description, drawings, and appended claims.

DETAILED DESCRIPTION

Disclosed herein are truncated itraconazole (ITZ) analogues with novel structures that were designed to enhance inhibition of Hh signaling and maintain this activity against Smo mutants that confer resistance against vismodegib or other Hh inhibitors. The analogues may be used to treat cell proliferation disorders that are dependent upon the Hh signaling pathway, making them useful as anti-cancer agents. In another aspect, the analogues are useful to treat cancers that are resistant to vismodegib. In another embodiment, the compounds can be formulated a pharmaceutical compositions used in the treatment of a cell proliferation disorders such as cancer, including for example, Hh signaling pathway-dependent cell proliferation disorders.

The truncated ITZ analogues are compounds having the structure of Formula (I)

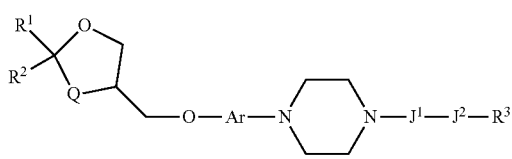

wherein
Q is O or $CH_2$;
Ar is unsubstituted or substituted aryl or heteroaryl;
$J^1$ is absent, —C(=O)—, —C(=O)O—, —C(=O)NH—, —C(=O)NH—NH—, or —C(=O)NH—N=CH—;
$J^2$ is absent, $C_{1-4}$ alkyl, $C_{2-4}$ alkenyl, or $C_{2-4}$ alkynyl;
$R^1$ is $C_{1-6}$ alkyl optionally substituted with an amino, $C_{1-6}$ alkylamino, $C_{1-6}$ dialkylamino, N-acylamino, —COOH, aryl, heterocycle, pyrrolidine, pyrrole, or pyridinyl group;
$R^2$ is $C_{1-6}$ alkyl or unsubstituted or substituted aryl or heteroaryl;
$R^3$ is H, $C_{1-6}$ alkyl, $C_{1-6}$ alkoxy, $C_{2-6}$ alkanoyl, $C_{1-6}$ alkoxycarbonyl, $C_{1-6}$ haloalkyl, $C_{3-8}$ cycloalkyl, heterocycloalkyl, or unsubstituted or substituted aryl or heteroaryl,
wherein each substituted aryl or heteroaryl individually is substituted with 1, 2, or 3 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy; or
a pharmaceutically acceptable salt, a stereoisomeric form thereof, or a combination thereof.

In another embodiment, the compound of Formula (I), wherein Q is O; Ar is phenyl, pyridine, pyrazine, or pyridazine; $J^1$ is a —C(=O)— or —C(=O)NH—N=CH—; $J^2$ is absent, $C_{1-4}$ alkyl, or $C_{2-4}$ alkenyl; $R^1$ is $C_{1-6}$ alkyl; $R^2$ is unsubstituted or substituted aryl; $R^3$ is H or substituted or unsubstituted aryl or heteroaryl; wherein each substituted aryl or heteroaryl individually is substituted with 1 or 2 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

In an embodiment, Ar of Formula (I) is unsubstituted or substituted aryl or heteroaryl, specifically phenyl, pyridine, pyrazine, or pyridazine, and more specifically phenyl.

In an embodiment, $R^1$ of Formula (I) is $C_{1-6}$ alkyl optionally substituted with amino, $C_{1-6}$ alkylamino, $C_{1-6}$ dialkylamino, N-acylamino, —COOH, aryl, heterocycle, pyrrolidine, pyrrole, or pyridinyl group; specifically $R^1$ is methyl, optionally substituted with 1-pyrrole, 3-pyridine, 4-pyridine, phenyl, m-aminophenyl, p-aminophenyl, acetylamine, 1-pyrrolidine, amino, or dimethylamino; and in a specific embodiment $R^1$ is methyl.

In an embodiment, $R^2$ is $C_{1-6}$ alkyl or unsubstituted or substituted aryl or heteroaryl; specifically unsubstituted or substituted phenyl; and more specifically $R^2$ is 2,4-dichlorophenyl or 2,4-difluorophenyl.

In an embodiment, $R^3$ is H or unsubstituted or substituted aryl or heteroaryl, wherein the substituted aryl or heteroaryl individually is substituted with 1, 2, or 3 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

Within Formula (I), the compounds can be prepared in racemic form, any individual enantiomer or diastereomer, or any optically enriched form. Exemplary stereoisomers of Formula (I) include Formulae (I-1), (I-2), (I-3), or (I-4):

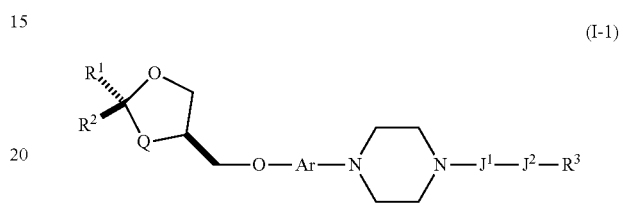

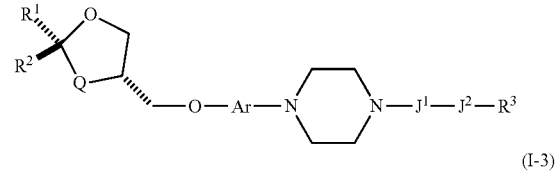

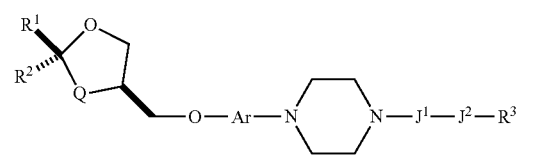

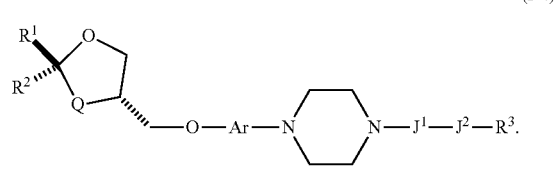

In another embodiment, the compounds have the structure of Formula (Ia)

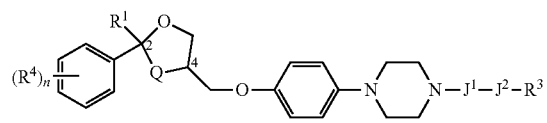

a pharmaceutically acceptable salt, a stereoisomeric form thereof, or a combination thereof, wherein
each of Q, $R^1$, $R^3$, $J^1$, and $J^2$ are as previously defined;
n is 1, 2, or 3; and
each $R^4$ independently is $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy, specifically each $R^4$ independently is halo.

It will be understood that the corresponding chiral Formulae (Ia-1), (Ia-2), (Ia-3), and (Ia-4) are included.

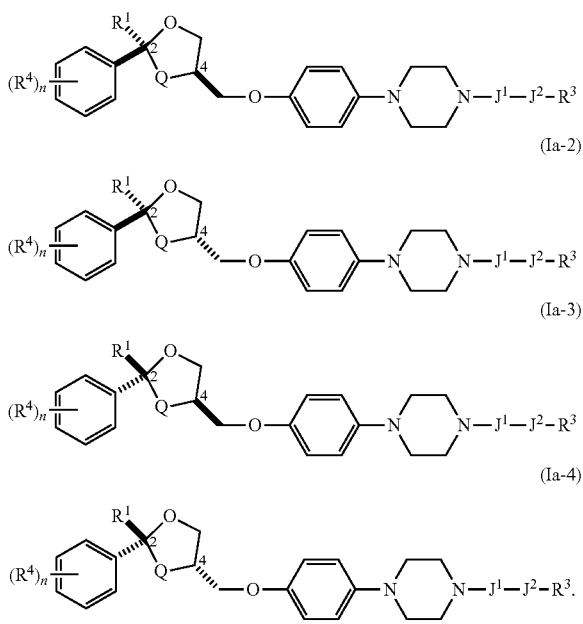

In certain aspects, the compounds of Formulae (I) and (Ia) may contain one or more asymmetric elements such as stereogenic centers, stereogenic axes and the like, e.g., asymmetric carbon atoms, so that the compounds can exist in different stereoisomeric forms. These compounds can be, for example, racemates or optically active forms. For compounds with two or more asymmetric elements, these compounds can additionally be mixtures of diastereomers. For compounds having asymmetric centers, it should be understood that all of the optical isomers and mixtures thereof are encompassed. In addition, compounds with double bonds may occur in Z- and E-forms, with all isomeric forms of the compounds being included in the present disclosure. In these situations, the single enantiomers, i.e., optically active forms, can be obtained by asymmetric synthesis, synthesis from optically pure precursors, or by resolution of the racemates. Resolution of the racemates can also be accomplished, for example, by conventional methods such as crystallization in the presence of a resolving agent, or chromatography, using, for example a chiral HPLC column.

Compounds are described using standard nomenclature. For example, any position not substituted by any indicated group is understood to have its valency filled by a bond as indicated, or a hydrogen atom.

The term "substituted", as used herein, means that any one or more hydrogens on the designated atom or group is replaced with a selection from the indicated group, provided that the designated atom's normal valence is not exceeded. When a substituent is oxo (i.e., =O), then 2 hydrogens on the atom are replaced. When aromatic moieties are substituted by an oxo group, the aromatic ring is replaced by the corresponding partially unsaturated ring. For example a pyridyl group substituted by oxo is a pyridone. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation into an effective therapeutic agent.

A dash ("-") that is not between two letters or symbols is used to indicate a point of attachment for a substituent. For example, —COOH is attached through the carbon atom.

As used herein, "alkyl" is intended to include both branched and straight-chain saturated aliphatic hydrocarbon groups, having the specified number of carbon atoms. Thus, the term $C_1$-$C_6$ alkyl as used herein includes alkyl groups having from 1 to about 6 carbon atoms. When $C_0$-$C_n$ alkyl is used herein in conjunction with another group, for example, phenyl$C_0$-$C_4$ alkyl, the indicated group, in this case phenyl, is either directly bound by a single covalent bond ($C_0$), or attached by an alkyl chain having the specified number of carbon atoms, in this case from 1 to about 2 carbon atoms. Examples of alkyl include, but are not limited to, methyl, ethyl, n-propyl, isopropyl, n-butyl, t-butyl, n-pentyl, and sec-pentyl.

"Alkenyl" as used herein, indicates hydrocarbon chains of either a straight or branched configuration comprising one or more unsaturated carbon-carbon bonds, which may occur in any stable point along the chain, such as ethenyl and propenyl.

"Alkynyl" as used herein, indicates hydrocarbon chains of either a straight or branched configuration comprising one or more triple carbon-carbon bonds that may occur in any stable point along the chain, such as ethynyl and propynyl.

"Alkoxy" represents an alkyl group as defined above with the indicated number of carbon atoms attached through an oxygen bridge. Examples of alkoxy include, but are not limited to, methoxy, ethoxy, n-propoxy, propoxy, n-butoxy, 2-butoxy, t-butoxy, n-pentoxy, 2-pentoxy, 3-pentoxy, iso-pentoxy, neopentoxy, n-hexoxy, 2-hexoxy, 3-hexoxy, and 3-methylpentoxy.

"Alkanoyl" indicates an alkyl group as defined above, attached through a keto (—(C=O)—) bridge. Alkanoyl groups have the indicated number of carbon atoms, with the carbon of the keto group being included in the numbered carbon atoms. For example a $C_2$alkanoyl group is an acetyl group having the formula $CH_3(C=O)$—.

The term "alkoxycarbonyl" indicates an alkoxy group, as defined above, having the indicated number of carbon atoms, attached through a keto linkage. The carbon of the keto linker is not included in the numbering, thus a $C_2$alkoxycarbonyl has the formula $CH_3CH_2O(C=O)$—.

As used herein, the term "mono- or di-alkylamino" indicates secondary or tertiary alkyl amino groups, wherein the alkyl groups are as defined above and have the indicated number of carbon atoms. The point of attachment of the alkylamino group is on the nitrogen. Examples of mono- and di-alkylamino groups include ethylamino, dimethylamino, and methyl-propyl-amino As used herein, the term "aryl" indicates aromatic groups containing only carbon in the aromatic ring or rings. Such aromatic groups may be further substituted with carbon or non-carbon atoms or groups. Typical aryl groups contain 1 to 3 separate, fused, or pendant rings and from 6 to about 18 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

"Cycloalkyl" as used herein, indicates saturated hydrocarbon ring groups, having the specified number of carbon atoms, usually from 3 to about 8 ring carbon atoms, or from 3 to about 7 carbon atoms. Examples of cycloalkyl groups include cyclopropyl, cyclobutyl, cyclopentyl, or cyclohexyl as well as bridged or caged saturated ring groups such as norbornane or adamantane.

"Haloalkyl" indicates both branched and straight-chain saturated aliphatic hydrocarbon groups having the specified number of carbon atoms, substituted with 1 or more halogen atoms, generally up to the maximum allowable number of halogen atoms. Examples of haloalkyl include, but are not limited to, trifluoromethyl, difluoromethyl, 2-fluoroethyl, and penta-fluoroethyl.

"Haloalkoxy" indicates a haloalkyl group as defined above attached through an oxygen bridge.

"Halo" or "halogen" as used herein refers to fluoro, chloro, bromo, or iodo.

As used herein, "heteroaryl" indicates a stable 5- to 7-membered monocyclic or 7-to 10-membered bicyclic heterocyclic ring which contains at least 1 aromatic ring that contains from 1 to 4, or specifically from 1 to 3, heteroatoms chosen from N, O, and S, with remaining ring atoms being carbon. When the total number of S and O atoms in the heteroaryl group exceeds 1, these heteroatoms are not adjacent to one another. In an embodiment, the total number of S and O atoms in the heteroaryl group is not more than 2. Examples of heteroaryl groups include, but are not limited to, pyridyl, indolyl, pyrimidinyl, pyridizinyl, pyrazinyl, imidazolyl, oxazolyl, furanyl, thiophenyl, thiazolyl, triazolyl, tetrazolyl, isoxazolyl, quinolinyl, pyrrolyl, pyrazolyl, and 5,6,7,8-tetrahydroisoquinoline. In the term "heteroarylalkyl," heteroaryl and alkyl are as defined above, and the point of attachment is on the alkyl group. This term encompasses, but is not limited to, pyridylmethyl, thiophenylmethyl, and pyrrolyl(1-ethyl).

The term "heterocycloalkyl" is used to indicate saturated cyclic groups containing from 1 to about 3 heteroatoms chosen from N, O, and S, with remaining ring atoms being carbon. Heterocycloalkyl groups have from 3 to about 8 ring atoms, and more typically have from 5 to 7 ring atoms. A $C_2$-$C_7$heterocycloalkyl group contains from 2 to about 7 carbon ring atoms and at least one ring atom chosen from N, O, and S. Examples of heterocycloalkyl groups include morpholinyl, piperazinyl, piperidinyl, and pyrrolidinyl groups.

"Pharmaceutically acceptable salts" includes derivatives of the disclosed compounds wherein the parent compound is modified by making an acid or base salt thereof, and further refers to pharmaceutically acceptable solvates of such compounds and such salts. Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional salts and the quaternary ammonium salts of the parent compound formed, for example, from inorganic or organic acids. For example, conventional acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—$(CH_2)_n$—COOH where n is 0-4, and the like. The pharmaceutically acceptable salts of the present invention can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reacting free base forms of these compounds with a stoichiometric amount of the appropriate acid. Such reactions are typically carried out in water or in an organic solvent, or in a mixture of the two. Generally, non-aqueous media like ether, ethyl acetate, ethanol, isopropanol, or acetonitrile can be used, where practicable.

As used herein, the terms "proliferation disorder", "cell proliferation disorder", "proliferative disorder", "cell proliferative disorder", "condition characterized by undesirable cell proliferation", and grammatical variations thereof refer to any pathological or non-pathological physiological condition characterized by aberrant or undesirable proliferation of at least one cell, including but not limited to conditions characterized by undesirable or unwanted or aberrant cell proliferation, conditions characterized by undesirable or unwanted or aberrant cell survival, and conditions characterized by deficient or aberrant apoptosis. The term "cell proliferation" and grammatical variations thereof, is understood to encompass both an increase in the number of cells as a result of cell division, as well as an increase in the total mass of cells as a result of cell growth, e.g., by growth of daughter cells after mitosis. An example of a proliferation disorder is cancer, e.g., undesirable or unwanted or aberrant proliferation and survival of cancer cells such as cells associated with prostate cancer, basal cell carcinoma, lymphoma, myeloma, sarcoma, leukemia, or other neoplastic disorders disclosed elsewhere herein and known to one of skill in the art. Proliferation disorders include pre-cancerous or pre-malignant conditions (e.g., morphologically identifiable lesions that precede invasive cancers), intraepithelial neoplasia (e.g., prostatic IEN and cervical IEN), atypical adenomatous hyperplasia, colorectal polyps, basal cell nevus syndrome, actinic keratosis, Barrett's esophagus, atrophic gastritis, and cervical dysplasia. Examples of non-cancerous proliferation disorders include smooth muscle cell proliferation, systemic sclerosis, cirrhosis of the liver, adult respiratory distress syndrome, idiopathic cardiomyopathy, lupus erythematosus, retinopathy, (e.g., diabetic retinopathy or other retinopathies), cardiac hyperplasia, reproductive system associated disorders such as benign prostatic hyperplasia and ovarian cysts, pulmonary fibrosis, endometriosis, fibromatosis, hamartomas, lymphangiomatosis, sarcoidosis and desmoid tumors. Non-cancerous proliferation disorders also include hyperproliferation of cells in the skin such as psoriasis and its varied clinical forms, Reiter's syndrome, pityriasis rubra pilaris, hyper-proliferative variants of disorders of keratinization (e.g., actinic keratosis, senile keratosis), scleroderma, seborrheic keratoses, intraepidermal nevi, common warts, benign epithelial tumors, and the like.

The terms "cancer" and "malignancy" are used herein interchangeably to refer to or describe the physiological condition in mammals that is typically characterized by unregulated cell growth. The term encompasses dysplasia, carcinoma in situ (CIS), and carcinoma. The cancer may be metastatic or non-metastatic, and may be any stage.

As used herein, the term "tumor" refers to all neoplastic cell growth and proliferation, whether malignant or benign, and all pre-cancerous and cancerous cells and tissues. For example, a particular cancer may be characterized by a solid mass tumor or non-solid tumor. The solid tumor mass, if present, may be a primary tumor mass. A primary tumor mass refers to a growth of cancer cells in a tissue resulting from the transformation of a normal cell of that tissue. In most cases, the primary tumor mass is identified by the presence of a cyst, which can be found through visual or palpation methods, or by irregularity in shape, texture or weight of the tissue. However, some primary tumors are not palpable and can be detected only through medical imaging techniques such as X-rays (e.g., mammography) or magnetic resonance imaging (MRI), or by needle aspirations. The use of these latter techniques is more common in early detection. Molecular and phenotypic analysis of cancer cells within a tissue can usually be used to confirm if the cancer is endogenous to the tissue or if the lesion is due to metastasis from another site.

As used herein, the term "efficacy" in the context of therapy refers to the ability of the therapy (as monotherapy, or in combination therapy with another agent that may or may not be an inhibitor of the Hh signaling pathway) to alleviate one or more symptoms of the cell proliferation disorder (e.g., cancer), diminish the extent of disease, stabilize (i.e., not worsening) the state of the disease, delay or slow disease progression, amelioration or palliation of the disease state, remission (whether partial or total), whether detectable or undetectable, tumor regression, inhibit tumor growth, inhibit tumor metastasis, reduce cancer cell number, inhibit cancer cell infiltration into peripheral organs, increase progression free survival, improve progression free survival, improve time to disease progression (TTP), improve response rate (RR), prolonged overall survival (OS), prolong time-to-next-treatment (TNTT), or prolong time from first progression to next treatment, or a combination of two or more of the foregoing.

As used herein, and unless otherwise specified, the terms "treat," "treating" and "treatment" contemplate an action that occurs while a subject has a cell proliferation disorder (as therapy), or before the subject has the cell proliferation disorder (as prophylaxis), which reduces the severity of the cell proliferation disorder, retards or slows the progression of the cell proliferation disorder, or prevents the cell proliferation disorder. Thus, treatment with HhP inhibitors may prevent or manage a cell proliferation disorder such as cancer.

As used herein, unless otherwise specified, the terms "prevent," "preventing", and "prevention" contemplate an action that occurs before a subject begins to suffer from the regrowth of the cell proliferation disorder and/or which inhibits or reduces the severity of the cell proliferation disorder, or delays its onset.

As used herein, and unless otherwise specified, the terms "manage," "managing" and "management" encompass preventing the recurrence of the cell proliferation disorder in a subject who has already suffered from the disorder, and/or lengthening the time that a subject who has suffered from the disorder remains in remission. The terms encompass modulating the threshold, development and/or duration of the disorder, or changing the way that a patient responds to the disorder.

The compounds disclosed herein are inhibitors of the Hh signaling pathway ("HhP inhibitors") and are particularly useful in the treatment of cancers and other cell proliferation disorders that are dependent upon the Hh signaling pathway. In cells regulated by the Hh pathway, signal transmission is controlled through a cascade that determines the balance between activator and repressor forms of the Gli family of transcription factors. In the absence of Hh ligand, Patched (Ptch) suppresses the activity of Smoothened (Smo), a seven-transmembrane protein that is normally observed in endosomes. This inhibition ultimately results in the generation of N-terminal truncated Gli proteins, $Gli^R$, that act as repressors of Hh-responsive genes. Binding of an Hh ligand to Ptch abolishes its inhibition of Smo, leading to the production of full-length Gli activator ($Gli^A$) proteins and resulting in expression of Hh target genes that control proper cell fate determination. Dysregulation of the pathway causes constitutive activation, resulting in uncontrolled proliferation and tumor growth; most notably, in basal cell carcinoma (BCC) and medulloblastoma (MB). Other cancers that may be treated with Hh signaling pathway inhibitors besides BCC and MB include chronic myeloid leukemia, lung cancer, prostate cancer, pancreatic cancer and bone cancer.

As HhP inhibitors, the compounds disclosed herein are useful for treatment of proliferation disorders in subjects in vivo, as well as for research on cells in vitro.

Cancer is an example of a proliferation disorder that may be treated and monitored using methods of the invention. The terms "cancer" and "malignancy" are used herein interchangeably to refer to or describe the physiological condition in mammals that is typically characterized by unregulated cell growth. The methods and compositions of the invention can be utilized for early, middle, or late stage disease, and acute or chronic disease. The cancer may be drug-resistant or drug-sensitive. Examples of cancer include but are not limited to, carcinoma, lymphoma, blastoma, sarcoma, and leukemia. More particular examples of such cancers include breast cancer, prostate cancer, colon cancer, squamous cell cancer, small-cell lung cancer, non-small cell lung cancer, gastrointestinal cancer, pancreatic cancer, cervical cancer, ovarian cancer, peritoneal cancer, liver cancer, e.g., hepatic carcinoma, bladder cancer, colorectal cancer, endometrial carcinoma, kidney cancer, and thyroid cancer. In some embodiments, the cancer is a hematologic malignancy (for example, multiple myeloma or leukemia). In some embodiments, the cancer is a non-hematologic malignancy.

Other non-limiting examples of cancers are BCC biliary tract cancer; bone cancer; brain and CNS cancer; choriocarcinoma; connective tissue cancer; esophageal cancer; eye cancer; cancer of the head and neck; gastric cancer; intraepithelial neoplasm; larynx cancer; lymphoma including Hodgkin's and Non-Hodgkin's lymphoma; melanoma; myeloma; neuroblastoma; oral cavity cancer (e.g., lip, tongue, mouth, and pharynx); retinoblastoma; rhabdomyosarcoma; rectal cancer; cancer of the respiratory system; sarcoma; skin cancer; stomach cancer; testicular cancer; uterine cancer; cancer of the urinary system, as well as other carcinomas and sarcomas. Examples of cancer types that may potentially be treated using the compounds disclosed herein are also listed in Table 6.

TABLE 6

Examples of Cancer Types

| | |
|---|---|
| Acute Lymphoblastic Leukemia, Adult | Hairy Cell Leukemia |
| Acute Lymphoblastic Leukemia, Childhood | Head and Neck Cancer |
| | Hepatocellular (Liver) Cancer, Adult (Primary) |
| Acute Myeloid Leukemia, Adult | Hepatocellular (Liver) Cancer, Childhood (Primary) |
| Acute Myeloid Leukemia, Childhood | |

TABLE 6-continued

Examples of Cancer Types

Adrenocortical Carcinoma
Adrenocortical Carcinoma, Childhood
AIDS-Related Cancers
AIDS-Related Lymphoma
Anal Cancer
Astrocytoma, Childhood Cerebellar
Astrocytoma, Childhood Cerebral
Basal Cell Carcinoma
Bile Duct Cancer, Extrahepatic
Bladder Cancer
Bladder Cancer, Childhood
Bone Cancer, Osteosarcoma/Malignant Fibrous Histiocytoma
Brain Stem Glioma, Childhood
Brain Tumor, Adult
Brain Tumor, Brain Stem Glioma, Childhood
Brain Tumor, Cerebellar Astrocytoma, Childhood
Brain Tumor, Cerebral Astrocytoma/Malignant Glioma, Childhood
Brain Tumor, Ependymoma, Childhood
Brain Tumor, Medulloblastoma, Childhood
Brain Tumor, Supratentorial Primitive Neuroectodermal Tumors, Childhood
Brain Tumor, Visual Pathway and Hypothalamic Glioma, Childhood
Brain Tumor, Childhood
Breast Cancer
Breast Cancer, Childhood
Breast Cancer, Male
Bronchial Adenomas/Carcinoids, Childhood
Burkitt's Lymphoma
Carcinoid Tumor, Childhood
Carcinoid Tumor, Gastrointestinal
Carcinoma of Unknown Primary
Central Nervous System Lymphoma, Primary
Cerebellar Astrocytoma, Childhood
Cerebral Astrocytoma/Malignant Glioma, Childhood
Cervical Cancer
Childhood Cancers
Chronic Lymphocytic Leukemia
Chronic Myelogenous Leukemia
Chronic Myeloproliferative Disorders
Colon Cancer
Colorectal Cancer, Childhood
Cutaneous T-Cell Lymphoma, see Mycosis Fungoides and Sézary Syndrome
Endometrial Cancer
Ependymoma, Childhood
Esophageal Cancer
Esophageal Cancer, Childhood
Ewing's Family of Tumors
Extracranial Germ Cell Tumor, Childhood
Extragonadal Germ Cell Tumor
Extrahepatic Bile Duct Cancer
Eye Cancer, Intraocular Melanoma
Eye Cancer, Retinoblastoma
Gallbladder Cancer
Gastric (Stomach) Cancer
Gastric (Stomach) Cancer, Childhood
Gastrointestinal Carcinoid Tumor
Germ Cell Tumor, Extracranial, Childhood
Germ Cell Tumor, Extragonadal
Germ Cell Tumor, Ovarian
Gestational Trophoblastic Tumor
Glioma, Adult
Glioma, Childhood Brain Stem
Glioma, Childhood Cerebral Astrocytoma
Hodgkin's Lymphoma, Adult
Hodgkin's Lymphoma, Childhood
Hodgkin's Lymphoma During Pregnancy
Hypopharyngeal Cancer
Hypothalamic and Visual Pathway Glioma, Childhood
Intraocular Melanoma
Islet Cell Carcinoma (Endocrine Pancreas)
Kaposi's Sarcoma
Kidney (Renal Cell) Cancer
Kidney Cancer, Childhood
Laryngeal Cancer
Laryngeal Cancer, Childhood
Leukemia, Acute Lymphoblastic, Adult
Leukemia, Acute Lymphoblastic, Childhood
Leukemia, Acute Myeloid, Adult
Leukemia, Acute Myeloid, Childhood
Leukemia, Chronic Lymphocytic
Leukemia, Chronic Myelogenous
Leukemia, Hairy Cell
Lip and Oral Cavity Cancer
Liver Cancer, Adult (Primary)
Liver Cancer, Childhood (Primary)
Lung Cancer, Non-Small Cell
Lung Cancer, Small Cell
Lymphoma, AIDS-Related
Lymphoma, Burkitt's
Lymphoma, Cutaneous T-Cell, see Mycosis Fungoides and Sézary Syndrome
Lymphoma, Hodgkin's, Adult
Lymphoma, Hodgkin's, Childhood
Lymphoma, Hodgkin's During Pregnancy
Lymphoma, Non-Hodgkin's, Adult
Lymphoma, Non-Hodgkin's, Childhood
Lymphoma, Non-Hodgkin's During Pregnancy
Lymphoma, Primary Central Nervous System
Macroglobulinemia, Waldenström's
Malignant Fibrous Histiocytoma of Bone/Osteosarcoma
Medulloblastoma, Childhood
Melanoma
Melanoma, Intraocular (Eye)
Merkel Cell Carcinoma
Mesothelioma, Adult Malignant
Mesothelioma, Childhood
Metastatic Squamous Neck Cancer with Occult Primary
Multiple Endocrine Neoplasia Syndrome, Childhood
Multiple Myeloma/Plasma Cell Neoplasm
Mycosis Fungoides
Myelodysplastic Syndromes
Myelodysplastic/Myeloproliferative Diseases
Myelogenous Leukemia, Chronic
Myeloid Leukemia, Adult Acute
Myeloid Leukemia, Childhood Acute
Myeloma, Multiple
Myeloproliferative Disorders, Chronic
Nasal Cavity and Paranasal Sinus Cancer
Nasopharyngeal Cancer
Nasopharyngeal Cancer, Childhood
Neuroblastoma
Non-Hodgkin's Lymphoma, Adult
Non-Hodgkin's Lymphoma, Childhood
Non-Hodgkin's Lymphoma During Pregnancy
Non-Small Cell Lung Cancer
Oral Cancer, Childhood
Oral Cavity Cancer, Lip and
Oropharyngeal Cancer
Osteosarcoma/Malignant Fibrous Histiocytoma of Bone
Ovarian Cancer, Childhood
Ovarian Epithelial Cancer
Ovarian Germ Cell Tumor
Ovarian Low Malignant Potential Tumor
Pancreatic Cancer
Pancreatic Cancer, Childhood
Pancreatic Cancer, Islet Cell TABLE 6-continued Examples of Cancer Types

| | |
|---|---|
| Glioma, Childhood Visual Pathway and Hypothalamic | Paranasal Sinus and Nasal Cavity Cancer Parathyroid Cancer |
| Skin Cancer (Melanoma) | Penile Cancer |
| Skin Carcinoma, Merkel Cell | Pheochromocytoma |
| Small Cell Lung Cancer | Pineoblastoma and Supratentorial Primitive Neuroectodermal Tumors, Childhood |
| Small Intestine Cancer | |
| Soft Tissue Sarcoma, Adult | Pituitary Tumor |
| Soft Tissue Sarcoma, Childhood | Plasma Cell Neoplasm/Multiple Myeloma |
| Squamous Cell Carcinoma, see Skin Cancer (non-Melanoma) | Pleuropulmonary Blastoma Pregnancy and Breast Cancer |
| Squamous Neck Cancer with Occult Primary, Metastatic | Pregnancy and Hodgkin's Lymphoma Pregnancy and Non-Hodgkin's Lymphoma |
| Stomach (Gastric) Cancer | Primary Central Nervous System Lymphoma |
| Stomach (Gastric) Cancer, Childhood | Prostate Cancer |
| Supratentorial Primitive Neuroectodermal Tumors, Childhood | Rectal Cancer Renal Cell (Kidney) Cancer |
| T-Cell Lymphoma, Cutaneous, see Mycosis Fungoides and Sézary Syndrome | Renal Cell (Kidney) Cancer, Childhood Renal Pelvis and Ureter, Transitional Cell Cancer |
| Testicular Cancer | Retinoblastoma |
| Thymoma, Childhood | Rhabdomyosarcoma, Childhood |
| Thymoma and Thymic Carcinoma | Salivary Gland Cancer |
| Thyroid Cancer | Salivary Gland Cancer, Childhood |
| Thyroid Cancer, Childhood | Sarcoma, Ewing's Family of Tumors |
| Transitional Cell Cancer of the Renal Pelvis and Ureter | Sarcoma, Kaposi's Sarcoma, Soft Tissue, Adult |
| Trophoblastic Tumor, Gestational | Sarcoma, Soft Tissue, Childhood |
| Unknown Primary Site, Carcinoma of, Adult | Sarcoma, Uterine Sezary Syndrome |
| Unknown Primary Site, Cancer of, Childhood | Skin Cancer (non-Melanoma) Skin Cancer, Childhood |
| Unusual Cancers of Childhood | |
| Ureter and Renal Pelvis, Transitional Cell Cancer | |
| Urethral Cancer | |
| Uterine Cancer, Endometrial | |
| Uterine Sarcoma | |
| Vaginal Cancer | |
| Visual Pathway and Hypothalamic Glioma, Childhood | |
| Vulvar Cancer | |
| Waldenström's Macroglobulinemia | |
| Wilms' Tumor | |

In some embodiments, the cell proliferation disorder to be treated is prostate cancer. In some embodiments, the prostate cancer is metastatic. In some embodiments, the prostate cancer is non-metastatic. In some embodiments, the prostate cancer is one that exhibits elevated expression of a HhP member or ligand (i.e., a HhP-associated cancer). In some embodiments, the prostate cancer is castration-resistant. In some embodiments, the prostate cancer is non-castration resistant. In some embodiments, the prostate cancer is metastatic, castration-resistant prostate cancer. In some embodiments, the prostate cancer is non-metastatic, castration-resistant prostate cancer.

In some embodiments, the cell proliferation disorder to be treated is basal cell carcinoma (BCC). In some embodiments, the BCC is a type selected from among nodular BCC, cystic BCC, cicatricial BCC, infiltrative BCC, micronodular BCC, superficial BCC, pigmented BCC, Jacobi ulcer, fibroepithelioma of Pinkus, polyoid basal-cell carcinoma, pore-like BCC, or aberrant BCC. In some embodiments, the BCC is sporadic BCC. In some embodiments, the BCC is hereditary BCC. In some embodiments, the subject has a BCC tumor equal to or greater than 4 mm.

BCC is the most commonly diagnosed form of cancer in persons of European ancestry (affecting approximately 1 million Americans annually). It has been estimated that approximately 30% of Caucasians living in areas of high sun exposure will develop a BCC during their lifetime and the incidence of BCC in younger populations (especially young females) is rising. While BCC is rarely fatal, it can result in significant morbidity and the large number of affected individuals presents an increasing health burden.

MB is the most common malignant central nervous system tumor in children, accounting for approximately 20% of pediatric brain tumors and most commonly occurring in children under the age of 8 (40% before the age of 5). Current therapy for pediatric MB patients includes surgery followed by radiation and high-dose chemotherapy. While survival rates for pediatric MB patients have improved over the last ten years, long-term side effects of this course of treatment can include neurocognitive and endocrine deficits as well as growth impairment. In addition, these patients are at an increased risk of developing secondary tumors later in life. Uncontrolled activation of Hh signaling, including both mutation and amplification of key pathway components, has been implicated in approximately 25% of MBs.

In certain embodiments, the compounds described herein are administered to a patient or subject in need thereof. A "patient" or "subject", used equivalently herein, means mammals and non-mammals. "Mammals" means a member of the class Mammalia including, but not limited to, humans, non-human primates such as chimpanzees and other apes and monkey species; farm animals such as cattle, horses, sheep, goats, and swine; domestic animals such as rabbits, dogs, and cats; laboratory animals including rodents, such as rats, mice, and guinea pigs; and the like. Examples of non-mammals include, but are not limited to, birds, and the like. The term "subject" does not denote a particular age or sex.

The phrase "effective amount," as used herein, means an amount of an agent which is sufficient enough to significantly and positively modify symptoms and/or conditions to be treated (e.g., provide a positive clinical response). The effective amount of an active ingredient for use in a pharmaceutical composition will vary with the particular condition being treated, the severity of the condition, the duration of the treatment, the nature of concurrent therapy, the particular active ingredient(s) being employed, the particular pharmaceutically-acceptable excipient(s)/carrier(s) utilized, and like factors within the knowledge and expertise of the attending physician. In general, the use of the minimum dosage that is sufficient to provide effective therapy is used. Patients may generally be monitored for therapeutic effectiveness using assays suitable for the condition being treated or prevented, which will be familiar to those of ordinary skill in the art.

The amount of compound effective for any indicated condition will, of course, vary with the individual subject being treated and is ultimately at the discretion of the medical or veterinary practitioner. The factors to be considered include the condition being treated, the route of administration, the nature of the formulation, the subject's body weight, surface area, age and general condition, and the particular compound to be administered. In general, a suitable effective dose is in the range of about 0.1 to about 500 mg/kg body weight per day, specifically in the range of about 5 to about 350 mg/kg per day. The total daily dose may be given as a single dose, multiple doses, e. g., two to six times per day, or by intravenous infusion for a selected duration. Dosages above or below the range cited above may be administered to the individual patient if desired and necessary.

As used herein, "pharmaceutical composition" means therapeutically effective amounts of the compound together with a pharmaceutically acceptable excipient, such as diluents, preservatives, solubilizers, emulsifiers, and adjuvants. As used herein "pharmaceutically acceptable excipients" are well known to those skilled in the art.

Tablets and capsules for oral administration may be in unit dose form, and may contain conventional excipients such as binding agents, for example syrup, acacia, gelatin, sorbitol, tragacanth, or polyvinyl-pyrrolidone; fillers for example lactose, sugar, maize-starch, calcium phosphate, sorbitol or glycine; tabletting lubricant, for example magnesium stearate, talc, polyethylene glycol or silica; disintegrants for example potato starch, or acceptable wetting agents such as sodium lauryl sulphate. The tablets may be coated according to methods well known in normal pharmaceutical practice. Oral liquid preparations may be in the form of, for example, aqueous or oily suspensions, solutions, emulsions, syrups or elixirs, or may be presented as a dry product for reconstitution with water or other suitable vehicle before use. Such liquid preparations may contain conventional additives such as suspending agents, for example sorbitol, syrup, methyl cellulose, glucose syrup, gelatin hydrogenated edible fats; emulsifying agents, for example lecithin, sorbitan monooleate, or acacia; non-aqueous vehicles (which may include edible oils), for example almond oil, fractionated coconut oil, oily esters such as glycerine, propylene glycol, or ethyl alcohol; preservatives, for example methyl or propyl p-hydroxybenzoate or sorbic acid, and if desired conventional flavoring or coloring agents.

For topical application to the skin, the drug may be made up into a cream, lotion or ointment. Cream or ointment formulations which may be used for the drug are conventional formulations well known in the art. Topical administration includes transdermal formulations such as patches.

For topical application to the eye, the compounds may be made up into a solution or suspension in a suitable sterile aqueous or non aqueous vehicle. Additives, for instance buffers such as sodium metabisulphite or disodium edeate; preservatives including bactericidal and fungicidal agents such as phenyl mercuric acetate or nitrate, benzalkonium chloride or chlorhexidine, and thickening agents such as hypromellose may also be included.

The active ingredient may also be administered parenterally in a sterile medium, either subcutaneously, or intravenously, or intramuscularly, or intrasternally, or by infusion techniques, in the form of sterile injectable aqueous or oleaginous suspensions. Depending on the vehicle and concentration used, the drug can either be suspended or dissolved in the vehicle. Advantageously, adjuvants such as a local anaesthetic, preservative and buffering agents can be dissolved in the vehicle.

Pharmaceutical compositions may conveniently be presented in unit dosage form and may be prepared by any of the methods well known in the art of pharmacy. The term "unit dosage" or "unit dose" means a predetermined amount of the active ingredient sufficient to be effective for treating an indicated activity or condition. Making each type of pharmaceutical composition includes the step of bringing the active compound into association with a carrier and one or more optional accessory ingredients. In general, the formulations are prepared by uniformly and intimately bringing the active compound into association with a liquid or solid carrier and then, if necessary, shaping the product into the desired unit dosage form.

Combination Treatments

Each compound disclosed herein can be administered to a subject by itself, or co-administered with one or more other agents or treatments, such as an inhibitor of the Hh signaling pathway (HhP inhibitor), or an agent that is not an HhP inhibitor. In some embodiments, the additional agent is one or more anti-cancer agents. Anti-cancer agents include but are not limited to the chemotherapeutic agents listed in Table 7.

TABLE 7

| Examples of Anti-Cancer Agents | |
|---|---|
| 13-cis-Retinoic Acid | MYLOCEL product |
| 2-Amino-6-Mercaptopurine | LETROZOLE product |
| Cladribine (2-CDA) | NEOSAR product |
| 2-Chlorodeoxyadenosine | NEULASTA product |
| 5-fluorouracil (5-FU) | NEUMEGA product |
| 6 Thioguanine (6-TG) | NEUPOGEN product |

TABLE 7-continued

Examples of Anti-Cancer Agents

| | |
|---|---|
| 6-Mercaptopurine (6-MP) | NILANDRON product |
| ACCUTANE product | NILUTAMIDE product |
| ACTINOMYCIN-D product | Nitrogen Mustard |
| ADRIAMYCIN product | NOLVADEX product |
| ADRUCIL product | NOVANTRONE product |
| AGRYLIN product | OCTREOTIDE product |
| ALA-CORT product | OCTREOTIDE ACETATE product |
| ALDESLEUKIN product | ONCOSPAR product |
| ALEMTUZUMAB product | ONCOVIN product |
| ALITRETINOIN product | ONTAK product |
| ALKABAN-AQ product | ONXAL product |
| ALKERAN product | OPREVELKIN product |
| All-transretinoic acid | ORAPRED product |
| Alpha interferon | ORASONE product |
| ALTRETAMINE product | OXALIPLATIN product |
| AMETHOPTERIN product | PACLITAXEL product |
| AMIFOSTINE product | PAMIDRONATE product |
| AMINOGLUTETHIMIDE product | PANRETIN product |
| ANAGRELIDE product | PARAPLATIN product |
| ANANDRON product | PEDIAPRED product |
| ANASTROZOLE product | Interferon Alfa-2b (PEG Interferon) |
| ARABINOSYLCYTOSINE product | PEGASPARGASE product |
| arabinosylcytosine (Ara-C) | |
| ARANESP product | PEGFILGRASTIM product |
| AREDIA product | PEG-INTRON product |
| ARIMIDEX product | PEG-L-asparaginase |
| AROMASIN product | Phenylalanine Mustard |
| Arsenic trioxide | PLATINOL product |
| ASPARAGINASE product | PLATINOL-AQ product |
| All-trans retinoic acid | PREDNISOLONE product |
| AVASTIN product | PREDNISONE product |
| Bacillus Calmette-Guerin | PRELONE product |
| bis-chloroethylnitrosourea (BCNU) | PROCARBAZINE product |
| BEVACIZUMAB product | PROCRIT product |
| BEXAROTENE product | PROLEUKIN product |
| | PROLIFEPROSPAN 20 WITH CARMUSTINE IMPLANT product |
| BICALUTAMIDE product | PURINETHOL product |
| BiCNU | RALOXIFENE product |
| BLENOXANE product | RHEUMATREX product |
| BLEOMYCIN product | RITUXAN product |
| BORTEZOMIB product | RITUXIMAB product |
| BUSULFAN product | ROFERON-A (interferon alfa-2a) product |
| BUSULFEX product | RUBEX product |
| Cetuximab (C225) | RUBIDOMYCIN HYDROCHLORIDE product |
| CALCIUM LEUCOVORIN product | SANDOSTATIN product |
| CAMPATH product | SANDOSTATIN LAR product |
| CAMPTOSAR product | SARGRAMOSTIM product |
| Camptothecin-11 (CPT-11) | SOLU-CORTEF product |
| CAPECITABINE product | SOLU-MEDROL product |
| CARAC product | Imatinib Mesylate (STI-571) |
| CARBOPLATIN product | STREPTOZOCIN product |
| CARMUSTINE product | TAMOXIFEN product |
| CARMUSTINE WAFER product | TARGRETIN product |
| CASODEX product | TAXOL product |
| Lomustine (CCNU) | TAXOTERE product |
| cis-diamminedichloroplatinum (CDDP) | TEMODAR product |
| CeeNU | TEMOZOLOMIDE product |
| CERUBIDINE product | TENIPOSIDE product |
| CETUXIMAB product | Thiotepa (TESPA) |
| CHLORAMBUCIL product | THALIDOMIDE product |
| CISPLATIN product | THALOMID product |
| CITROVORUM FACTOR product | THERACYS product |
| CLADRIBINE product | THIOGUANINE product |
| CORTISONE product | THIOGUANINE product TABLOID product |
| COSMEGEN product | THIOPHOSPHOAMIDE product |
| Cyclophosphamide | THIOPLEX product |
| CYTADREN product | THIOTEPA product |
| CYTARABINE product | TICE product |
| CYTARABINE LIPOSOMAL product | TOPOSAR product |
| CYTOSAR-U product | TOPOTECAN product |
| CYTOXAN product | TOREMIFENE product |
| DACARBAZINE product | TRASTUZUMAB product |
| DACTINOMYCIN product | TRETINOIN product |
| DARBEPOETIN ALFA product | TREXALL product |

TABLE 7-continued

Examples of Anti-Cancer Agents

| | |
|---|---|
| DAUNOMYCIN product | TRISENOX product |
| DAUNORUBICIN product | Thiotepa (TSPA) |
| DAUNORUBICIN HYDROCHLORIDE product | VELBAN product |
| DAUNORUBICIN LIPOSOMAL product | VELCADE product |
| DAUNOXOME product | VEPESID product |
| DECADRON product | VESANOID product |
| DELTA-CORTEF product | VIADUR product |
| DELTASONE product | Vinblastine (VLB) |
| DENILEUKIN DIFTITOX product | Vinblastine Sulfate |
| DEPOCYT product | VINCASAR PFS product |
| DEXAMETHASONE product | Vincristine (VCR) |
| DEXAMETHASONE ACETATE product | VINORELBINE product |
| DEXAMETHASONE SODIUM PHOSPHATE product | VINORELBINE TARTRATE product |
| DEXASONE product | VUMON product |
| DEXRAZOXANE product | XELODA product |
| Mitoxantrone (DHAD) | ZANOSAR product |
| Dacarbazine (DIC or DTIC) | ZEVALIN product |
| DIODEX product | ZINECARD product |
| DOCETAXEL product | ZOLADEX product |
| DOXIL product | ZOLEDRONIC ACID product |
| DOXORUBICIN product | ZOMETA product |
| DOXORUBICIN LIPOSOMAL product | GLIADEL WAFER product |
| DROXIA product | GLIVEC product |
| DTIC-Dome | Granulocyte-macrophage colony-stimulating factor (GM-CSF) |
| DURALONE product | GOSERELIN product |
| EFUDEX product | granulocyte-colony stimulating factor |
| ELIGARD product | Granulocyte macrophage colony stimulating factor |
| ELLENCE product | HALOTESTIN product |
| ELOXATIN product | HERCEPTIN product |
| ELSPAR product | HEXADROL product |
| EMCYT product | HEXALEN product |
| EPIRUBICIN product | Hexamethylmelamine |
| EPOETIN ALFA product | Hexamethylamine (HMM) |
| ERBITUX product | HYCAMTIN product |
| ERWINIA L-ASPARAGINASE product | HYDREA product |
| ESTRAMUSTINE product | HYDROCORT ACETATE product |
| ETHYOL product | HYDROCORTISONE product |
| ETOPOPHOS product | HYDROCORTISONE SODIUM PHOSPHATE product |
| Etoposide (VP-16) | HYDROCORTISONE SODIUM SUCCINATE product |
| Etoposide phosphate | HYDROCORTONE PHOSPHATE product |
| EULEXIN product | HYDROXYUREA product |
| EVISTA product | IBRITUMOMAB product |
| EXEMESTANE product | IBRITUMOMAB TIUXETAN product |
| FARESTON product | IDAMYCIN product |
| FASLODEX product | IDARUBICIN product |
| FEMARA product | IFEX product |
| FILGRASTIM product | IFOSFAMIDE product |
| FLOXURIDINE product | IMATINIB MESYLATE product |
| FLUDARA product | IMIDAZOLE CARBOXAMIDE product |
| FLUDARABINE product | Interferon alfa (IFN-alpha) |
| FLUOROPLEX product | Interferon Alfa-2b (PEG conjugate) |
| FLUOROURACIL product | Interleukin-2 (IL-2) |
| FLUOROURACIL (cream) product | Interleukin-11 (IL-11) |
| FLUOXYMESTERONE product | Intron A (interferon alfa-2b) |
| FLUTAMIDE product | LEUCOVORIN product |
| Folinic Acid | LEUKERAN product |
| Floxuridine (FUDR) | LEUKINE product |
| FULVESTRANT product | LEUPROLIDE product |
| Granulocyte-colony stimulating factor (G-CSF) | Leurocristine (LCR) |
| GEFITINIB product | LEUSTATIN product |
| GEMCITABINE product | Liposomal cytarabine (Liposomal Ara-C) |
| GEMTUZUMAB OZOGAMICIN product | Liquid Pred |
| GEMZAR product | LOMUSTINE product |
| GLEEVEC product | L-SARCOLYSIN product |
| LUPRON product | METICORTEN product |
| LUPRON DEPOT product | Mitomycin (MTC) |
| MATULANE product | Mitomycin-C |

TABLE 7-continued

Examples of Anti-Cancer Agents

| | |
|---|---|
| MAXIDEX product | MITOXANTRONE product |
| MECHLORETHAMINE product | M-PREDNISOL product |
| MECHLORETHAMINE HYDROCHLORINE product | MUSTARGEN product |
| MEDRALONE product | MUSTINE product |
| MEDROL product | MUTAMYCIN product |
| MEGACE product | MYLERAN product |
| MEGESTROL product | IRESSA product |
| MEGESTROL ACETATE product | IRINOTECAN product |
| Melphalan (L-PAM) | ISOTRETINOIN product |
| MERCAPTOPURINE product | KIDROLASE product |
| MESNA product | LANACORT product |
| MESNEX product | L-asparaginase |
| Methotrexate (MTX) | |
| Methotrexate Sodium | |
| Methylprednisolone | |

Co-administration can be carried out simultaneously (in the same or separate formulations) or consecutively with the additional agent administered before and/or after one or more compounds disclosed herein. Furthermore, the compounds disclosed herein can be administered to a subject as adjuvant therapy. For example, one or more HhP inhibitors disclosed herein can be administered to a subject in conjunction with one or more chemotherapeutic agents.

Thus, the compounds disclosed herein, whether administered separately, or as a pharmaceutical composition, can include various other components as additives. Examples of acceptable components or adjuncts which can be employed in relevant circumstances include antioxidants, free radical scavenging agents, peptides, growth factors, antibiotics, bacteriostatic agents, immunosuppressives, anticoagulants, buffering agents, anti-inflammatory agents, anti-angiogenics, anti-pyretics, time-release binders, anesthetics, steroids, and corticosteroids. Such components can provide additional therapeutic benefit, act to affect the therapeutic action of the compounds disclosed herein, or act towards preventing any potential side effects which may be posed as a result of administration of these agents. The components disclosed herein can be conjugated to a therapeutic agent, as well.

In some embodiments, two or more HhP inhibitors are administered to the subject simultaneously in the same or different formulations, or sequentially. The HhP inhibitors may act on the same member of the HhP, whether in similar or distinct manners, or on different members of the pathway. For example, it may be desirable to administer HhP inhibitors that inhibit the HhP pathway at different points in the pathway or by different mechanisms.

Additional agents that can be co-administered in the same or as a separate formulation with the HhP inhibitors disclosed herein, include those that modify a given biological response, such as immunomodulators. The additional agents may be, for example, small molecules, polypeptides (proteins, peptides, or antibodies or antibody fragments), or nucleic acids (encoding polypeptides or inhibitory nucleic acids such as antisense oligonucleotides or interfering RNA). For example, proteins such as tumor necrosis factor (TNF), interferon (such as alpha-interferon and beta-interferon), nerve growth factor (NGF), platelet derived growth factor (PDGF), and tissue plasminogen activator can be administered. Biological response modifiers, such as lymphokines, interleukins (such as interleukin-1 (IL-1), interleukin-2 (IL-2), and interleukin-6 (IL-6)), granulocyte macrophage colony stimulating factor (GM-CSF), granulocyte colony stimulating factor (G-CSF), or other growth factors can be administered. In one embodiment, the methods and compositions of the invention incorporate one or more anti-cancer agents, such as cytotoxic agents, chemotherapeutic agents, anti-signaling agents, and anti-angiogenic agents.

As used herein, the term "anti-cancer agent" refers to a substance (e.g., chemotherapeutic compounds and/or molecular therapeutic compounds) or treatment (e.g., radiation therapy, surgical intervention) that inhibits the function of cancer cells, inhibits their formation, and/or causes their destruction in vitro or in vivo. Examples include, but are not limited to, cytotoxic agents (e.g., 5-fluorouracil, TAXOL), chemotherapeutic agents, and anti-signaling agents (e.g., the PI3K inhibitor LY). Some anti-cancer agents can be characterized as belonging to two or more of these categories (e.g., a compound that is both a cytotoxic agent and a chemotherapeutic agent). In one embodiment, the anti-cancer agent administered before, during, or after administration of the HhP inhibitor is a different HhP inhibitor. Anti-cancer agents include but are not limited to those listed in Table 7.

As used herein, the term "cytotoxic agent" refers to a substance that inhibits or prevents the function of cells and/or causes destruction of cells in vitro and/or in vivo. The term is intended to include radioactive isotopes (e.g., At211, I131, I125, Y90, Re186, Re188, Sm153, Bi212, P32, and radioactive isotopes of Lu), chemotherapeutic agents, toxins such as small molecule toxins or enzymatically active toxins of bacterial, fungal, plant or animal origin, and antibodies, including fragments and/or variants thereof.

As used herein, the term "chemotherapeutic agent" is a chemical compound useful in the treatment of cancer, such as, for example, taxanes, e.g., paclitaxel (TAXOL, BRISTOL-MYERS SQUIBB Oncology, Princeton, N.J.) and doxetaxel (TAXOTERE, Rhone-Poulenc Rorer, Antony, France), chlorambucil, vincristine, vinblastine, anti-estrogens including for example tamoxifen, raloxifene, aromatase inhibiting 4(5)-imidazoles, 4-hydroxytamoxifen, trioxifene, keoxifene, LY117018, onapristone, and toremifene (FARESTON, GTx, Memphis, TN), and anti-androgens such as flutamide, nilutamide, bicalutamide, leuprolide, and goserelin, etc. Examples of chemotherapeutic agents that may be used in conjunction with the HhP inhibitors disclosed herein are listed in Table 7. In some embodiments, the chemotherapeutic agent is one or more anthracyclines. Anthracyclines are a family of chemotherapy drugs that are also antibiotics. The anthracyclines act to prevent cell division by disrupting the structure of the DNA and terminate its function by: (1) intercalating into the base pairs in the DNA minor grooves; and (2) causing free radical damage of the ribose in the DNA. The anthracyclines are frequently used in leukemia therapy. Examples of anthracyclines include daunorubicin (CERUBIDINE), doxorubicin (ADRIAMYCIN, RUBEX), epirubicin (ELLENCE, PHARMORUBICIN), and idarubicin (IDAMYCIN).

In some embodiments, the anti-cancer agent is a taxane, such as paclitaxel, docetaxel, cabazitaxel, lorataxel, ortataxel, tesetaxel, milataxel, taxoprexin, opaxio, hyaluronic acid-taxane conjugate, hyaluronidase-taxane conjugate, or poly(glutamyl-glutamate)-taxane conjugate.

In some embodiments, the anti-cancer agent is a platinum-based agent (coordination complex of platinum). As a class, platinum-based agents are believed to act by causing crosslinking of DNA as a monoadduct, interstrand crosslinks, intrastrand crosslinks, or DNA protein crosslinks, resulting in inhibited DNA repair. In some embodiments, the platinum-based agent is carboplatin, cisplatin, oxaliplatin, satraplatin, picoplatin, nedaplatin, or triplatin.

The invention is further illustrated by the following non-limiting examples.

EXAMPLES

The following abbreviations are used: ITZ, Itraconazole; Hh, Hedgehog; BCC, basal cell carcinoma; MB, medulloblastoma; Gli, glioblastoma associated oncogene; Smo, Smoothened; SAR, structure-activity relationship; EDCI, 1-ethyl-3-(3-dimethylaminopropyl)carbodiimide; DMAP, 4-dimethylaminopyridine; Boc, tert-butyloxycarboryl; TMSOTf, trimethylsilyl trifluoromethanesulfonate; HLMs, human liver microsomes; MEFs, mouse embryonic fibroblasts; MetID, metabolic identification.

Example 1: Structure-Activity Relationship Study

The structure of ITZ can be separated into three general regions, the dioxolane region, the central diphenylpiperazine core, and the triazolone/side chain region. Structure-activity relationships (SARs) for the ITZ scaffold with respect to its anti-Hh activity was conducted.

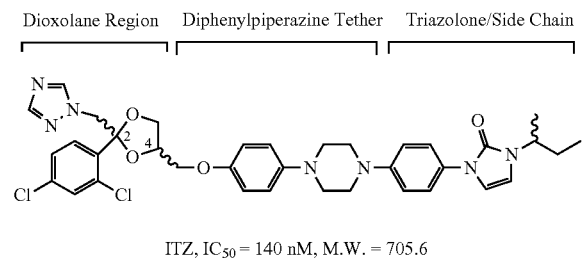

ITZ, IC$_{50}$ = 140 nM, M.W. = 705.6

In previous studies, it was demonstrated that the stereochemistry around the dioxolane was important for potent Hh inhibition. Analogues with the 4R orientation were significantly more active than the comparable 4S analogues. It was also demonstrated that the triazole ring is not required for ITZ-mediated Hh inhibition. Recent SAR suggests that modification in the triazolone/side chain area is well-tolerated. Potent compounds have been discovered through side chain group modification, (hetero)cycle replacement, and even direct truncation of the triazolone ring. In the current study, the simplified triazolone analogue 2, which retained the potent anti-Hh activity and a decreased molecular weight compared to ITZ, was used as a lead structure. SAR was probed for the tether region adjacent to the triazolone by directly appending the aromatic functional group to the central piperazine through an amide bond. These modifications would also result in analogues with reduced molecular weight.

Following previously reported procedures, 1-(4-hydroxyphenyl)piperazine 24 and the stereochemically defined dioxolane regions 25 (2S,4R-cis) and its enantiomer (2R,4R-trans) were synthesized. As shown in Scheme 1 (FIG. 1), intermediate 24 was coupled with an appropriate carboxylic acid in the presence of the condensing agent 1-ethyl-3-(3-dimethylaminopropyl)carbodiimide (EDCI) and 4-dimethylaminopyridine (DMAP) at room temperature. Selective addition to the piperazine secondary amine was observed for the majority of the analogues. Amide intermediates were then coupled with dioxolane 25 (2S,4R-cis) under alkaline conditions to afford analogues 5-8, 15 and 16. The analogue bearing a para-nitro (8) was reduced to the corresponding aniline 9 by palladium on charcoal. For analogues bearing an allyl group at the terminal phenol, free phenols were protected as allyloxy before coupling with 24. By treating with sodium borohydride and iodine, the allyl group was removed under a translocation mechanism, to give phenols 3, 4, 10-14, and 17. Annotated structures for the final analogues are listed in Table 1.

TABLE 1

Anti-Hh Activity for ITZ and Analogues[a]

| Cmpd | R | ASZ001, IC$_{50}$ (μM) |
|---|---|---|
| ITZ | — | 0.14 ± 0.02 |
| 2 | — | 0.16 ± 0.03 |
| 3 | ![](3-OH-phenyl ketone) | 0.26 ± 0.08 |
| 4 | ![](4-OH-phenyl ketone) | 0.58 ± 0.02 |

TABLE 1-continued
Anti-Hh Activity for ITZ and Analogues[a]
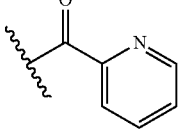
3-19
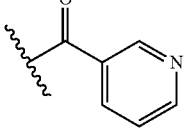
20
| Cmpd | R | ASZ001, IC$_{50}$ (μM) |
|---|---|---|
| 5 | 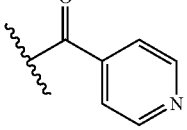 | 1.42 ± 0.30 |
| 6 | 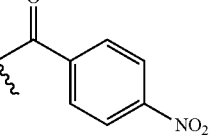 | 1.30 ± 0.31 |
| 7 | 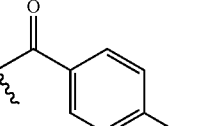 | 0.57 ± 0.11 |
| 8 | 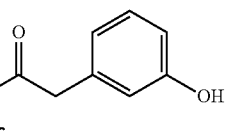 | 0.16 ± 0.02 |
| 9 | 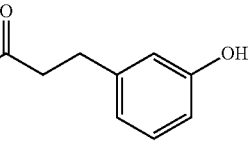 | 0.28 ± 0.11 |
| 10 | 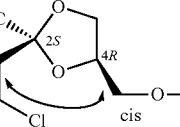 | 0.38 ± 0.04 |
| 11 | 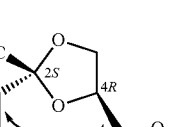 | 0.081 ± 0.022 |
TABLE 1-continued
Anti-Hh Activity for ITZ and Analogues[a]
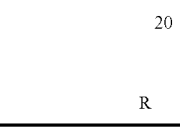
3-19
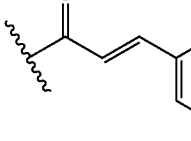
20
| Cmpd | R | ASZ001, IC$_{50}$ (μM) |
|---|---|---|
| 12 | 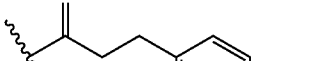 | 0.22 ± 0.03 |
| 13 | 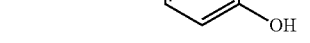 | 0.26 ± 0.03 |
| 14 | 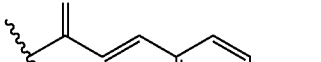 | 0.36 ± 0.05 |
| 15 | 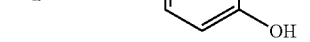 | 0.23 ± 0.16 |
| 16 |  | 0.46 ± 0.03 |
| 17 |  | 0.47 ± 0.11 |
| 18 |  | 0.12 ± 0.01 |

TABLE 1-continued

Anti-Hh Activity for ITZ and Analogues[a]

[Structures shown: cis-dioxolane compound 3-19 and trans-dioxolane compound 20, both with 2S,4R configuration, bearing dichlorophenyl and phenylpiperazinyl-R substituents]

| Cmpd | R | ASZ001, IC$_{50}$ (μM) |
|---|---|---|
| 19 | [acyl hydrazone with 4-OH phenyl] | 0.96 ± 0.15 |
| 20 | [acyl hydrazone with 3-OH phenyl] | 0.58 ± 0.07 |

[a]IC$_{50}$ values represent the Mean ± SEM of at least two separate experiments performed in triplicate.

For the analogues bearing a hydrazide, intermediate 24 was first coupled with phenyl chloroformate under alkaline conditions. The resulting amide 26 was coupled with dioxolane 25, followed by refluxing with hydrazine hydrate in 1,4-dioxane to afford hydrazide 27. The hydrazide terminal was later coupled with appropriate benzaldehydes to give final phenols 18 and 19. When 26 coupled with dioxolane in 2R,4R-trans configuration, followed by the same hydrazinolysis and condensation procedures, hydrazide 20 was synthesized (Structure in Table 1).

As noted above, previous SAR studies for the ITZ scaffold demonstrated that the triazolone/side chain region of ITZ is amenable to modification. In order to continue SAR exploration of this region of the scaffold, efforts sought to synthesize and evaluate analogues that continue the scaffold truncation that was previously probed by removing the phenyl ring on the 'right side' of the scaffold and directly appending the 3-phenolic carboxylic acid of 2 to the piperazine amine to provide analogue 3. This analogue was evaluated for its ability to decrease Gli1 mRNA expression in the Hh-dependent murine BCC cell line ASZ001. Analogue 3 demonstrated comparable anti-Hh activity compared to 2 (IC$_{50}$ values=0.26 μM and 0.16 μM, respectively) verifying that this series of compounds retains potent Hh inhibition and encouraging us to synthesize additional analogues that incorporate the 4-phenylpiperazinyl amide.

To further probe SAR for functionality on the aromatic moiety, aromatic carboxylic acids with a range of substitutions 4-9 were synthesized and evaluated. Analogue 4 (IC$_{50}$=0.58 μM), with the phenol in the para-position, was less active than 3. Replacing the phenol with pyridines resulted in compounds 5-7 with reduced anti-Hh activity, with the 4-pyridine (7, IC$_{50}$=0.57 μM) representing the best in this small collection. Replacing the phenol with a nitro group (8, IC$_{50}$=0.16 μM) demonstrated improved activity compared to 3 and equivalent activity to the lead 2. Reduction of the nitro to the 4-aniline (9, IC$_{50}$=0.28 μM) resulted in a modest decrease in activity.

Next, efforts sought to increase the distance between the amide bond and the aromatic moiety to understand the optimal distance between these functional groups for potent Hh inhibition (10-20). The addition of a single methylene unit (10) resulted in a slight decrease in Hh inhibition compared to 2; however, the increase to two methylenes (11, IC$_{50}$=0.081 μM) significantly enhanced the anti-Hh activity of the scaffold. Constraining the linker as a trans-alkene 12 resulted in an approximately 3-fold loss in Hh inhibitory activity, a trend that was also present when the phenol was located in the 4-position (13 and 14). Deletion of the phenol (15, IC$_{50}$=0.23 μM) or masking it as the methoxy (16, IC$_{50}$=0.46 μM) decreased activity. Due to the commercial availability of 3-hydroxybenzenebutanoic acid, analogue 17 with a propyl linker, but a para-phenol tail was synthesized and evaluated. A decrease in activity was observed with the extended linker in 17 (IC$_{50}$=0.47 μM).

Finally, efforts were sought to vary the chemical composition of the linker by introducing heteroatoms; therefore, a small collection of hydrazide-containing analogues was synthesized and evaluated. Analogue 18 (IC$_{50}$=0.12 μM) demonstrated superior Hh inhibitory activity to 2 and ITZ, once again suggesting this region of the scaffold is amenable to modification. Analogue 19 (IC$_{50}$=0.96 μM), which incorporates the para-phenol, was less active compared to the analogous meta-phenol 18. Previous truncated ITZ analogue series identified the cis-dioxolane as the preferred orientation for these compounds; the 2R,4R-trans-dioxolane hydrazide was synthesized and evaluated to determine whether this trend is replicated for the current analogues. This analogue, 20 (IC$_{50}$=0.58 μM), was approximately 5-fold less active, highlighting the effect the cis-orientation around the dioxolane ring has for this series of compounds.

In addition to determining whether significant truncation to the triazolone/side chain region results in compounds that retain potent Hh inhibition, a key reason for the preparation of these analogues was to evaluate whether truncation also provides compounds with improved solubility and/or stability. Several representative compounds (3, 10, 11, and 15) were chosen to evaluate these two parameters for this series of analogues. All tested analogues did not improve the overall solubility as each analogue was less soluble than ITZ at both pH 4.0 and pH 7.4 (Table 2). Overall, the analogues were less stable than ITZ in human liver microsomes (HLMs) and demonstrated predicted intrinsic clearance levels significantly higher than the parent compound.

TABLE 2

In Vitro Pharmacokinetic Data

| | Solubility, PBS (μM) | | Microsomal Stability | |
|---|---|---|---|---|
| Cmpd | pH 4.0 | pH 7.4 | T$_{1/2}$ (min) | Cl$_{int}$ (μl/min/mg) |
| ITZ | — | 0.80 | 27.0 ± 6.2 | 25.2 ± 3.1 |
| 2 | — | 0.02 | 19.9 ± 0.6 | 34.7 ± 1.0 |
| 3 | 0.31 | 0.17 | 15.9 ± 0.2 | 43 ± 0.6 |
| 10 | 0.25 | 0.13 | 20.4 ± 0.4 | 33.9 ± 0.6 |
| 11 | 0.13 | 0.03 | 3.2 ± 0.1 | 218 ± 9.7 |
| 19 | 0.05 | 0.02 | 11.4 ± 0.2 | 60.0 ± 1.1 |

Analogue 11 was the least stable ($T_{1/2}$=3.2 mins). The only structural difference between 11 and 10, which was approximately 6.5-fold more stable, is the addition of a single methylene between the amide and the phenol-substituted benzene ring. In order to more fully determine how the additional methylene influences stability, follow-up metabolic identification (MetID) studies were performed in HLMs for both 10 and 11.

Incubation of 11 with HLMs resulted in the identification of two primary metabolites. Peak #1 indicated the metabolite (21, 30.09%) had undergone hydrolysis of the amide bond, an unexpected metabolite considering amides are generally deemed as a reliable tether and exist in many marketed drugs. The second major metabolite (Peak #2, 15.94%) resulted from single oxidation to the 3-hydroxyphenethyl region. While the exact location of the hydroxyl/phenol in metabolite #2 could not be conclusively determined; CYP-mediated oxidation at the para-phenyl position is well-documented. Based on the measured m/z+ peaks, it is presumed that 3,4-bis-phenol 22 is the most likely structure for metabolite #2.

For analogue 10, MetID studies suggested this analogue was involved in more complicated metabolic pathways, including hydrolysis, hydrogenation, de-oxidation, and then oxidation. Interestingly, no direct oxidation to the phenol region was observed in the metabolites of 10. The difference in metabolic pathways for 10 and 11 may explain the difference in HLM stability. Of note, 21 was the primary metabolite for both 10 and 11, indicating the N-piperazine amide bond may be a metabolic location for the amide ITZ analogues.

Figure 2:
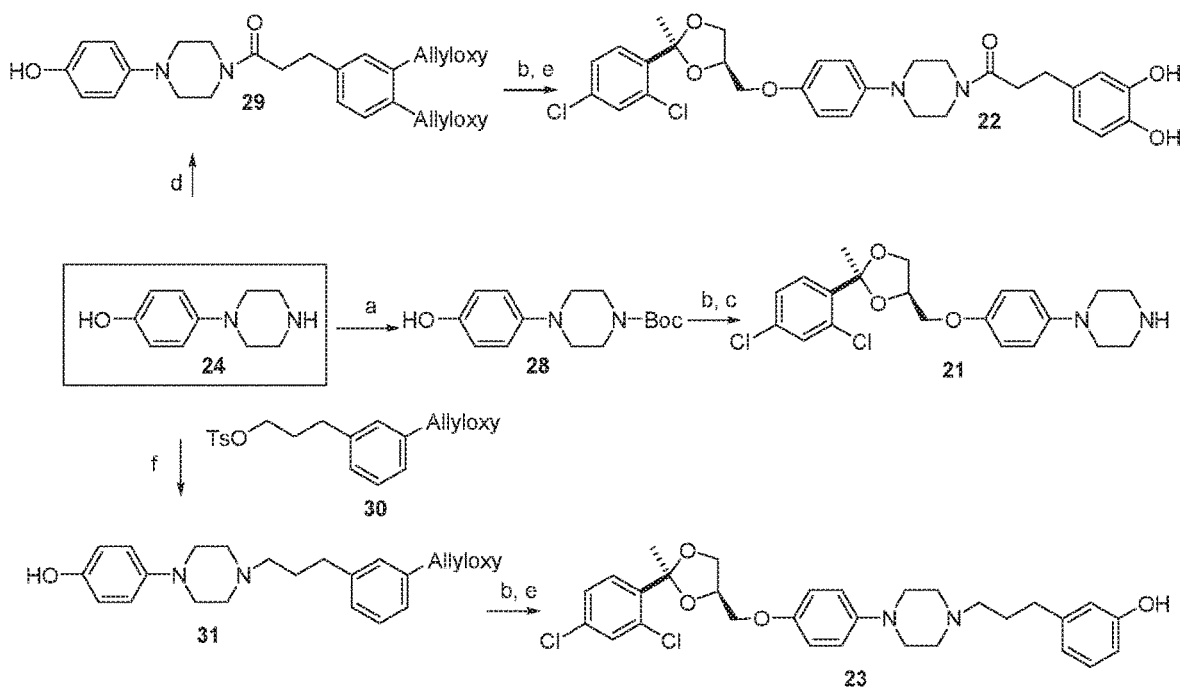
FIG. 2 is Scheme 2 describing the synthesis of metabolite compounds.

Based on the results of the metabolism studies, follow-up experiments were focused in two directions. First, the metabolites (21 and 22) of the most active analogue 11 were synthesized and evaluated to determine if they retain potent anti-Hh activity. In parallel, efforts sought to enhance the stability of 11 by eliminating the common metabolic soft spot, which led to the design of saturated analogue 23. The syntheses are described in Scheme 2 (FIG. 2). For the analogue truncated at the piperazine, selective protection of 24 as the secondary Boc amine afforded phenol 28. After coupling with dioxolane 25, Boc removal was performed by stirring with TMSOTf under alkaline conditions to give the free piperazine 21. Starting with 3,4-bis-allyloxybenzenepropanoic acid and using the same procedures as in Scheme 1 (FIG. 1), bis-phenol 22 was synthesized. For the des-amide analogue, intermediate 30 was synthesized after reduction and tosylation. Selective addition to the piperazine amine of 24 was observed by heating in the presence of 30 to give phenol 31. Dioxolane coupling and final deprotection were performed under the same conditions as described earlier to give amine 23.

Both metabolites retain potent inhibition of Hh signaling (Table 3). Analogue 22 ($IC_{50}$=0.089 µM), which incorporates the bis-phenol, showed equivalent activity to the parent 11; whereas the truncated piperazine 21 ($IC_{50}$=0.022 µM) was more potent than 11. Metabolite 23 was significantly less active than 11 or the other two metabolites ($IC_{50}$=0.87 µM). In C3H10T1/2 cells, an Hh-dependent mouse embryonic fibroblasts (MEFs), 11 and 21 were also more potent than ITZ when using endogenous oxysterols as the Hh pathway activator (Table 4). Based on the improved activity of the truncated analogue 21, which contains approximately half of the intact ITZ scaffold, this analogue was also evaluated in Sufu$^{-/-}$ mouse embryonic fibroblasts (MEFs) to determine whether Smo is still the most likely target of the metabolite. The anti-Hh activity of 21 was completely abolished in this cell line, suggesting 21 (and ITZ) is functioning upstream of Sufu, most likely at the level of Smo.

TABLE 3

Anti-Hh activity$^a$, and Pharmacokinetic Data for Metabolite-based ITZ Analogues 21-23

| Cmpd | R | ASZ001, $IC_{50}$ (µM) | Solubility, PBS (µM) pH 4.0 | pH 7.4 | Microsomal Stability $T_{1/2}$ (min) | Clint (µl/min/mg) |
|---|---|---|---|---|---|---|
| 21 | —H | 0.022 ± 0.011 | 169.3 | 11.7 | 50.7 | 13.7 ± 0.4 |
| 22 | (3,4-dihydroxyphenyl propanoyl) | 0.089 ± 0.06 | — | 0.84 | 6.6 ± 0.1 | 104.7 ± 0.1 |
| 23 | (3-hydroxyphenyl propyl) | 0.87 ± 0.6 | 0.13 | 0.02 | 14.0 ± 0.2 | 50.0 ± 0.8 |

TABLE 3-continued

Anti-Hh activity[a], and Pharmacokinetic Data for Metabolite-based ITZ Analogues

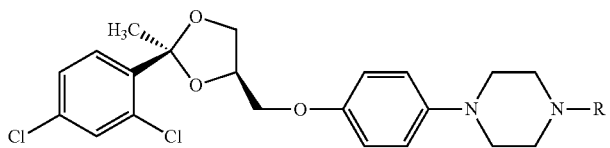

21-23

| Cmpd | R | ASZ001, IC$_{50}$ (µM) | Solubility, PBS (µM) pH 4.0 | pH 7.4 | T$_{1/2}$ (min) | Microsomal Stability Cl$_{int}$ (µl/min/mg) |
|---|---|---|---|---|---|---|

[a]IC$_{50}$ values represent the Mean ± SEM of at least two separate experiments performed in triplicate.

TABLE 4

Gli1 mRNA down-regulation for select analogues in the Hh-dependent mouse embryonic fibro-blast C3H10T1/2 cell line.[a]

| | C3H10T1/2, IC$_{50}$ (µM)[a] | |
|---|---|---|
| Cmpd | SHh | OHCs |
| Vismodegib | 0.022 ± 0.02 | 0.010 ± 0.012 |
| ITZ | 0.24 ± 0.2 | 5.9 ± 1.3 |
| 11 | 0.17 ± 0.09 | 0.65 ± 0.07 |
| 21 | 1.53 ± 0.2 | 2.7 ± 0.2 |

[a]IC$_{50}$ values represent the Mean ± SEM of at least two separate experiments performed in triplicate. Gli1 expression in C3H10T1/2 cells was up-regulated by either recombinant mouse sonic hedgehog (SHh) or oxysterols (OHCs).

The activity for both metabolites prompted a study of their PK profile (Table 3). Analogue 21 demonstrated improved stability ($T_{1/2}$=50.7 mins) compared to parent compound 11. The stabilities of compound 22 and 23 ($T_{1/2}$=6.6 mins and 14.0 mins, respectively) were minimally improved compared to 11. In addition, significant improvements in solubility at pH 7.4 and pH 4.0 compared to ITZ were found for analogue 21. Finally, the general toxicity of compounds 11 and 21 were evaluated by exploring their anti-proliferative activity in HC-04 cells, a human hepatocyte-derived cell line that abundantly expresses drug metabolizing enzymes (Table 5). Both compounds demonstrated moderate toxicity (21, GI$_{50}$=27.3 µM; 11, GI$_{50}$=13.18 µM) in the HC-04 cells, indicating their anti-Hh activity is not a result of broad toxicity and further highlighting their potential as selective anti-cancer therapeutics.

TABLE 5

Anti-proliferative Activity for Select Analogues in HC-04 cells.

| Cmpd | HC-04, GI$_{50}$ (µM)[a] |
|---|---|
| Vismodegib | >100 |
| ITZ | >50 |
| 11 | 13.2 ± 0.5 |
| 21 | 27.3 ± 1.5 |

[a]GI$_{50}$ values represent the Mean ± SEM of at least three separate experiments performed in quadruplicate.

In conclusion, a series of ITZ analogues have been that were developed focused on continued truncation of the 'right-side' of the scaffold. Analogue 11 represents the most potent analogue in the first-round SAR study, with an IC$_{50}$ value of 81 nM, approximately two-fold more potent than lead 2 and ITZ. Initial SAR suggested a proper length linker with certain flexibility leads to potent anti-Hh activity. In addition, a stereochemically defined dioxolane cap (2S,4R-cis) and a para-phenol tail are also important for the anti-Hh activity of 11. A metabolite of compound 11, analogue 21, demonstrated improved Hh pathway inhibition, increased stability and enhanced water solubility. Moreover, the molecular weight of 21 (MW=423.3) is significantly decreased compared to ITZ (MW=705.6) establishing analogue 21 as a promising candidate for further in vitro and in vivo analysis. Overall, these studies provide clear rationale for continued modification to the central core of the scaffold as a practical design strategy to retain potent anti-Hh activity while improving the overall drug-like properties of the scaffold.

Experimental Section

PBS Solubility and Metabolic Stability:

These experiments were carried out following the procedures previously reported (Wen et al. "Structure—activity relationship studies of vitamin D3 analogues containing an ether or thioether linker as Hedgehog pathway inhibitors." *ChemMedChem* 2018, 13, 748-753).

Metabolite Identification:

The metabolite identification assay was performed as a contract service by Pharmaron Inc., and followed their standard procedures. Briefly, each compound (10 µM) was incubated with human liver microsomes (HLMs, 1 mg/mL, Corning 452117) and co-factor NADPH (2 mM), in a total volume of 200 µL, for 60 mM at 37° C. Incubations were quenched with 3 volumes of acetonitrile followed by centrifugation for 15 mM at 16,000 g. The supernatant was then analyzed by LC-MS/MS.

Chemistry

All chemicals were purchased from Sigma-Aldrich or Fisher Scientific unless other notified. Reactions were monitored by thin layer chromatography (G/UV254). Column chromatography silica gel was purchased from Sorbent Technologies. NMR data was performed on a Bruker AV-500 MHz spectrometer and analysis with MestReNova software. HRMS data was analyzed at the Mass Spectrometry Facility at the University of Connecticut. All yields reported are non-optimized one-time yields. All final analogues evaluated in the biological assays were greater than 90% purity. Purity was determined by injecting 20 µL of a 1 mg/mL solution each ITZ analogue dissolved in HPLC-grade MeCN into an Agilent Manual FL-Injection Valve (600 bar) on an Agilent 1100/1200 Series HPLC equipped with an Agilent Eclipse Plus C18 (4.6×100 mm) column and Agilent 1100 Series Photodiode Array Detector. The mobile phase was composed of 65% MeCN/35% H$_2$O (v/v). All analogues were run at a flow rate of 1.0 mL/min for 10 mM to 20 mM and purity was assessed at 254 nm.

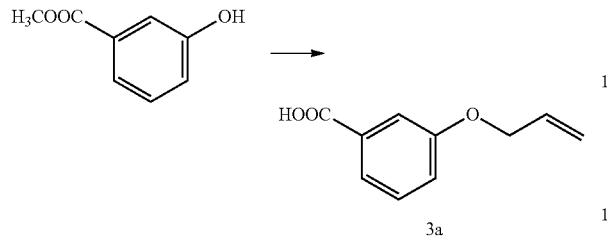

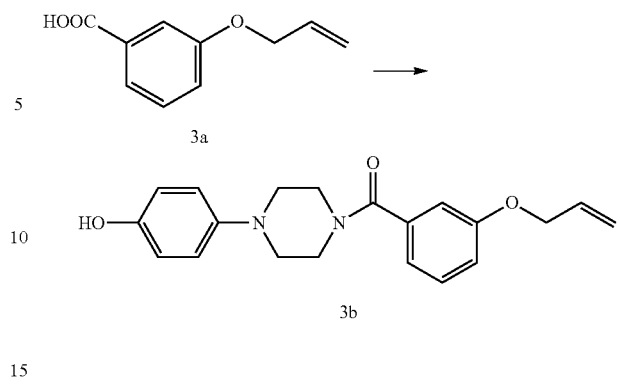

General Allyl Protection Method. Exemplified by 3-(Allyloxy)Benzoic Acid (3a)

To a solution of methyl 3-(hydroxyl)benzoate (2.0 g, 13.14 mmol) in acetonitrile (60 mL), was added potassium carbonate (2.2 g, 15.77 mmol), and allyl bromide (1.6 g, 15.77 mmol) and the mixture was refluxed for 12 hr. After cooling to room temperature, the mixture was partitioned between ethyl acetate (100 mL) and water (100 mL). The organic layer was subsequently hydrolyzed into product under alkaline condition and the pH of the mixture was adjusted to 2-3 with dropwise addition of 0.5 N HCl in an ice-cooled bath. The mixture was extracted with ethyl acetate (100 mL) and the organic layer was dried over sodium sulfate. The crude product was obtained as a white solid after solvent removal and utilized without further purification. Yield: 92%. $^1$H NMR (500 MHz, DMSO-d$_6$) δ 12.96 (s, 1H), 7.55 (d, J=7.7 Hz, 1H), 7.47 (dd, J=2.6, 1.5 Hz, 1H), 7.42 (t, J=7.9 Hz, 1H), 7.22 (dd, J=8.2, 2.7 Hz, 1H), 6.06 (ddt, J=17.3, 10.4, 5.1 Hz, 1H), 5.46-5.26 (m, 2H), 4.64 (d, J=5.1 Hz, 2H); $^{13}$C NMR (126 MHz, DMSO) δ 167.55, 158.62, 133.93, 132.66, 130.16, 122.15, 119.99, 117.97, 115.28, 68.77.

General Amide Coupling Method. Exemplified by 3-Allyloxy-N-(4-(4-Hydroxyphenyl)Piperazin-1-yl) Benzamide (3b)

To a solution of 3a (0.5 g, 2.81 mmol) in dimethylformamide (DMF), was added 5 drops of TEA. 1-Ethyl-3-(3-dimethylaminopropyl)carbodiimide (0.5 g, 3.37 mmol) and 4-dimethylaminopyridine (0.4 g, 3.37 mmol). After 15 min of stirring, 1-(4-hydroxyphenyl)piperazine (24, 0.6 g, 3.37 mmol) was added to the mixture, which was stirred for 12 hr at room temperature. The mixture was partitioned between ethyl acetate (100 mL) and brine (100 mL). The organic layer was washed with brine (100 mL×2). The crude product was purified by column chromatography (SiO$_2$, 50% EtOAc in hexanes) to give 3b as a colorless oil (0.58 g, 61%). $^1$H NMR (500 MHz, DMSO-d$_6$) δ 8.88 (s, 1H), 7.38 (t, J=7.8 Hz, 1H), 7.05 (d, J=8.3 Hz, 1H), 7.00-6.95 (m, 2H), 6.82 (d, J=8.4 Hz, 2H), 6.68 (d, J=7.4 Hz, 2H), 6.06 (dddd, J=17.1, 9.7, 5.7, 3.6 Hz, 1H), 5.35 (dd, J=67.0, 13.9 Hz, 2H), 4.63 (dd, J=5.5, 3.0 Hz, 2H), 3.60 (d, J=148.3 Hz, 4H), 2.98 (d, J=30.8 Hz, 4H); $^{13}$C NMR (126 MHz, DMSO) δ 169.05, 158.47, 151.89, 144.34, 137.77, 134.01, 130.16, 119.55, 118.99 (2C), 118.02, 116.39 (2C), 115.95, 113.43, 68.75, 50.90, 50.83, 47.68, 42.10.

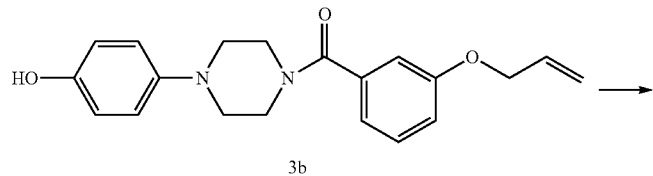

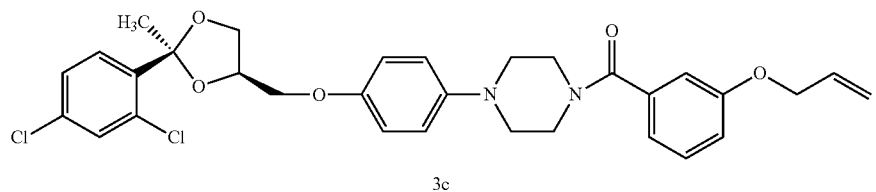

General Ether Coupling Method. Exemplified by 3-Allyloxy-N-(4-(4-(((2S,4R)-2-(2,4-Dichlorophenyl)-2-Methyl-1,3-Dioxolan-4-yl)Methoxy)Phenyl)Piperazin-1-yl)Benzamide (3c). To a solution of 3b (0.2 g, 0.34 mmol) in DMF, was added tosylated dioxolane 25 (0.15 g, 0.34 mmol) and cesium carbonate (0.14 g, 0.41 mmol). The mixture was heated to 60° C. for 4 h. After the reaction was cooled down to room temperature, the mixture was partitioned between ethyl acetate (100 mL) and brine (100 mL). The organic layer was washed with brine (100 mL×2). The crude product was purified by column chromatography (SiO$_2$, 40% EtOAc in hexanes) to give the 3c as a colorless oil (0.18 g, 93%). $^1$H NMR (500 MHz, CDCl$_3$) δ 7.66 (t, J=8.8 Hz, 1H), 7.44 (dd, J=16.8, 2.1 Hz, 1H), 7.38-7.35 (m, 1H), 7.23 (dd, J=8.4, 2.1 Hz, 1H), 7.07-7.00 (m, 3H), 6.93 (d, J=3.9 Hz, 1H), 6.89 (d, J=9.1 Hz, 2H), 6.76 (d, J=9.0 Hz, 2H), 6.09 (ddt, J=17.2, 10.6, 5.3 Hz, 1H), 5.52-5.26 (m, 2H), 4.67-4.62 (m, 1H), 4.60 (dt, J=5.2, 1.6 Hz, 2H), 4.34 (dd, J=8.6, 6.4 Hz, 1H), 4.08-4.01 (m, 1H), 3.98 (s, 2H), 3.81-3.74 (m, 2H), 3.62 (s, 2H), 3.10 (d, J=57.5 Hz, 4H), 1.82 (s, 3H); $^{13}$C NMR (126 MHz, CDCl$_3$) δ 172.25, 158.58, 153.01, 146.30, 136.88, 132.84, 132.71, 130.88, 129.60, 128.45, 126.60, 119.28, 118.70 (2C), 117.83, 116.30, 115.40, 115.16 (2C), 113.27, 109.99, 109.08, 74.94, 68.86, 68.29, 67.25, 50.85, 50.74, 46.78, 42.63, 25.80.

51.08, 51.02, 47.52, 42.29, 25.89; HRMS: m/z calcd. for C$_{28}$H$_{29}$Cl$_2$N$_2$O$_5$ [MH]$^+$, 543.1448; Found: 543.1459; HPLC purity 92.02%, t$_r$=3.47 min.

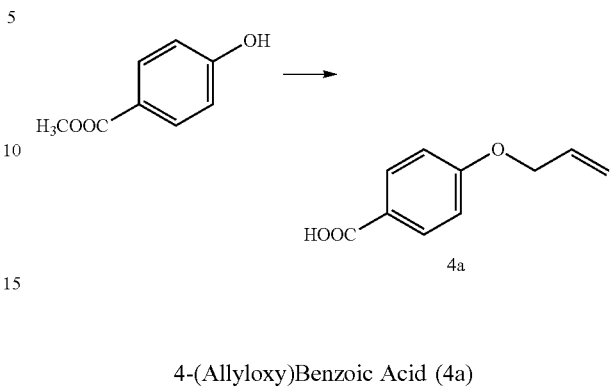

4-(Allyloxy)Benzoic Acid (4a)

Following the general allyl protection method, 4a was synthesized as a white solid and used without further purification. Yield: 88%. $^1$H NMR (500 MHz, DMSO-d$_6$) δ 12.62 (s, 1H), 7.91 (d, J=8.8 Hz, 2H), 7.04 (d, J=8.9 Hz, 2H), 6.06 (ddt, J=17.3, 10.5, 5.2 Hz, 1H), 5.53-5.20 (m, 2H), 4.65

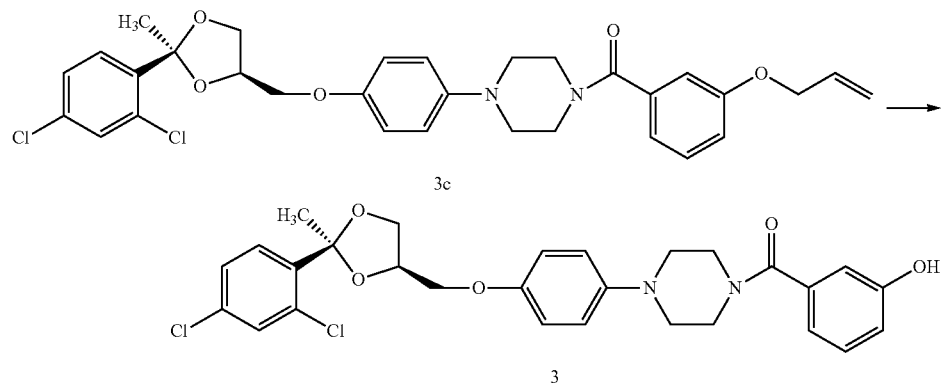

General de-Protection Method. Exemplified by 3-Hydroxy-N-(4-(4-(((2S,4R)-2-(2,4-Dichlorophenyl)-2-Methyl-1,3-Dioxolan-4-yl)Methoxy)Phenyl)Piperazin-1-yl)Benzamide (3). To a solution of 3c (100 mg, 0.17 mmol) in dry THF (50 mL), was added excess sodium borohydride (40 mg) followed by a small piece of iodine at 0° C. while stirring. Small portions of iodine were added to the mixture until the brown solvent color does not fade after 30 min. The reaction was quenched with saturated sodium thiosulfate, washed with brine (100 mL×2), and dried over sodium sulfate. The filtrate was purified by column chromatography (SiO$_2$, 50% EtOAc in hexanes) to give 3 as a white wax (54 mg, 62%). $^1$H NMR (500 MHz, CDCl$_3$) δ 7.66 (t, J=8.8 Hz, 1H), 7.43 (dd, J=16.8, 2.1 Hz, 1H), 7.39-7.32 (m, 1H), 7.23 (dt, J=9.1, 2.7 Hz, 1H), 7.08-7.01 (m, 3H), 6.93 (d, J=4.3 Hz, 1H), 6.89 (d, J=9.1 Hz, 2H), 6.75 (d, J=9.1 Hz, 2H), 4.64 (p, J=6.2 Hz, 1H), 4.34 (dd, J=8.5, 6.4 Hz, 1H), 4.06-4.03 (m, 1H), 3.98 (dd, J=9.7, 5.3 Hz, 2H), 3.80-3.73 (m, 2H), 3.63 (s, 2H), 3.10 (d, J=55.6 Hz, 4H), 1.82 (s, 3H); $^{13}$C NMR (126 MHz, CDCl$_3$) δ 170.06, 158.95, 151.13, 141.47, 137.04, 134.34, 132.80, 130.96, 129.69, 128.54, 126.79, 126.69, 122.85, 119.29, 119.29, 118.80 (2C), 116.14, 115.49, 115.25 (2C), 113.13, 109.17, 75.04, 68.38, 67.34, (dt, J=5.3, 1.6 Hz, 2H); $^{13}$C NMR (126 MHz, DMSO) δ 167.43, 162.22, 133.64, 131.78 (2C), 123.56, 118.26, 114.91 (2C), 68.84.

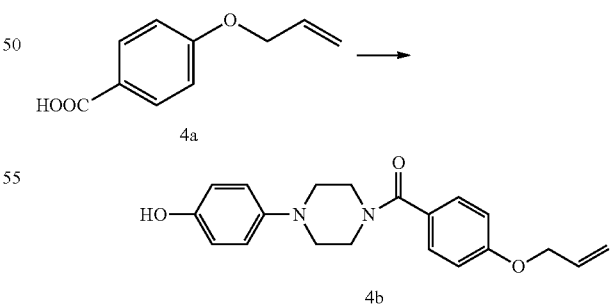

4-Allyloxy-N-(4-(4-Hydroxyphenyl)Piperazin-1-yl) Benzamide (4b)

Following the general amide coupling method, 4b was synthesized as a white solid. Yield: 72%. $^1$H NMR (500

MHz, DMSO-d$_6$) δ 8.89 (s, 1H), 7.38 (t, J=7.9 Hz, 1H), 7.08-7.02 (m, 1H), 6.98 (d, J=6.9 Hz, 2H), 6.83 (d, J=8.8 Hz, 2H), 6.68 (d, J=8.7 Hz, 2H), 6.06 (ddt, J=16.0, 10.4, 5.2 Hz, 1H), 5.47-5.23 (m, 2H), 4.62 (d, J=5.1 Hz, 2H), 3.60 (d, J=147.1 Hz, 4H), 2.98 (d, J=32.1 Hz, 4H); $^{13}$C NMR (126 MHz, DMSO) δ 169.05, 162.76, 158.47, 151.89, 144.34, 137.77, 134.01, 130.16, 119.55, 118.99 (2C), 118.03, 116.40, 115.95 (2C), 113.43, 68.75, 50.96, 50.89, 47.66.

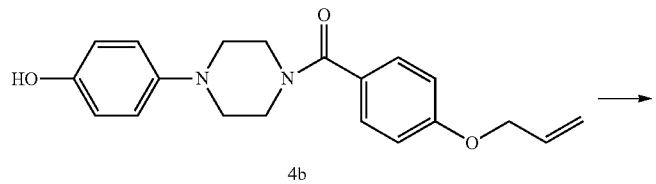

4b

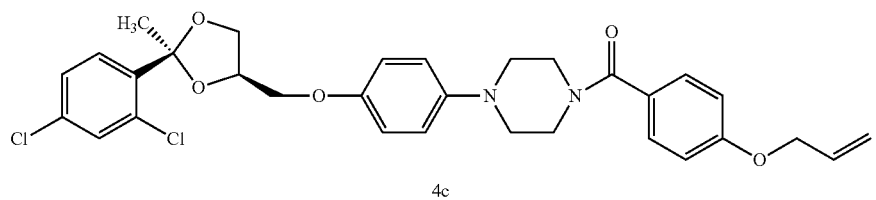

4c

4-Allyloxy-N-(4-(4-((02S,4R)-2-(2,4-Dichlorophenyl)-2-Methyl-1,3-Dioxolan-4-yl)Methoxy)Phenyl)Piperazin-1-yl)Benzamide (4c)

Following the general ether coupling method, 4c was synthesized as a white wax. Yield: 43%. $^1$H NMR (500 MHz, CDCl$_3$) δ 7.66 (t, J=8.8 Hz, 1H), 7.42 (d, J=2.0 Hz, 1H), 7.23 (dd, J=8.5, 2.1 Hz, 1H), 7.04-7.01 (m, 2H), 6.93 (d, J=3.9 Hz, 2H), 6.89 (d, J=8.8 Hz, 2H), 6.76 (d, J=8.8 Hz, 2H), 6.09 (ddt, J=16.3, 10.5, 5.3 Hz, 1H), 5.40 (dd, J=58.9, 13.9 Hz, 2H), 4.65 (q, J=6.2 Hz, 1H), 4.60 (d, J=4.4 Hz, 2H), 4.39-4.30 (m, 1H), 4.12-4.11 (m, 1H), 3.97 (s, 2H), 3.91-3.84 (m, 1H), 3.80-3.74 (m, 1H), 3.62 (s, 2H), 3.10 (d, J=64.0 Hz, 4H), 1.82 (s, 3H); $^{13}$C NMR (126 MHz, CDCl$_3$) δ 170.07, 158.67, 153.28, 145.68, 139.33, 136.97, 134.35, 132.93, 130.97, 129.69, 128.89, 128.55, 126.70, 119.37, 118.84 (2C), 117.92, 116.39, 115.49 (2C), 113.36, 109.17, 75.04, 68.95, 68.38, 67.34, 51.29, 50.89, 47.79, 42.26, 25.90.

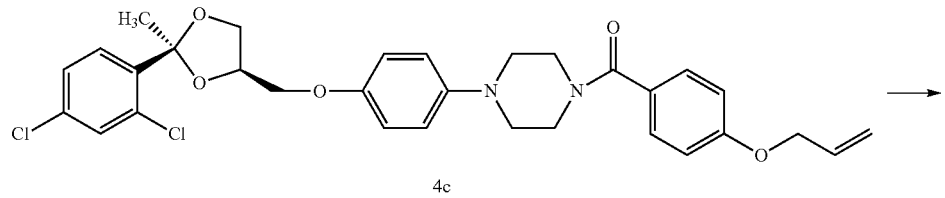

4c

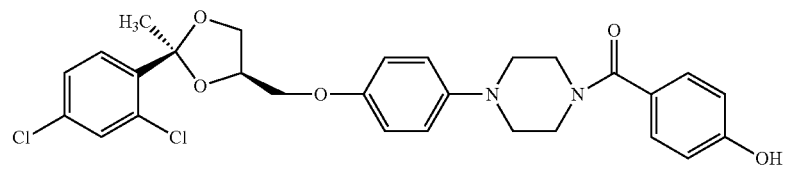

4

4-Hydroxy-N-(4-(4-(((2S,4R)-2-(2,4-Dichlorophenyl)-2-Methyl-1,3-Dioxolan-4-yl)Methoxy)Phenyl)Piperazin-1-yl)Benzamide (4)

Following the general de-protection method, 4 was synthesized as a white wax. Yield: 32%. $^1$H NMR (500 MHz, Chloroform-d) δ 7.66 (t, J=8.8 Hz, 1H), 7.43 (dd, J=16.9, 2.1 Hz, 1H), 7.27-7.21 (m, 1H), 7.09 (s, 1H), 7.04-7.02 (m, 1H), 6.95-6.92 (m, 3H), 6.89 (d, J=9.1 Hz, 2H), 6.75 (d, J=9.0 Hz, 2H), 4.64 (p, J=6.2 Hz, 1H), 4.40-4.30 (m, 1H), 4.00-3.88 (m, 4H), 3.78-3.75 (m, 1H), 3.63 (s, 2H), 3.10 (d, J=69.2 Hz, 4H), 1.82 (s, 3H); $^{13}$C NMR (126 MHz, CDCl$_3$) δ 170.55, 156.69, 153.16, 145.58, 139.33, 136.37, 134.35, 130.97, 129.72, 128.54, 126.69, 118.83 (2C), 118.41, 117.41, 115.51, 115.27 (2C), 114.67, 109.17, 75.04, 68.39, 67.33, 51.24, 50.80, 47.83, 42.42, 25.89; HRMS: m/z calcd. for C$_{28}$H$_{29}$Cl$_2$N$_2$O$_5$ [MH]$^+$, 543.1448; Found: 543.1453; HPLC purity 91.29%, t$_r$=3.55 min.

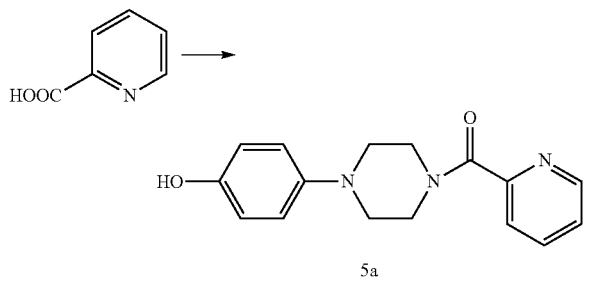

N-(4-(4-Hydroxyphenyl)Piperazin-1-yl)Picolinamide (5a)

Following the general amide coupling method, 5a was synthesized as a white solid. Yield: 66%. $^1$H NMR (500 MHz, DMSO-d$_6$) δ 8.89 (s, 1H), 8.62 (ddd, J=4.9, 1.7, 0.9 Hz, 1H), 7.96 (td, J=7.7, 1.7 Hz, 1H), 7.62 (dt, J=7.8, 1.1 Hz, 1H), 7.51 (ddd, J=7.6, 4.9, 1.2 Hz, 1H), 6.83 (d, J=8.9 Hz, 2H), 6.68 (d, J=8.9 Hz, 2H), 3.84-3.75 (m, 2H), 3.59-3.50 (m, 2H), 3.05 (t, J=5.2 Hz, 2H), 2.94 (t, J=5.1 Hz, 2H); $^{13}$C NMR (126 MHz, DMSO) δ 170.69, 154.34, 151.81, 148.75, 144.24, 137.77, 124.99, 123.61, 118.91 (2C), 115.86 (2C), 51.03, 50.76, 47.00, 42.04.

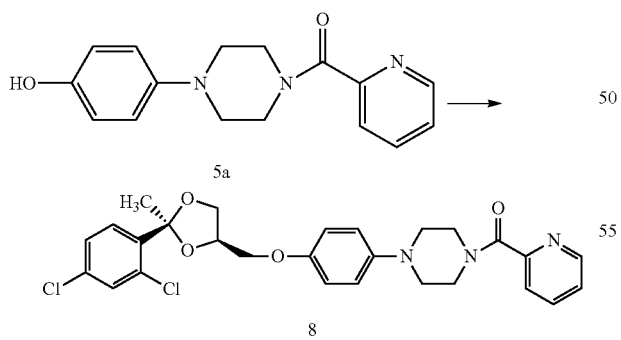

N-(4-(4-(((2S,4R)-2-(2,4-Dichlorophenyl)-2-Methyl-1,3-Dioxolan-4-yl)Methoxy)Phenyl)Piperazin-1-yl)Picolinamide (5)

Following the general ether coupling method, 5 was synthesized as a white wax. Yield: 96%. $^1$H NMR (500 MHz, CDCl$_3$) δ 8.67-8.62 (m, 1H), 7.86 (tt, J=7.7, 1.7 Hz, 1H), 7.75-7.71 (m, 1H), 7.69-7.64 (m, 1H), 7.47-7.37 (m, 2H), 7.23 (dd, J=8.5, 2.1 Hz, 1H), 6.90 (d, J=9.0 Hz, 2H), 6.76 (d, J=9.0 Hz, 2H), 4.64 (p, J=6.1 Hz, 1H), 4.34 (dd, J=8.6, 6.3 Hz, 1H), 4.04-3.97 (m, 3H), 3.82 (q, J=5.1 Hz, 2H), 3.80-3.72 (m, 2H), 3.22 (q, J=5.1 Hz, 2H), 3.11 (q, J=5.2 Hz, 2H), 1.82 (s, 3H); $^{13}$C NMR (126 MHz, CDCl$_3$) δ 171.62, 159.62, 156.44, 154.02, 153.04, 148.31, 137.12, 132.80, 131.20, 130.97, 128.55, 126.69, 124.58, 124.09, 118.81 (2C), 115.24 (2C), 109.16, 75.04, 68.39, 67.36, 51.27, 50.87, 47.26, 42.53, 25.89; HRMS: m/z calcd. for C$_{27}$H$_{28}$Cl$_2$N$_3$O$_4$ [MH]$^+$, 528.1452; Found: 528.1459; HPLC purity 94.12%, t$_r$=3.39 min.

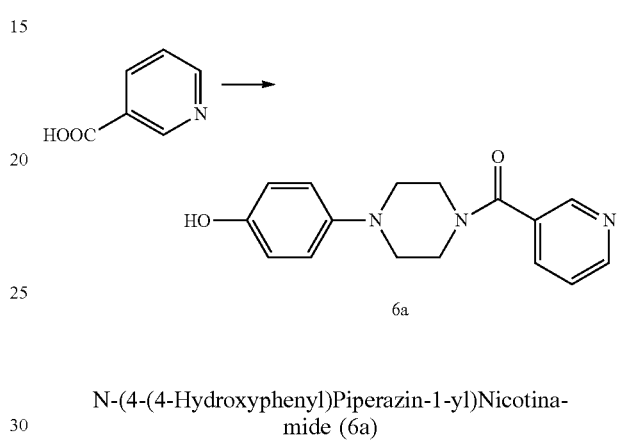

N-(4-(4-Hydroxyphenyl)Piperazin-1-yl)Nicotinamide (6a)

Following the general amide coupling method, 6a was synthesized as a white solid. Yield: 76%. $^1$H NMR (500 MHz, CD$_3$OD+CDCl$_3$) δ 8.48 (q, J=1.9 Hz, 2H), 7.79 (s, 1H), 7.68 (dt, J=7.8, 1.9 Hz, 1H), 7.34-7.24 (m, 1H), 6.69 (d, J=8.8 Hz, 2H), 6.61 (d, J=8.8 Hz, 2H), 3.76 (s, 2H), 3.42 (s, 2H), 2.95 (s, 2H), 2.84 (s, 2H); $^{13}$C NMR (126 MHz, CD$_3$OD+CDCl$_3$) δ 167.65, 151.83, 150.32, 147.27, 143.89, 135.44, 131.52, 123.81, 119.39 (2C), 115.69 (2C), 51.63, 51.08, 47.84, 42.36.

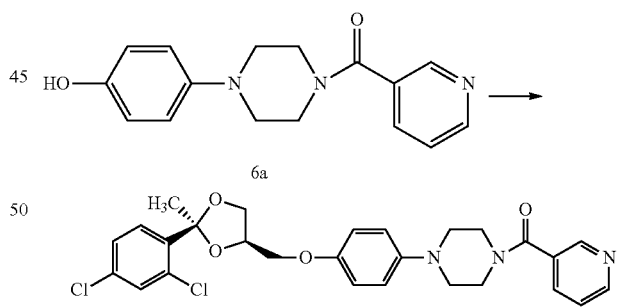

N-(4-(4-(((2S,4R)-2-(2,4-Dichlorophenyl)-2-Methyl-1,3-Dioxolan-4-yl)Methoxy)Phenyl)Piperazin-1-yl)Nicotinamide (6)

Following the general ether coupling method, 6 was synthesized as a white wax. Yield: 65%. $^1$H NMR (500 MHz, CDCl$_3$) δ 8.77-8.68 (m, 2H), 7.83 (d, J=7.8 Hz, 1H), 7.67 (d, J=8.4 Hz, 1H), 7.46-7.40 (m, 2H), 7.23 (dd, J=8.5, 2.0 Hz, 1H), 6.89 (d, J=8.7 Hz, 2H), 6.76 (d, J=8.6 Hz, 2H), 4.64 (p, J=6.2 Hz, 1H), 4.34 (dd, J=8.5, 6.5 Hz, 1H), 3.98

(dd, J=9.7, 5.3 Hz, 3H), 3.82-3.75 (m, 2H), 3.63 (s, 2H), 3.13 (d, J=54.2 Hz, 4H), 1.82 (s, 3H); $^{13}$C NMR (126 MHz, CDCl$_3$) δ 167.76, 153.25, 150.93, 148.03, 145.48, 139.32, 135.15, 134.35, 132.81, 131.50, 130.97, 128.53, 126.69, 123.55, 118.91 (2C), 115.28 (2C), 109.18, 75.03, 68.37, 67.32, 25.89; HRMS: m/z calcd. for C$_{27}$H$_{28}$Cl$_2$N$_3$O$_4$ [MH]$^+$, 528.1452; Found: 528.1455; HPLC purity 95.82%, t$_r$=3.19 min.

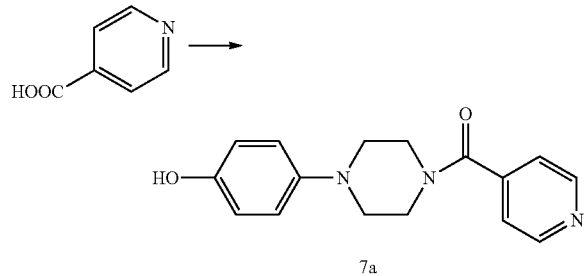

N-(4-(4-Hydroxyphenyl)Piperazin-1-yl)Isonicotinamide (7a)

Following the general amide coupling method, 7a was synthesized as a white solid. Yield: 87%. $^1$H NMR (500 MHz, DMSO-d$_6$) δ 10.92-10.46 (brs, 1H), 9.09 (d, J=5.8 Hz, 2H), 8.30 (d, J=5.7 Hz, 2H), 7.13 (d, J=8.4 Hz, 2H), 6.80 (d, J=8.4 Hz, 2H), 3.47 (s, 4H), 3.41 (s, 4H); $^{13}$C NMR (126 MHz, DMSO) δ 164.81, 154.83, 148.34, 145.48 (2C), 139.50, 127.28, 126.13 (2C), 120.47 (2C), 116.43 (2C), 49.21 (2C), 42.55 (2C).

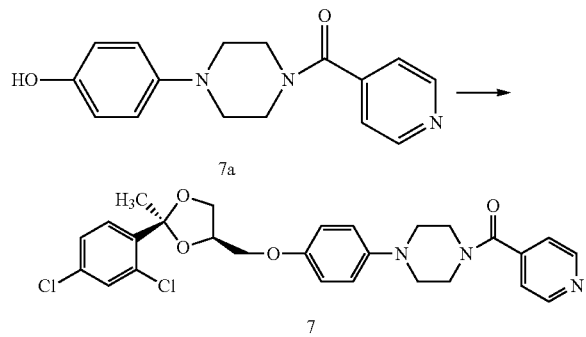

N-(4-(4-(((2S,4R)-2-(2,4-Dichlorophenyl)-2-Methyl-1,3-Dioxolan-4-yl)Methoxy)Phenyl)Piperazin-1-yl)Isonicotinamide (7)

Following the general ether coupling method, 7 was synthesized as a white wax. Yield: 32%. $^1$H NMR (500 MHz, CDCl$_3$) δ 8.76 (d, J=5.0 Hz, 2H), 7.65 (t, J=8.8 Hz, 1H), 7.41 (d, J=2.1 Hz, 1H), 7.35 (d, J=5.7 Hz, 2H), 7.22 (dd, J=8.5, 2.1 Hz, 1H), 6.88 (d, J=8.9 Hz, 2H), 6.75 (d, J=9.0 Hz, 2H), 4.63 (p, J=6.1 Hz, 1H), 4.34 (dd, J=8.6, 6.4 Hz, 1H), 3.97 (dd, J=9.6, 5.2 Hz, 3H), 3.81-3.72 (m, 2H), 3.55 (s, 2H), 3.10 (d, J=74.8 Hz, 4H), 1.81 (s, 3H); $^{13}$C NMR (126 MHz, CDCl$_3$) δ 167.71, 153.29, 150.38 (2C), 145.43, 143.28, 139.34, 134.33, 132.81, 130.95, 128.52, 126.68, 121.26 (2C), 118.92 (2C), 115.28 (2C), 109.17, 75.02, 68.37, 67.30, 51.31, 50.83, 47.53, 42.17, 25.89; HRMS: m/z calcd. for C$_{27}$H$_{28}$Cl$_2$N$_3$O$_4$ [MH]$^+$, 528.1452; Found: 528.1461; HPLC purity 95.12%, t$_r$=3.53 min.

4-Nitro-N-(4-(4-Hydroxyphenyl)Piperazin-1-yl)Benzamide (8a)

Following the general amide coupling method, 8a was synthesized as a brown oil. Yield: 98%. $^1$H NMR (500 MHz, CD$_3$OD) δ 8.06 (d, J=8.2 Hz, 2H), 7.38 (d, J=8.2 Hz, 2H), 6.61 (d, J=8.5 Hz, 2H), 6.51 (d, J=8.4 Hz, 2H), 3.69 (t, J=5.0 Hz, 2H), 3.36-3.21 (m, 2H), 2.89 (t, J=5.0 Hz, 2H), 2.80-2.64 (m, 2H).

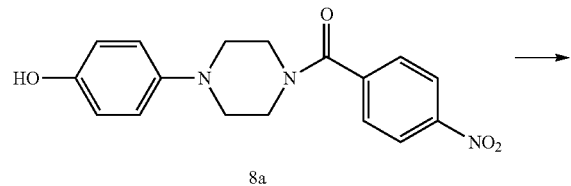

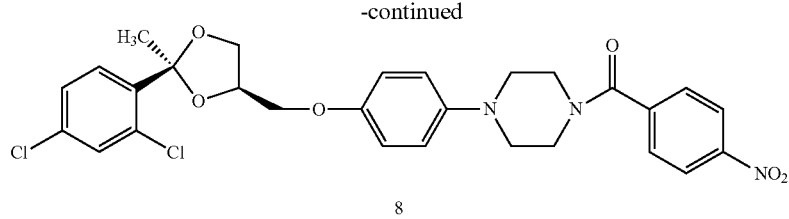

4-Nitro-N-(4-(4-(((2S,4R)-2-(2,4-Dichlorophenyl)-2-Methyl-1,3-Dioxolan-4-yl)Methoxy)Phenyl)Piperazin-1-yl)Benzamide (8)

Following the general ether coupling method, 8 was synthesized as a yellow oil. Yield: 87%. $^1$H NMR (500 MHz, CDCl$_3$) δ 8.34 (d, J=8.6 Hz, 2H), 7.66 (dd, J=9.8, 8.7 Hz, 3H), 7.42 (d, J=2.1 Hz, 1H), 7.23 (dd, J=8.4, 2.1 Hz, 1H), 6.89 (d, J=9.0 Hz, 2H), 6.76 (d, J=9.0 Hz, 2H), 4.74-4.59 (m, 1H), 4.35 (dd, J=8.6, 6.4 Hz, 1H), 3.98 (dd, J=9.7, 5.3 Hz, 3H), 3.85-3.72 (m, 2H), 3.56 (s, 2H), 3.20 (s, 2H), 3.04 (s, 2H), 1.82 (s, 3H); $^{13}$C NMR (126 MHz, CDCl$_3$) δ 168.00, 153.33, 145.39, 141.79, 139.33, 134.34, 132.82, 130.97, 128.52, 128.16 (2C), 126.69, 123.96 (2C), 118.96 (2C), 115.29 (2C), 109.19, 75.03, 68.36, 67.30, 51.35, 50.87, 47.68, 42.37, 25.89; HRMS: m/z calcd. for C$_{28}$H$_{28}$Cl$_2$N$_3$O$_6$ [MH]$^+$, 572.1350; Found: 572.1346; HPLC purity 93.97%, t$_r$=6.41 min.

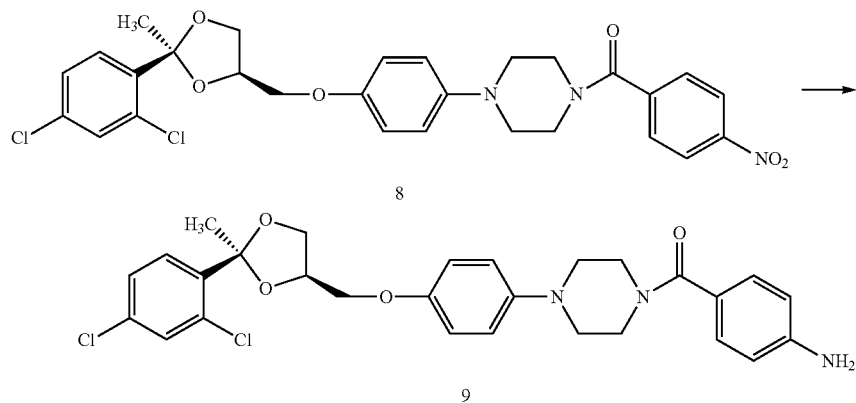

4-Amino-N-(4-(4-(((2S,4R)-2-(2,4-Dichlorophenyl)-2-Methyl-1,3-Dioxolan-4-yl)Methoxy)Phenyl)Piperazin-1-yl)Benzamide (9)

A solution of 8 (20 mg, 0.035 mmol) in ethanol (20 mL) was purged with argon before addition of a catalytic portion of Pd/C (10%) followed by hydrazine hydride (0.35 mmol). A clean reduction was observed after refluxing for 4 h. After cooling to room temperature, the mixture was filtered through a pad of celite to remove the Pd/C. The filtrate was partitioned between ethyl acetate (50 mL) and water (50 mL). The organic layer was purified by column chromatography (SiO$_2$, 70% EtOAc in hexanes) to give 9 as a white wax (18 mg, 91%). $^1$H NMR (500 MHz, CDCl$_3$) δ 7.67 (d, J=8.5 Hz, 1H), 7.42 (d, J=2.0 Hz, 1H), 7.34 (d, J=8.1 Hz, 2H), 7.23 (dd, J=8.5, 2.0 Hz, 1H), 6.89 (d, J=8.7 Hz, 2H), 6.75 (d, J=8.7 Hz, 2H), 6.71 (d, J=8.0 Hz, 2H), 4.64 (p, J=6.2 Hz, 1H), 4.34 (dd, J=8.5, 6.4 Hz, 1H), 4.03-3.97 (m, 1H), 3.92 (s, 2H), 3.78 (dd, J=18.1, 11.0 Hz, 6H), 3.10 (t, J=4.8 Hz, 4H), 1.82 (s, 3H); $^{13}$C NMR (126 MHz, CDCl$_3$) δ 171.04, 153.20, 148.42, 146.02, 139.53, 134.55, 133.00, 131.16, 129.62 (2C), 128.75, 126.89, 118.90 (2C), 115.44 (2C), 114.42 (2C), 109.36, 75.24, 68.59, 67.55, 51.28 (2C), 29.91 (2C), 26.09; HRMS: m/z calcd. for C$_{28}$H$_{30}$Cl$_2$N$_3$H$_4$ [MH]$^+$, 542.1608; Found: 542.1613; HPLC purity 90.20%, t$_r$=3.51 min.

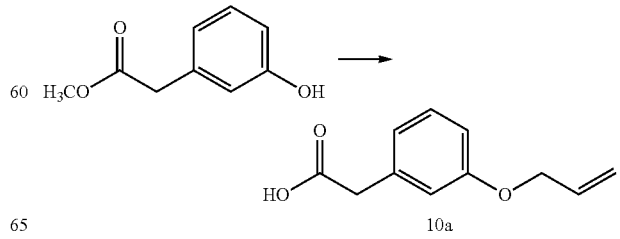

3-(Allyloxy)Phenylacetic Acid (10a)

Following the general allyl protection method, 10a was synthesized as a white solid and utilized without further purification. Yield: 79%. $^1$H NMR (500 MHz, DMSO-$d_6$) δ 12.30 (s, 1H), 7.23 (t, J=7.8 Hz, 1H), 6.85 (dd, J=11.5, 3.5 Hz, 3H), 6.06 (ddd, J=22.3, 10.4, 5.2 Hz, 1H), 5.48-5.23 (m, 2H), 4.56 (d, J=5.2 Hz, 2H), 3.54 (s, 2H); $^{13}$C NMR (126 MHz, DMSO) δ 172.97, 158.57, 136.91, 134.22, 129.69, 122.22, 117.79, 116.40, 113.14, 68.55, 41.16.

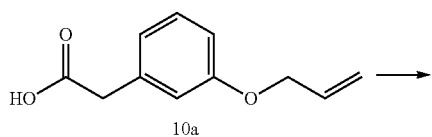
10a

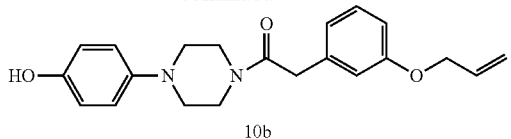
10b

3-Allyloxy-N-(4-(4-Hydroxyphenyl)Piperazin-1-yl) Phenylacetamide (10b)

Following the general amide coupling method, 10b was synthesized as a colorless oil. Yield: 91%. $^1$H NMR (500 MHz, DMSO-$d_6$) δ 8.87 (s, 1H), 7.97 (s, 1H), 7.23 (t, J=7.8 Hz, 1H), 6.86-6.82 (m, 2H), 6.79 (d, J=9.0 Hz, 2H), 6.66 (d, J=8.9 Hz, 2H), 6.05 (ddt, J=17.3, 10.5, 5.2 Hz, 1H), 5.44-5.22 (m, 2H), 4.55 (dt, J=5.2, 1.6 Hz, 2H), 3.73 (s, 2H), 3.61 (dt, J=6.2, 3.0 Hz, 4H), 2.90-2.81 (m, 4H); $^{13}$C NMR (126 MHz, DMSO) δ 169.11, 158.64, 151.81, 144.33, 137.78, 134.22, 129.81, 121.73, 118.81 (2C), 117.77, 115.94 (2C), 115.87, 113.01, 68.51, 51.08, 50.57, 46.06, 41.78, 36.25.

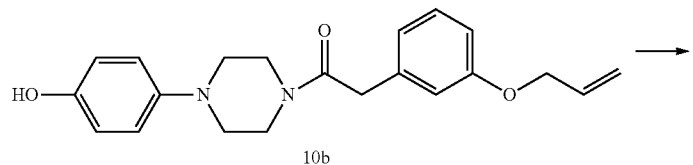
10b

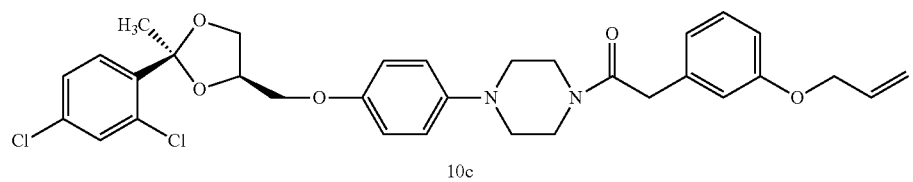
10c

3-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Phenylacetamide (10c). Following the general ether coupling method, 10c was synthesized as a white wax. Yield: 69%. $^1$H NMR (500 MHz, CDCl$_3$) δ 7.66 (t, J=8.3 Hz, 1H), 7.41 (d, J=2.1 Hz, 1H), 7.30-7.25 (m, 1H), 7.23 (dd, J=8.5, 2.1 Hz, 1H), 6.91-6.85 (m, 3H), 6.83 (d, J=9.0 Hz, 2H), 6.73 (d, J=9.0 Hz, 2H), 6.08 (ddd, J=22.5, 10.6, 5.3 Hz, 1H), 5.51-5.29 (m, 2H), 4.67-4.61 (m, 1H), 4.57 (dt, J=5.2, 1.6 Hz, 2H), 4.34 (dd, J=8.6, 6.4 Hz, 1H), 3.97 (dd, J=9.6, 5.3 Hz, 1H), 3.83 (t, J=5.2 Hz, 2H), 3.79 (s, 2H), 3.78-3.73 (m, 2H), 3.61 (t, J=5.1 Hz, 2H), 3.07-3.01 (m, 2H), 2.89 (t, J=5.1 Hz, 2H), 1.82 (s, 3H); $^{13}$C NMR (126 MHz, CDCl$_3$) δ 169.33, 158.96, 153.01, 145.62, 139.32, 136.45, 134.35, 133.21, 132.80, 130.96, 129.77, 128.54, 126.69, 121.04, 118.64 (2C), 117.67, 115.22 (2C), 115.01, 113.22, 109.16, 75.03, 68.77, 68.38, 67.33, 50.89, 50.57, 46.21, 41.84, 41.18, 25.89.

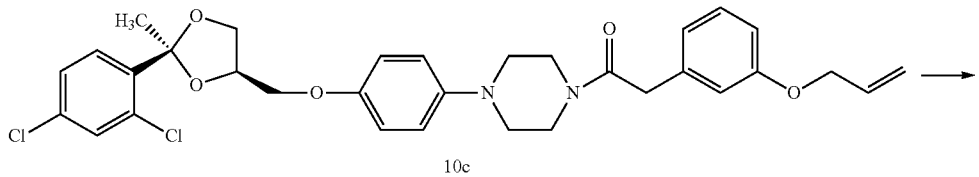
10c

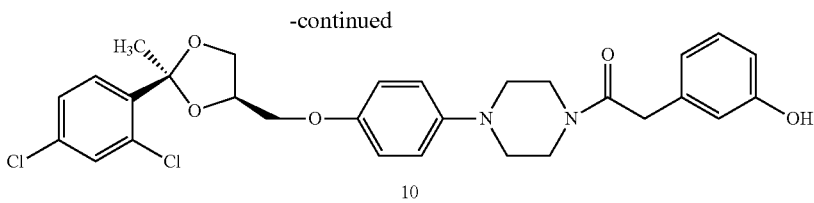

3-Hydroxy-N-(4-(4-(((2S,4R)-2-(2,4-Dichlorophenyl)-2-Methyl-1,3-Dioxolan-4-yl)Methoxy)Phenyl)Piperazin-1-yl) Phenylacetic Amide (10). Following the general de-protection method, 10 was synthesized as a white wax. Yield: 31%. $^1$H NMR (500 MHz, CDCl$_3$) δ 7.67 (t, J=9.3 Hz, 1H), 7.52-7.33 (m, 2H), 7.30-7.21 (m, 2H), 7.17 (d, J=8.5 Hz, 1H), 7.04 (d, J=8.6 Hz, 1H), 6.96 (s, 1H), 6.94-6.85 (m, 3H), 6.77 (dd, J=15.9, 8.7 Hz, 2H), 4.64 (p, J=6.3 Hz, 1H), 4.34 (dd, J=8.7, 6.5 Hz, 1H), 4.20-4.12 (m, 1H), 3.99 (dd, J=9.5, 4.9 Hz, 1H), 3.78 (t, J=7.8 Hz, 1H), 3.40 (s, 2H), 3.18 (s, 4H), 2.97 (d, J=12.1 Hz, 2H), 2.69 (s, 2H), 1.82 (s, 3H); $^{13}$C NMR (126 MHz, CDCl$_3$) δ 155.83, 152.67, 143.95, 139.33, 134.35, 132.80, 131.20, 128.90, 128.58, 128.15, 127.81, 125.14, 118.19 (2C), 115.22 (2C), 114.52, 113.96, 112.70, 109.17, 75.06, 68.42, 67.38, 53.14, 50.57, 44.94, 32.78, 25.89; HRMS: m/z calcd. for C$_{29}$H$_{31}$Cl$_2$N$_2$O$_5$ [MNa]$^+$, 557.1605; Found: 557.1618; HPLC purity 91.90%, t$_r$=2.02 min.

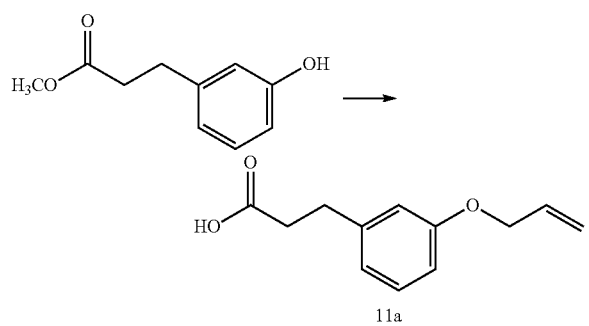

3-(Allyloxy)Phenylpropionic Acid (11a)

Following the general allyl protection method, 11a was synthesized as a colorless oil and utilized without further purification. Yield: 82%. $^1$H NMR (500 MHz, CDCl$_3$) δ 12.22 (s, 1H), 7.24 (t, J=7.9 Hz, 1H), 6.87-6.79 (m, 3H), 6.10 (ddt, J=17.2, 10.5, 5.3 Hz, 1H), 5.51-5.29 (m, 2H), 4.57 (dt, J=5.2, 1.6 Hz, 2H), 2.97 (t, J=7.9 Hz, 2H), 2.72-2.63 (m, 2H); $^{13}$C NMR (126 MHz, CDCl$_3$) δ 173.29, 158.77, 142.15, 133.38, 129.50, 120.81, 117.57, 114.90, 112.41, 68.71, 35.60, 30.99.

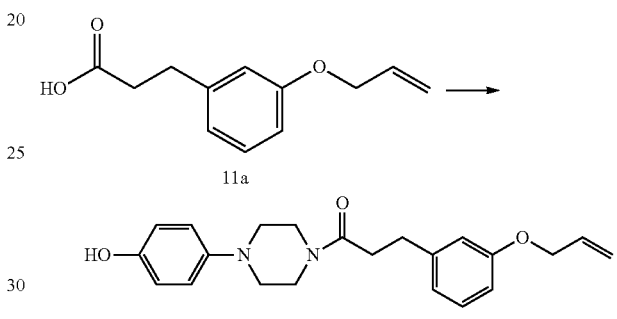

3-Allyloxy-N-(4-(4-Hydroxyphenyl)Piperazin-1-yl) Hydrocinnamamide (11b)

Following the general amide coupling method, 11b was synthesized as a colorless oil. Yield: 62%. $^1$H NMR (500 MHz, DMSO-d$_6$) δ 8.93 (s, 1H), 7.19 (t, J=7.7 Hz, 1H), 6.88-6.75 (m, 5H), 6.68 (d, J=7.9 Hz, 2H), 6.04 (ddt, J=15.9, 10.4, 4.8 Hz, 1H), 5.51-5.17 (m, 2H), 4.54 (d, J=4.1 Hz, 2H), 3.56 (dt, J=26.9, 4.9 Hz, 4H), 2.87 (p, J=6.2 Hz, 4H), 2.81 (t, J=7.7 Hz, 2H), 2.66 (t, J=7.7 Hz, 2H); $^{13}$C NMR (126 MHz, DMSO) δ 170.36, 158.66, 151.83, 144.42, 143.41, 134.28, 129.69, 121.30, 118.89 (2C), 117.73, 115.93 (2C), 115.38, 112.40, 68.48, 51.11, 50.75, 45.46, 41.64, 34.23, 31.22.

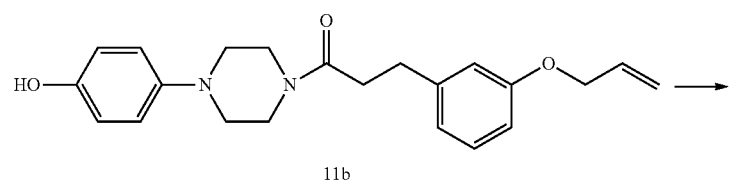

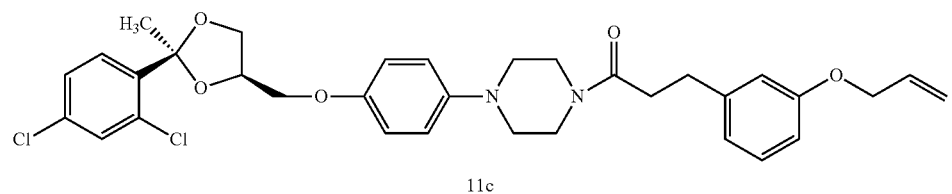

3-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Hydrocinnamamide (11c). Following the general ether coupling method, 11c was synthesized as a white wax. Yield: 72%. $^1$H NMR (500 MHz, CDCl$_3$) δ 7.66 (t, J=8.9 Hz, 1H), 7.42 (d, J=2.1 Hz, 1H), 7.29-7.19 (m, 2H), 6.91 (s, 1H), 6.86 (d, J=9.0 Hz, 2H), 6.84 (d, J=2.3 Hz, 1H), 6.80 (ddd, J=8.2, 2.5, 1.0 Hz, 1H), 6.75 (d, J=9.1 Hz, 2H), 6.09 (ddd, J=22.5, 10.6, 5.3 Hz, 1H), 5.49-5.28 (m, 2H), 4.64 (p, J=6.0 Hz, 1H), 4.56 (dt, J=5.3, 1.5 Hz, 2H), 4.34 (dd, J=8.6, 6.4 Hz, 1H), 3.98 (dd, J=9.8, 5.3 Hz, 1H), 3.81 (t, J=5.2 Hz, 2H), 3.77 (ddd, J=9.5, 6.6, 2.3 Hz, 2H), 3.57 (t, J=5.1 Hz, 2H), 3.07-3.00 (m, 4H), 2.96 (q, J=5.2 Hz, 2H), 2.73-2.66 (m, 2H), 1.82 (s, 3H); $^{13}$C NMR (126 MHz, CDCl$_3$) δ 170.65, 158.81, 153.06, 145.69, 142.83, 133.34, 130.96, 129.52, 128.55, 126.79, 126.69, 121.01, 118.78, 118.73 (2C), 117.63, 115.47, 115.22 (2C), 115.20, 112.22, 109.17, 75.04, 68.75, 68.38, 67.34, 50.98, 50.77, 45.65, 41.71, 34.92, 31.59, 25.89.

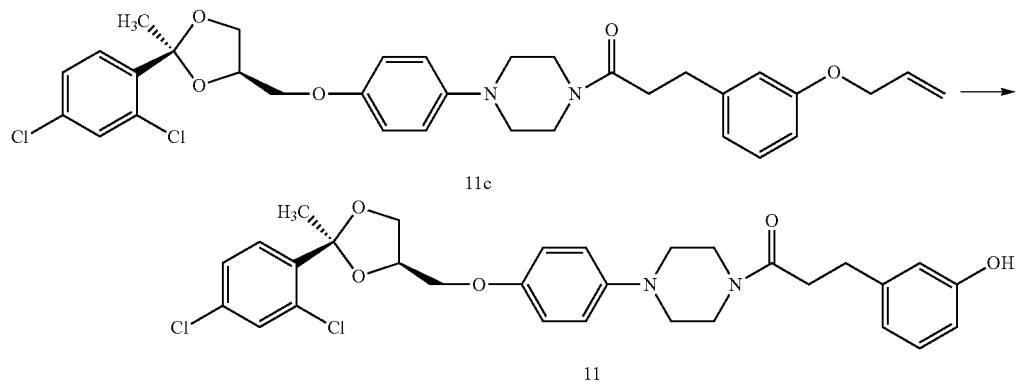

11c

11

3-Hydroxy-N-(4-(4-(((2S,4R)-2-(2,4-Dichlorophenyl)-2-Methyl-1,3-Dioxolan-4-yl)Methoxy)Phenyl)Piperazin-1-yl) Hydrocinnamamide (11). Following the general de-protection method, 11 was synthesized as a white wax. Yield: 42%. $^1$H NMR (500 MHz, CDCl$_3$) δ 7.66 (t, J=8.6 Hz, 1H), 7.44 (d, J=16.9 Hz, 1H), 7.29-7.17 (m, 2H), 6.91 (s, 2H), 6.85 (t, J=9.3 Hz, 2H), 6.82 (s, 1H), 6.77 (s, 1H), 6.73 (dd, J=12.1, 8.7 Hz, 2H), 4.64 (p, J=6.3 Hz, 1H), 4.34 (dd, J=8.8, 6.5 Hz, 1H), 4.02-3.94 (m, 1H), 3.81 (q, J=4.8 Hz, 2H), 3.79-3.74 (m, 2H), 3.58 (q, J=5.2 Hz, 2H), 3.04 (dt, J=10.2, 5.0 Hz, 2H), 2.97 (dq, J=17.3, 6.2, 4.9 Hz, 4H), 2.70 (t, J=7.7 Hz, 2H), 1.82 (s, 3H); $^{13}$C NMR (126 MHz, CDCl$_3$) δ 170.74, 155.90, 143.02, 139.32, 134.35, 132.80, 131.20, 130.97, 129.76, 128.55, 126.79, 126.70, 120.71, 118.77 (2C), 115.49, 115.22 (2C), 113.25, 109.17, 75.03, 68.36, 67.34, 50.98, 50.78, 45.69, 41.76, 34.81, 31.42, 25.89; HRMS: m/z calcd. for C$_{30}$H$_{32}$Cl$_2$N$_2$O$_5$Na [MNa]$^+$, 593.1580; Found: 593.1585; HPLC purity 91.40%, t$_r$=3.41 min.

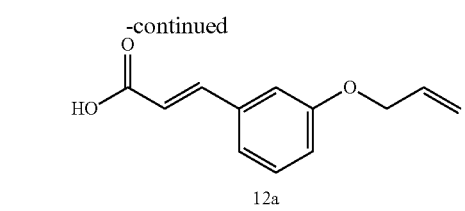

3-(Allyloxy)Cinnamic Acid (12a)

Following the general allyl protection method, 12a was synthesized as a colorless oil and utilized without further purification. Yield: 73%. $^1$H NMR (500 MHz, DMSO-d$_6$) δ 12.21 (s, 1H), 7.55 (d, J=16.0 Hz, 1H), 7.37-7.20 (m, 3H), 7.01 (d, J=8.1 Hz, 1H), 6.56 (d, J=16.0 Hz, 1H), 6.06 (ddt, J=16.3, 10.4, 5.2 Hz, 1H), 5.35 (dd, J=72.2, 13.9 Hz, 2H), 4.63 (d, J=5.1 Hz, 2H); $^{13}$C NMR (126 MHz, DMSO) δ 168.11, 158.97, 143.99, 136.22, 134.10, 130.38, 121.32, 120.42, 118.00, 117.29, 114.11, 68.72.

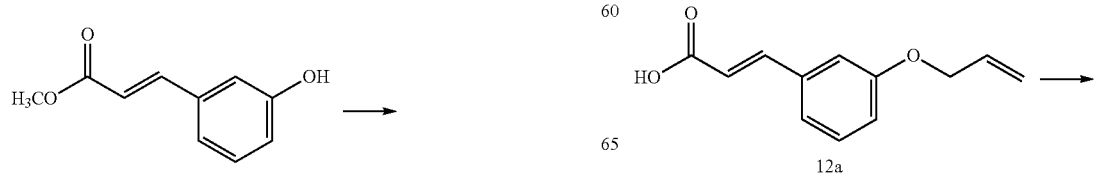

12a

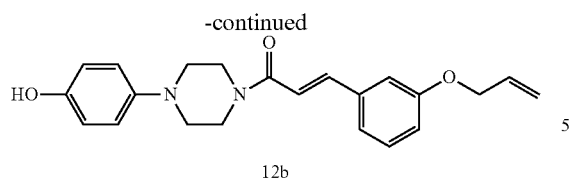

12b

3-Allyloxy-N-(4-(4-Hydroxyphenyl)Piperazin-1-yl) Cinnamamide (12b)

Following the general amide coupling method, 12b was synthesized as a colorless oil. Yield: 75%. $^1$H NMR (500 MHz, DMSO-$d_6$) δ 8.89 (s, 1H), 7.50 (d, J=15.3 Hz, 1H), 7.42-7.25 (m, 4H), 7.02-6.96 (m, 1H), 6.85 (d, J=8.9 Hz, 2H), 6.69 (d, J=8.9 Hz, 2H), 6.08 (ddd, J=22.5, 10.5, 5.3 Hz, 1H), 5.52-5.23 (m, 2H), 4.63 (dt, J=5.3, 1.6 Hz, 2H), 3.79 (d, J=68.5 Hz, 4H), 3.02-2.97 (brs, 4H); $^{13}$C NMR (126 MHz, DMSO) δ 164.88, 158.98, 151.88, 144.41, 142.02, 137.04, 134.13, 130.24, 121.48, 118.94 (2C), 118.02, 116.55, 115.97 (2C), 114.02, 109.99, 68.77, 51.53, 50.82, 45.63, 42.26.

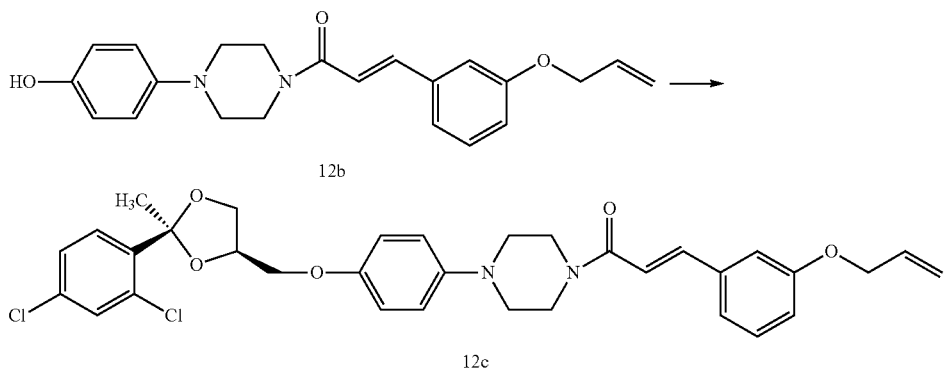

3-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Cinnamamide (12c). Following the general ether coupling method, 12c was synthesized as a white wax. Yield: 81%. $^1$H NMR (500 MHz, CDCl$_3$) δ 7.75-7.62 (m, 2H), 7.44 (d, J=16.0 Hz, 1H), 7.33 (t, J=7.9 Hz, 1H), 7.24 (d, J=8.5 Hz, 1H), 7.18 (d, J=7.7 Hz, 1H), 7.12 (s, 1H), 6.98-6.91 (m, 4H), 6.76 (d, J=8.8 Hz, 2H), 6.11 (ddt, J=16.2, 10.6, 5.3 Hz, 1H), 5.41 (dd, J=61.5, 13.9 Hz, 2H), 4.65 (q, J=6.0 Hz, 1H), 4.61 (d, J=5.0 Hz, 2H), 4.35 (q, J=7.6 Hz, 1H), 4.02-3.97 (m, 1H), 3.97-3.80 (m, 5H), 3.78 (d, J=16.0 Hz, 1H), 3.17-3.11 (m, 4H), 1.82 (s, 3H); $^{13}$C NMR (126 MHz, CDCl$_3$) δ 165.42, 158.93, 153.09, 145.68, 139.34, 136.69, 134.57, 134.35, 132.81, 131.20, 130.97, 128.89, 128.55, 126.69, 120.55, 118.76 (2C), 117.88, 117.32, 115.96 (2C), 115.27, 114.08, 109.17, 75.04, 68.93, 68.40, 67.35, 51.30, 50.75, 45.95, 42.23, 25.89.

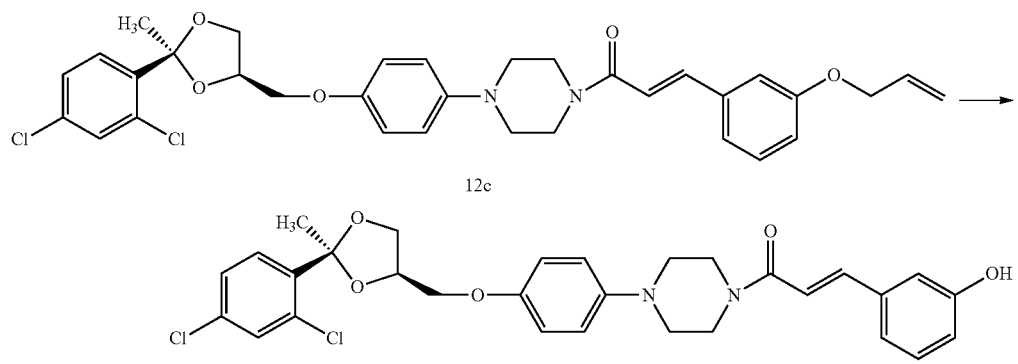

3-Hydroxy-N-(4-(4-(((2S,4R)-2-(2,4-Dichlorophenyl)-2-Methyl-1,3-Dioxolan-4-yl)Methoxy)Phenyl)Piperazin-1-yl)Cinnamamide (12)

Following the general de-protection method, 12 was synthesized as a white wax. Yield: 28%. $^1$H NMR (500 MHz, CDCl$_3$) δ 7.76-7.61 (m, 2H), 7.43 (d, J=16.0 Hz, 1H), 7.32 (t, J=7.9 Hz, 1H), 7.24 (d, J=8.5 Hz, 1H), 7.18 (d, J=7.7 Hz, 1H), 7.11 (s, 1H), 6.98-6.90 (m, 5H), 6.76 (d, J=8.8 Hz, 2H), 4.65 (q, J=6.0 Hz, 1H), 4.35 (q, J=7.6 Hz, 1H), 4.02-3.97 (m, 1H), 3.96-3.81 (m, 5H), 3.78 (d, J=15.7 Hz, 1H), 3.14 (dt, J=10.1, 4.9 Hz, 4H), 1.82 (s, 3H). $^{13}$C NMR (126 MHz, CDCl$_3$) δ 165.42, 159.13, 153.25, 145.67, 139.33, 138.12, 136.71, 134.57, 134.35, 132.83, 129.58, 127.81, 121.03, 120.74, 118.77 (2C), 117.32, 115.78 (2C), 115.52, 113.58, 109.10, 75.04, 69.25, 67.35, 50.99, 50.78, 45.67, 41.73, 25.73; HRMS: m/z calcd. for C$_{30}$H$_{31}$Cl$_2$N$_2$O$_5$ [MH]$^+$, 569.1605; Found: 569.1610; HPLC purity 93.32%, t$_r$=3.44 min.

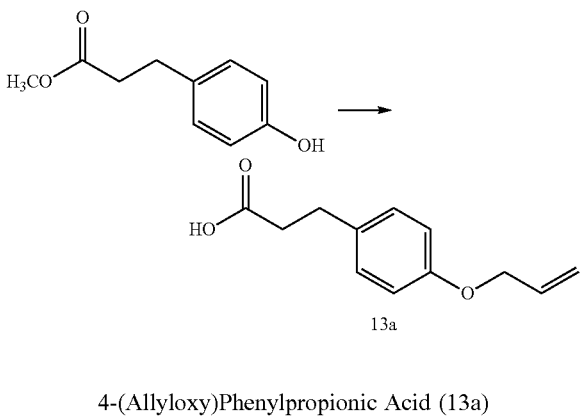

4-(Allyloxy)Phenylpropionic Acid (13a)

Following the general allyl protection method, 13a was synthesized as a colorless oil and utilized without further purification. Yield: 84%. $^1$H NMR (500 MHz, CDCl$_3$) δ 12.31 (s, 1H), 7.15 (d, J=8.6 Hz, 2H), 6.89 (d, J=8.6 Hz, 2H), 6.10 (ddt, J=17.3, 10.5, 5.3 Hz, 1H), 5.49-5.27 (m, 2H), 4.56 (dt, J=5.3, 1.5 Hz, 2H), 2.94 (t, J=7.8 Hz, 2H), 2.65 (t, J=7.8 Hz, 2H); $^{13}$C NMR (126 MHz, CDCl$_3$) δ 173.41, 157.13, 133.44, 132.79, 129.22 (2C), 117.57, 114.79 (2C), 68.86, 36.00, 30.14.

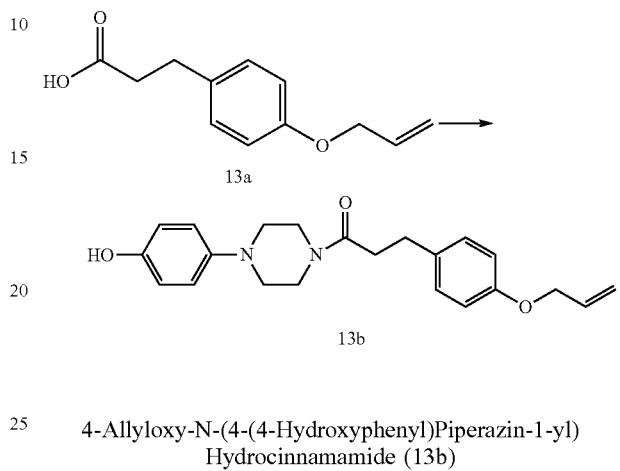

4-Allyloxy-N-(4-(4-Hydroxyphenyl)Piperazin-1-yl)Hydrocinnamamide (13b)

Following the general amide coupling method, 13b was synthesized as a colorless oil. Yield: 52%. $^1$H NMR (500 MHz, DMSO-d$_6$) δ 8.91 (s, 1H), 7.17 (d, J=8.6 Hz, 2H), 6.86 (d, J=8.6 Hz, 2H), 6.80 (d, J=8.9 Hz, 2H), 6.68 (d, J=8.9 Hz, 2H), 6.03 (ddd, J=22.4, 10.5, 5.2 Hz, 1H), 5.42-5.20 (m, 2H), 4.55-4.46 (m, 2H), 3.56 (dt, J=26.9, 4.9 Hz, 4H), 2.87-2.82 (m, 4H), 2.79 (t, J=7.8 Hz, 2H), 2.63 (t, J=7.8 Hz, 2H); $^{13}$C NMR (126 MHz, DMSO) δ 170.38, 156.93, 151.88, 144.44, 134.34, 133.82, 129.79 (2C), 118.87 (2C), 117.50, 115.87 (2C), 114.85 (2C), 68.56, 51.11, 50.78, 45.48, 41.59, 34.60, 30.45.

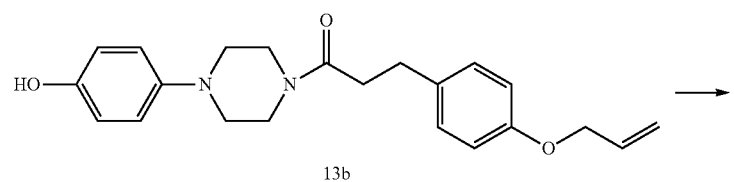

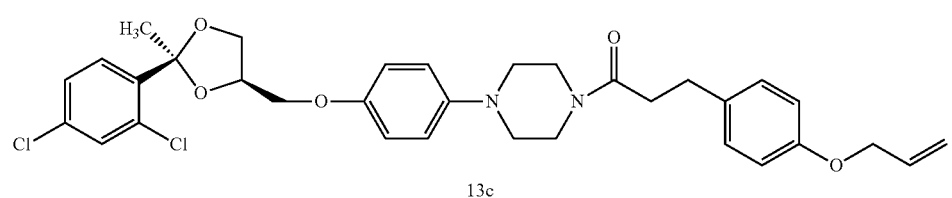

4-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Hydrocinnamamide (13c). Following the general ether coupling method, 13c was synthesized as a white wax. Yield: 71%. $^1$H NMR (500 MHz, CDCl$_3$) δ 7.66 (t, J=8.6 Hz, 1H), 7.42 (s, 1H), 7.23 (dt, J=8.4, 1.7 Hz, 1H), 7.18 (d, J=7.4 Hz, 2H), 6.90 (d, J=3.4 Hz, 2H), 6.86 (d, J=8.9 Hz, 2H), 6.74 (d, J=8.9 Hz, 2H), 6.08 (ddt, J=16.7, 10.4, 5.2 Hz, 1H), 5.37 (dd, J=64.9, 14.3 Hz, 2H), 4.64 (p, J=6.2 Hz, 1H), 4.54 (d, J=5.2 Hz, 2H), 4.34 (dd, J=8.7, 6.4 Hz, 1H), 4.03-3.95 (m, 1H), 3.80 (p, J=4.2, 3.1 Hz, 2H), 3.78-3.74 (m, 2H), 3.56 (q, J=5.1 Hz, 2H), 3.03 (q, J=5.6, 4.8 Hz, 2H), 2.98 (t, J=7.4 Hz, 2H), 2.93 (dt, J=10.0, 4.9 Hz, 2H), 2.67 (t, J=7.7 Hz, 2H), 1.82 (s, 3H); $^{13}$C NMR (126 MHz, CDCl$_3$) δ 170.81, 157.12, 153.05, 145.70, 139.32, 134.35, 132.80, 130.97, 129.42 (2C), 128.55, 126.70, 118.77, 118.73 (2C), 117.59, 115.45, 115.21 (2C), 114.84 (2C), 109.16, 75.03, 68.88, 68.37, 67.35, 50.93, 50.82, 45.68, 41.69, 35.22, 30.75, 25.89.

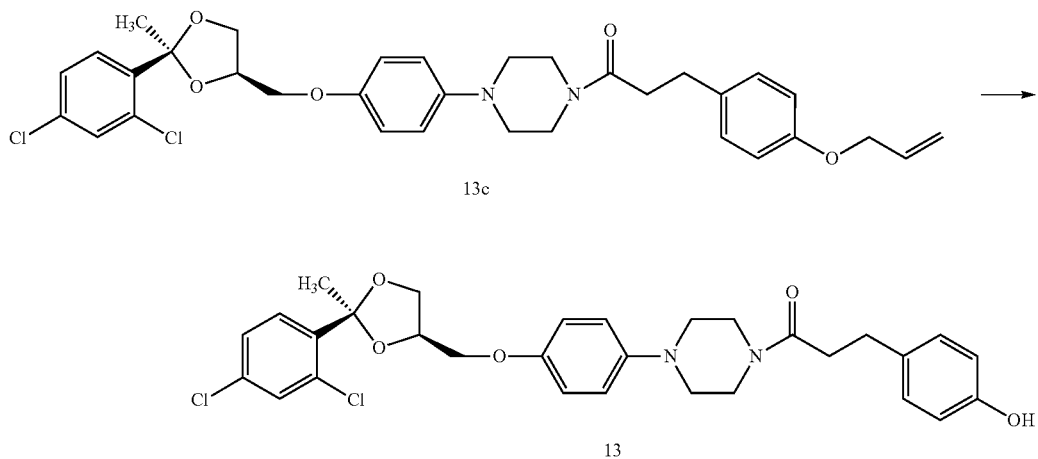

4-Hydroxy-N-(4-(4-(((2S,4R)-2-(2,4-Dichlorophenyl)-2-Methyl-1,3-Dioxolan-4-yl)Methoxy)Phenyl)Piperazin-1-yl) Hydrocinnamamide (13). Following the general de-protection method, 13 was synthesized as a white wax. Yield: 52%. $^1$H NMR (500 MHz, CDCl$_3$) δ 7.66 (t, J=8.6 Hz, 1H), 7.58-7.42 (m, 1H), 7.42-7.32 (m, 1H), 7.23 (dd, J=8.4, 2.0 Hz, 1H), 7.15 (d, J=8.0 Hz, 2H), 6.91-6.88 (m, 2H), 6.86 (d, J=9.0 Hz, 2H), 6.75 (d, J=8.7 Hz, 2H), 4.64 (p, J=6.2 Hz, 1H), 4.41-4.29 (m, 1H), 4.02-3.95 (m, 1H), 3.50 (dt, J=9.0, 5.3 Hz, 2H), 3.16 (dd, J=41.8, 10.4 Hz, 4H), 2.96-2.82 (m, 4H), 2.63 (t, J=7.6 Hz, 2H), 2.22 (q, J=8.0 Hz, 2H), 1.82 (s, 3H); $^{13}$C NMR (126 MHz, CDCl$_3$) δ 157.27, 152.92, 144.95, 139.32, 134.35, 132.95, 130.97, 129.28 (2C), 128.55, 126.70, 125.14, 118.04 (2C), 115.52, 115.28 (2C), 114.60 (2C), 109.17, 75.04, 68.39, 67.33, 57.66 (2C), 45.21 (2C), 32.58, 32.03, 25.89; HRMS: m/z calcd. for C$_{30}$H$_{33}$Cl$_2$N$_2$O$_5$ [MH]$^+$, 571.1761; Found: 571.1769; HPLC purity 94.19%, t$_r$=3.37 min.

4-(Allyloxy)Cinnamic Acid (14a)

Following the general allyl protection method, 14a was synthesized as a white solid and utilized without further purification. Yield: 79%. $^1$H NMR (500 MHz, DMSO-d$_6$) δ 12.29 (s, 1H), 7.62 (d, J=8.8 Hz, 2H), 7.52 (d, J=16.0 Hz, 1H), 6.99 (d, J=8.7 Hz, 2H), 6.39 (d, J=16.0 Hz, 1H), 6.06 (ddt, J=17.3, 10.5, 5.2 Hz, 1H), 5.47-5.20 (m, 2H), 4.63 (dt, J=5.3, 1.6 Hz, 2H); $^{13}$C NMR (126 MHz, DMSO) δ 168.46, 160.20, 143.60, 133.88, 130.26 (2C), 127.55, 118.15, 117.76, 115.50 (2C), 68.75.

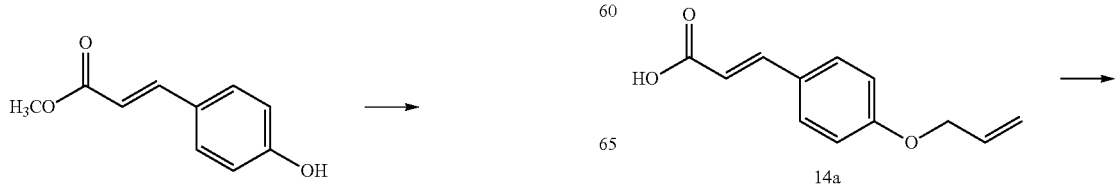

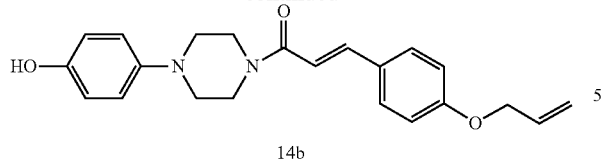

4-Allyloxy-N-(4-(4-Hydroxyphenyl)Piperazin-1-yl) Cinnamamide (14b)

Following the general amide coupling method, 14b was synthesized as a white solid. Yield: 82%. $^1$H NMR (500 MHz, DMSO-$d_6$) δ 8.89 (s, 1H), 7.97 (s, 1H), 7.69 (d, J=8.4 Hz, 2H), 7.49 (d, J=15.3 Hz, 1H), 7.17 (d, J=15.3 Hz, 1H), 6.99 (d, J=8.4 Hz, 2H), 6.84 (d, J=8.5 Hz, 2H), 6.69 (d, J=8.4 Hz, 2H), 6.06 (ddt, J=16.4, 10.4, 5.2 Hz, 1H), 5.51-5.21 (m, 2H), 4.63 (d, J=5.0 Hz, 2H), 3.77 (d, J=61.0 Hz, 4H), 2.98 (s, 4H); $^{13}$C NMR (126 MHz, DMSO) δ 165.15, 159.80, 151.85, 144.42, 141.87, 133.96, 130.14 (2C), 128.38, 118.93 (2C), 118.08, 116.05, 115.97 (2C), 115.35 (2C), 68.74, 51.55, 50.84, 45.57, 42.20.

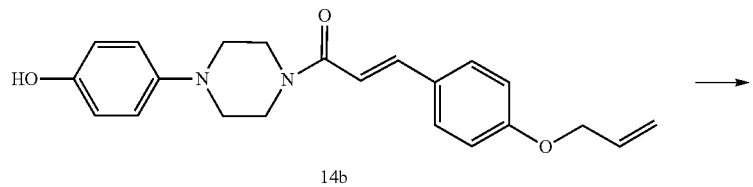

4-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Cinnamamide (14c). Following the general ether coupling method, 14c was synthesized as a white solid. Yield: 83%. $^1$H NMR (500 MHz, CDCl$_3$) δ 7.71 (d, J=15.4 Hz, 1H), 7.69-7.64 (m, 1H), 7.52 (d, J=8.7 Hz, 2H), 7.42 (d, J=2.1 Hz, 1H), 7.23 (dd, J=8.5, 2.2 Hz, 1H), 6.96 (d, J=8.8 Hz, 2H), 6.90 (d, J=9.0 Hz, 2H), 6.82 (d, J=15.3 Hz, 1H), 6.76 (d, J=9.0 Hz, 2H), 6.10 (ddd, J=22.4, 10.5, 5.3 Hz, 1H), 5.52-5.28 (m, 2H), 4.68-4.62 (m, 1H), 4.61 (d, J=5.3 Hz, 2H), 4.34 (dd, J=8.6, 6.3 Hz, 1H), 3.98 (dd, J=9.8, 5.2 Hz, 1H), 3.94-3.82 (m, 4H), 3.81-3.74 (m, 2H), 3.13 (q, J=4.9 Hz, 4H), 1.82 (s, 3H); $^{13}$C NMR (126 MHz, CDCl$_3$) δ 165.78, 159.92, 153.06, 145.71, 139.35, 134.35, 132.81, 131.18, 129.34 (2C), 128.88, 128.11, 126.79, 118.76, 118.72 (2C), 117.95, 115.51, 115.25 (2C), 115.02 (2C), 114.47, 109.17, 75.05, 68.86, 68.41, 67.35, 51.24, 50.87, 45.91, 42.24, 25.89.

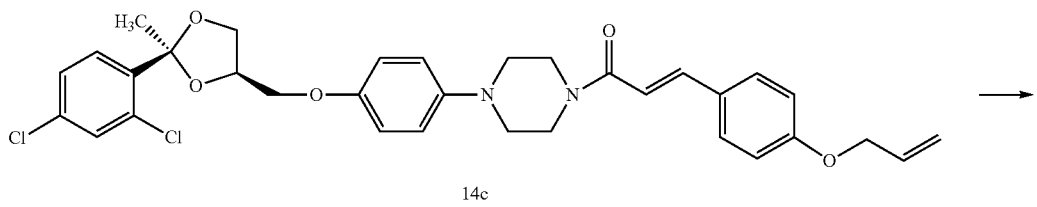

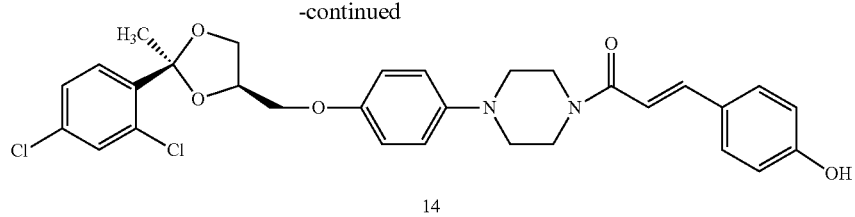

14

4-Hydroxy-N-(4-(4-(((2S,4R)-2-(2,4-Dichlorophenyl)-2-Methyl-1,3-Dioxolan-4-yl)Methoxy)Phenyl)Piperazin-1-yl)Cinnamamide (14)

Following the general ether coupling method, 14 was synthesized as a white wax. Yield: 28%. $^1$H NMR (500 MHz, CDCl$_3$) δ 7.72 (d, J=15.2 Hz, 1H), 7.66-7.65 (m, 1H), 7.51 (d, J=8.8 Hz, 2H), 7.41 (d, J=2.2 Hz, 1H), 7.27-7.22 (m, 1H), 6.97 (d, J=8.9 Hz, 2H), 6.94 (d, J=6.7 Hz, 1H), 6.90 (d, J=8.9 Hz, 2H), 6.83 (d, J=15.2 Hz, 1H), 6.77 (d, J=9.0 Hz, 2H), 4.68-4.61 (m, 1H), 4.36-4.32 (m, 1H), 4.01-3.97 (m, 1H), 3.95-3.82 (m, 4H), 3.82-3.73 (m, 2H), 3.15-3.11 (m, 4H), 1.82 (s, 3H); $^{13}$C NMR (126 MHz, CDCl$_3$) δ 165.77, 159.93, 153.05, 145.72, 142.73, 139.34, 134.35, 132.80, 130.96, 129.34 (2C), 128.55, 128.13, 126.69, 118.77, 118.72 (2C), 115.26 (2C), 115.03 (2C), 109.16, 75.04, 68.40, 67.35, 51.24, 50.87, 45.91, 42.24, 25.89; HRMS: m/z calcd. for C$_{30}$H$_{31}$Cl$_2$N$_2$O$_5$ [MH]$^+$, 569.1610; Found: 569.1605; HPLC purity 98.48%, t$_r$=3.26 min.

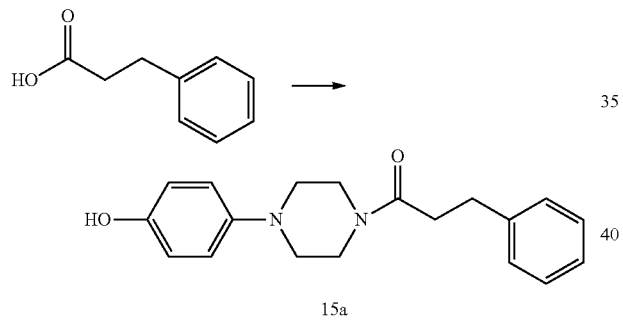

15a

N-(4-(4-Hydroxyphenyl)Piperazin-1-yl)Hydrocinnamamide (15a)

Following the general amide coupling method, 15a was synthesized as a white solid. Yield: 77%. $^1$H NMR (500 MHz, CDCl$_3$) δ 8.89 (s, 1H), 7.34 (t, J=7.5 Hz, 2H), 7.31-7.23 (m, 3H), 6.92 (d, J=9.3 Hz, 2H), 6.89 (d, J=9.3 Hz, 2H), 3.85-3.81 (m, 2H), 3.57 (t, J=5.1 Hz, 2H), 3.10-3.02 (m, 4H), 2.95 (t, J=5.1 Hz, 2H), 2.76-2.68 (m, 2H); $^{13}$C NMR (126 MHz, CDCl$_3$) δ 170.78, 154.51, 145.39, 141.33, 128.67 (2C), 128.60 (2C), 126.35, 119.01 (2C), 114.64 (2C), 51.22, 51.03, 45.79, 41.85, 35.13, 31.69.

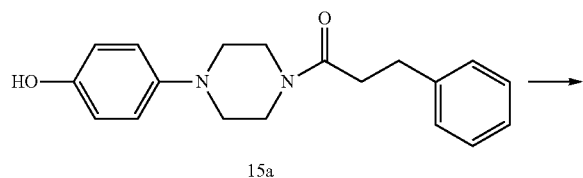

15a

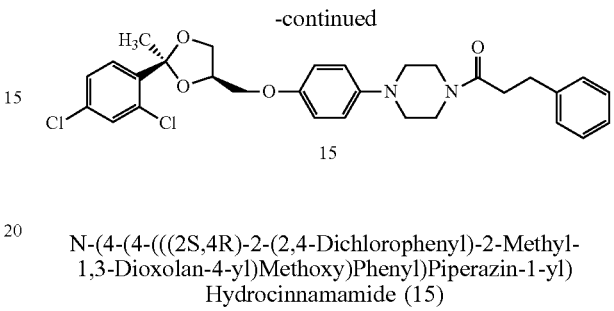

15

N-(4-(4-(((2S,4R)-2-(2,4-Dichlorophenyl)-2-Methyl-1,3-Dioxolan-4-yl)Methoxy)Phenyl)Piperazin-1-yl)Hydrocinnamamide (15)

Following the general ether coupling method, 15 was synthesized as a white solid. Yield: 62%. $^1$H NMR (500 MHz, CDCl$_3$) δ 8.07 (t, J=8.6 Hz, 1H), 7.82 (s, 1H), 7.74 (t, J=7.4 Hz, 2H), 7.66 (dd, J=18.3, 9.0 Hz, 4H), 7.26 (d, J=8.6 Hz, 2H), 7.15 (d, J=8.3 Hz, 2H), 5.04 (p, J=6.2 Hz, 1H), 4.74 (t, J=7.6 Hz, 1H), 4.38 (dd, J=10.0, 5.4 Hz, 1H), 4.21 (t, J=5.1 Hz, 2H), 4.17 (t, J=7.9 Hz, 2H), 3.96 (t, J=4.9 Hz, 2H), 3.44 (t, J=7.9 Hz, 4H), 3.37-3.32 (m, 2H), 3.11 (t, J=7.9 Hz, 2H), 2.22 (s, 3H); $^{13}$C NMR (126 MHz, CDCl$_3$) δ 170.86, 153.21, 145.84, 141.36, 139.49, 134.50, 132.96, 131.12, 128.72 (2C), 128.65 (2C), 126.86, 126.41, 118.89 (2C), 115.63, 115.39 (2C), 109.32, 75.20, 68.54, 67.50, 51.11, 50.94, 45.80, 41.86, 35.20, 31.74, 26.06; HRMS: m/z calcd. for C$_{30}$H$_{33}$Cl$_2$N$_2$O$_4$ [MH]$^+$, 555.1813; Found: 555.1818; HPLC purity 92.06%, t$_r$=8.03 min.

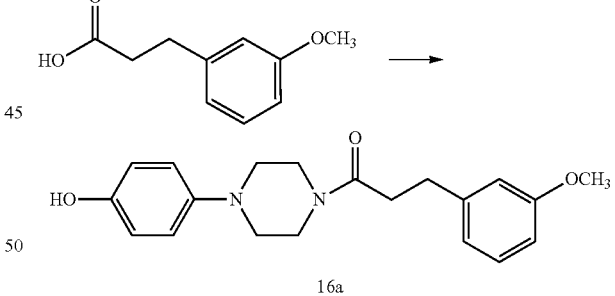

16a

3-Methoxy-N-(4-(4-Hydroxyphenyl)Piperazin-1-yl)Hydrocinnamamide (16a)

Following the general amide coupling method, 16a was synthesized as a colorless oil. Yield: 89%. $^1$H NMR (500 MHz, DMSO-d$_6$) δ 8.89 (s, 1H), 7.20 (t, J=7.9 Hz, 1H), 6.83 (d, J=7.4 Hz, 2H), 6.80 (d, J=8.7 Hz, 2H), 6.76 (dd, J=8.7, 2.2 Hz, 1H), 6.67 (d, J=8.6 Hz, 2H), 3.74 (s, 3H), 3.57 (dt, J=22.4, 4.8 Hz, 4H), 2.87 (q, J=5.3 Hz, 4H), 2.81 (t, J=7.7 Hz, 2H), 2.66 (t, J=7.7 Hz, 2H); $^{13}$C NMR (126 MHz, DMSO) δ 170.35, 159.73, 151.82, 144.42, 143.42, 129.69, 121.13, 118.90 (2C), 115.94 (2C), 114.61, 111.75, 55.37, 51.12, 50.75, 45.45, 41.63, 34.28, 31.34.

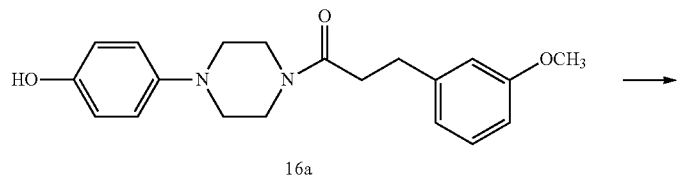

16a

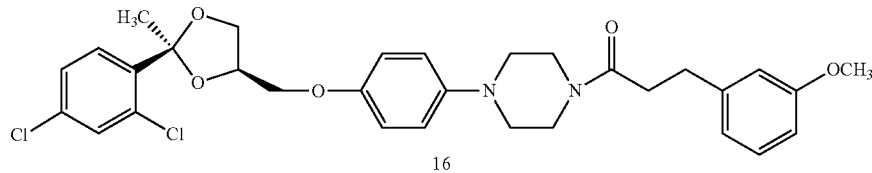

16

3-Methoxy-N-(4-(4-(((2S,4R)-2-(2,4-Dichlorophenyl)-2-Methyl-1,3-Dioxolan-4-yl)Methoxy)Phenyl)Piperazin-1-yl) Hydrocinnamamide (16). Following the general ether coupling method, 16 was synthesized as a white solid. Yield: 93%. $^1$H NMR (500 MHz, CDCl$_3$) δ 7.66 (t, J=8.4 Hz, 1H), 7.42 (s, 1H), 7.26 (dt, J=14.3, 8.0 Hz, 2H), 6.91 (s, 1H), 6.86 (d, J=8.4 Hz, 2H), 6.83-6.78 (m, 2H), 6.75 (d, J=8.3 Hz, 2H), 4.64 (p, J=6.3 Hz, 1H), 4.34 (t, J=7.5 Hz, 1H), 3.97 (dd, J=9.6, 5.3 Hz, 1H), 3.83 (s, 3H), 3.81 (t, J=5.0 Hz, 2H), 3.77 (t, J=7.9 Hz, 2H), 3.57 (t, J=5.0 Hz, 2H), 3.06-2.99 (m, 4H), 2.98-2.92 (m, 2H), 2.70 (t, J=7.9 Hz, 2H), 1.82 (s, 3H); $^{13}$C NMR (126 MHz, CDCl$_3$) δ 170.66, 159.77, 153.05, 145.68, 142.83, 139.31, 134.35, 132.80, 130.97, 129.55, 128.55, 126.70, 120.82, 118.74 (2C), 115.21 (2C), 114.35, 111.44, 109.16, 75.03, 68.36, 67.34, 55.20, 50.97, 50.79, 45.64, 41.70, 34.97, 31.61, 25.89; HRMS: m/z calcd. for C$_{31}$H$_{35}$Cl$_2$N$_2$O$_5$ [MH]$^+$, 85.1918; Found: 585.1923; HPLC purity 99.94%, t$_r$=5.92 min.

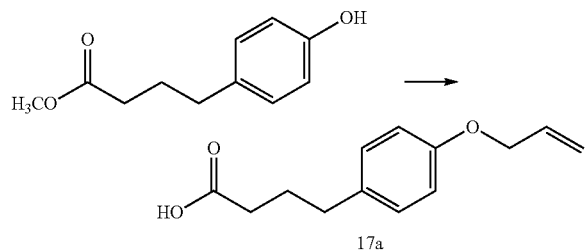

17a

4-(Allyloxy)Phenylbutyric Acid (17a)

Following the general allyl protection method, 17a was synthesized as a colorless oil without further purification.

Yield: 65%. $^1$H NMR (500 MHz, DMSO-d$_6$) δ 12.06 (s, 1H), 7.10 (d, J=8.2 Hz, 2H), 6.87 (d, J=8.1 Hz, 2H), 6.11-5.98 (m, 1H), 5.33 (dd, J=69.4, 13.9 Hz, 2H), 4.54 (d, J=5.2 Hz, 2H), 2.52 (d, J=7.1 Hz, 2H), 2.20 (t, J=7.4 Hz, 2H), 1.77 (p, J=7.5 Hz, 2H); $^{13}$C NMR (126 MHz, DMSO) δ 174.74, 156.85, 134.40, 134.03, 129.69 (2C), 117.69, 114.98 (2C), 68.59, 33.97, 33.49, 26.98.

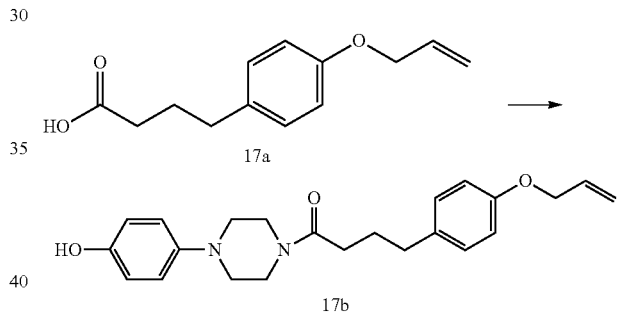

4-Allyloxy-N-(4-(4-Hydroxyphenyl)Piperazin-1-yl) Phenylbutyric Amide (17b)

Following the general amide coupling method, 17b was synthesized as a white solid. Yield: 66%. $^1$H NMR (500 MHz, DMSO-d$_6$) δ 8.87 (s, 1H), 7.12 (d, J=8.3 Hz, 2H), 6.87 (d, J=8.4 Hz, 2H), 6.81 (d, J=8.8 Hz, 2H), 6.67 (d, J=8.8 Hz, 2H), 6.05 (ddt, J=16.7, 10.4, 5.2 Hz, 1H), 5.33 (dd, J=69.3, 13.9 Hz, 2H), 4.53 (d, J=5.2 Hz, 2H), 3.56 (dt, J=28.4, 4.9 Hz, 4H), 2.91 (d, J=18.0 Hz, 4H), 2.55 (t, J=7.6 Hz, 2H), 2.34 (t, J=7.4 Hz, 2H), 1.79 (p, J=7.5 Hz, 2H); $^{13}$C NMR (126 MHz, DMSO) δ 170.81, 156.81, 151.83, 144.42, 134.41, 134.35, 129.69 (2C), 118.90 (2C), 117.69, 115.95 (2C), 114.97 (2C), 68.59, 51.19, 50.78, 45.47, 41.56, 34.22, 32.09, 27.32.

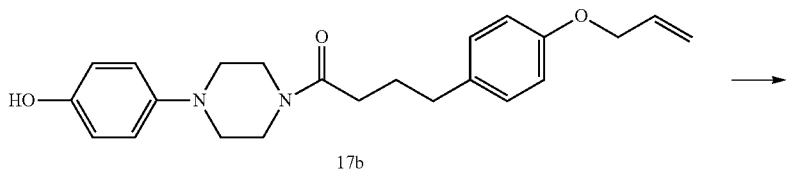

17b

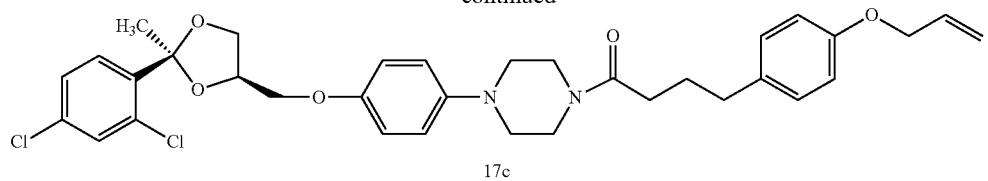

4-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Phenylbutyric Amide (17c). Following the general ether coupling method, 17c was synthesized as a white wax. Yield: 51%. $^1$H NMR (500 MHz, CDCl$_3$) δ 7.67 (d, J=8.5 Hz, 1H), 7.42 (s, 1H), 7.23 (d, J=8.5 Hz, 1H), 7.14 (d, J=8.0 Hz, 2H), 6.89 (q, J=9.1, 7.0 Hz, 4H), 6.75 (d, J=8.1 Hz, 2H), 6.10 (ddt, J=16.8, 10.7, 5.4 Hz, 1H), 5.38 (dd, J=65.0, 13.9 Hz, 2H), 4.64 (p, J=6.2 Hz, 1H), 4.56 (d, J=5.2 Hz, 2H), 4.34 (t, J=7.6 Hz, 1H), 3.98 (dd, J=9.9, 5.4 Hz, 1H), 3.78 (td, J=8.9, 8.5, 4.5 Hz, 4H), 3.62-3.54 (m, 2H), 3.10-3.01 (m, 4H), 2.67 (t, J=7.5 Hz, 2H), 2.38 (t, J=7.7 Hz, 2H), 2.00 (p, J=7.7 Hz, 2H), 1.82 (s, 3H); $^{13}$C NMR (126 MHz, CDCl$_3$) δ 171.34, 156.92, 153.05, 145.71, 134.35, 133.89, 133.48, 132.80, 130.96, 129.37 (2C), 128.55, 126.69, 118.75, 118.71 (2C), 117.56, 115.24 (2C), 114.71 (2C), 109.17, 75.04, 68.90, 68.39, 67.34, 51.17, 50.78, 45.61, 41.61, 34.42, 32.31, 26.90, 25.89.

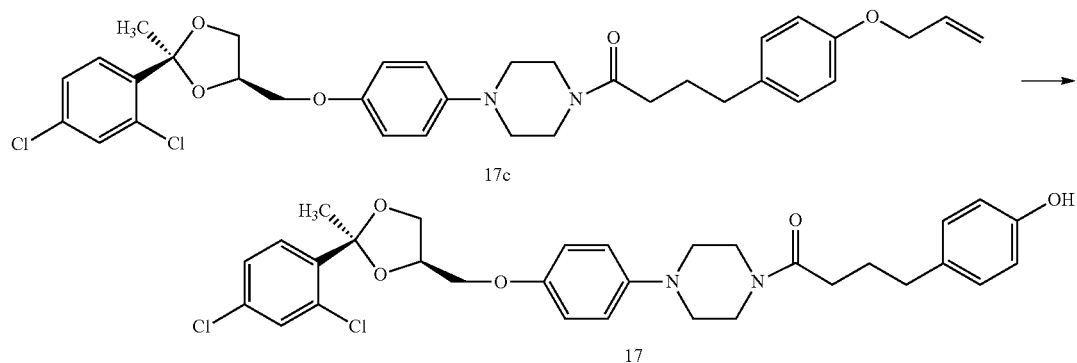

4-Hydroxy-N-(4-(4-(((2S,4R)-2-(2,4-Dichlorophenyl)-2-Methyl-1,3-Dioxolan-4-yl)Methoxy)Phenyl)Piperazin-1-yl) Phenylbutyric Amide (17). Following the general ether coupling method, 17 was synthesized as a white wax. Yield: 47%. $^1$H NMR (500 MHz, CDCl$_3$) δ 7.67 (d, J=8.5 Hz, 1H), 7.42 (d, J=2.1 Hz, 1H), 7.23 (dd, J=8.5, 2.1 Hz, 1H), 7.14 (d, J=8.5 Hz, 2H), 6.93-6.91 (m, 1H), 6.88 (d, J=8.9 Hz, 4H), 6.75 (d, J=9.1 Hz, 2H), 4.64 (p, J=6.1 Hz, 1H), 4.34 (dd, J=8.6, 6.3 Hz, 1H), 3.99-3.96 (m, 1H), 3.81-3.79 (m, 2H), 3.76-3.75 (m, 2H), 3.57 (s, 2H), 3.06-3.02 (m, 4H), 2.67 (d, J=7.9 Hz, 2H), 2.38 (d, J=7.9 Hz, 2H), 2.01 (d, J=7.6 Hz, 2H), 1.82 (s, 3H); $^{13}$C NMR (126 MHz, CDCl$_3$) δ 171.35, 157.07, 153.06, 145.71, 139.33, 134.35, 133.97, 132.81, 130.97, 129.43 (2C), 128.55, 126.70, 118.72 (2C), 115.25 (2C), 114.47 (2C), 109.17, 75.04, 68.40, 67.35, 51.17, 50.79, 45.62, 41.63, 34.42, 32.30, 26.90, 25.90; HRMS: m/z calcd. for C$_{31}$H$_{34}$Cl$_2$N$_2$O$_5$Na [MNa]$^+$, 607.1737; Found: 607.1740; HPLC purity 95.70%, t$_r$=3.75 min.

Carbamic Acid, N-(4-(4-Hydroxyphenyl)Piperazin-1-yl)Phenyl Ester (18a)

To a solution of 1-(4-hydroxyphenyl)piperazine (24, 0.5 g, 1.68 mmol) in dry THF (50 mL) in an ice-cold bath, was added potassium carbonate (0.3 g, 2.12 mmol) and phenyl chloroformate (0.3 g, 1.85 mmol). The mixture was stirred at room temperature for 4 h before quenching the reaction with saturated NaHCO₃. The mixture was partitioned between ethyl acetate and water and the organic layer was dried over sodium sulfate. Intermediate 18a was obtained as a white solid after column purification (SiO₂, 50% EtOAc in Hexanes). Yield: 62%. ¹H NMR (500 MHz, DMSO-d₆) δ 8.92 (s, 1H), 7.41 (t, J=7.7 Hz, 2H), 7.24 (t, J=7.3 Hz, 1H), 7.16 (d, J=7.9 Hz, 2H), 6.86 (d, J=8.4 Hz, 2H), 6.69 (d, J=8.9 Hz, 2H), 3.65 (d, J=78.0 Hz, 4H), 3.03 (s, 4H); ¹³C NMR (126 MHz, DMSO) δ 153.36, 151.65, 144.41, 129.73 (2C), 128.67, 125.69, 122.34 (2C), 119.11 (2C), 115.97 (2C), 50.75, 50.67, 44.79, 44.19.

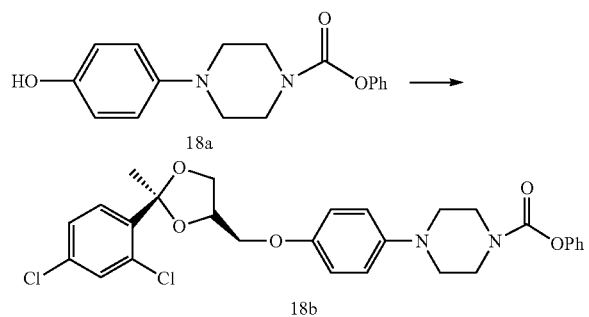

Carbamic Acid, N-(4-(4-(((2S,4R)-2-(2,4-Dichlorophenyl)-2-Methyl-1,3-Dioxolan-4-yl)Methoxy)Phenyl)Piperazin-1-yl)Phenyl Ester (18b). Following the general ether coupling method, 18b was synthesized as a white wax. Yield: 81%. ¹H NMR (500 MHz, CDCl₃) δ 7.68 (d, J=8.6 Hz, 1H), 7.45-7.37 (m, 3H), 7.25 (t, J=8.1 Hz, 2H), 7.17 (d, J=7.9 Hz, 2H), 6.93 (d, J=8.5 Hz, 2H), 6.78 (d, J=8.4 Hz, 2H), 4.65 (p, J=5.9 Hz, 1H), 4.35 (t, J=7.5 Hz, 1H), 3.99 (dd, J=9.7, 5.4 Hz, 1H), 3.89-3.85 (m, 2H), 3.82-3.69 (m, 4H), 3.15 (t, J=5.0 Hz, 4H), 1.83 (s, 3H); ¹³C NMR (126 MHz, CDCl₃) δ 153.70, 153.11, 151.34, 145.85, 139.33, 134.36, 132.81, 130.97, 129.32 (2C), 128.56, 126.71, 125.39, 121.72 (2C), 118.88 (2C), 115.27 (2C), 109.17, 75.05, 68.40, 67.34, 50.87, 50.81, 44.64, 44.06, 25.90.

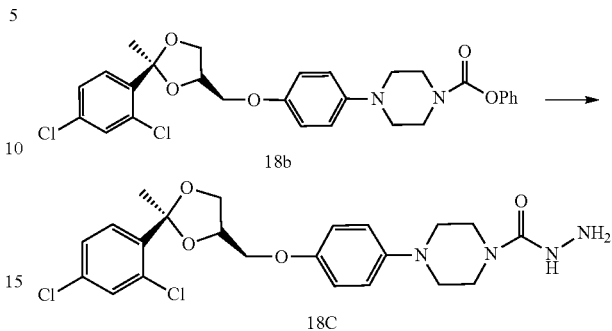

General Hydrazinolysis Method. Exemplified by N-(4-(4-(((2S,4R)-2-(2,4-Dichlorophenyl)-2-Methyl-1,3-Dioxolan-4-yl)Methoxy)Phenyl)Piperazin-1-yl)Hydrazinecarboxamide (18c). To a solution of 18b (0.2 g, 0.37 mmol) in 1,4-dioxane (50 mL), was added hydrazine hydride (1.85 mmol). The mixture was refluxed for 12 hr. The mixture was partitioned between ethyl acetate and water and the organic layer was dried through sodium sulfate. Intermediate 18c was obtained as a white solid after column purification (SiO₂, 50% MeOH in EtOAc). Yield: 89%. ¹H NMR (500 MHz, DMSO-d₆) δ 7.75 (s, 1H), 7.67 (d, J=8.6 Hz, 1H), 7.57 (d, J=2.0 Hz, 1H), 7.41 (dt, J=8.4, 1.9 Hz, 1H), 6.94-6.83 (m, 4H), 6.71 (d, J=8.8 Hz, 2H), 4.59-4.53 (m, 1H), 4.32-4.26 (m, 1H), 3.87-3.79 (m, 2H), 3.60 (t, J=8.0 Hz, 1H), 3.45-3.41 (m, 4H), 2.97-2.92 (m, 4H), 1.69 (s, 3H); ¹³C NMR (126 MHz, DMSO) δ 160.16, 152.54, 146.08, 140.03, 133.76, 132.47, 130.77, 129.38, 127.44, 118.20 (2C), 115.42 (2C), 108.64, 75.37, 68.60, 66.59, 50.12 (2C), 43.74 (2C), 26.09.

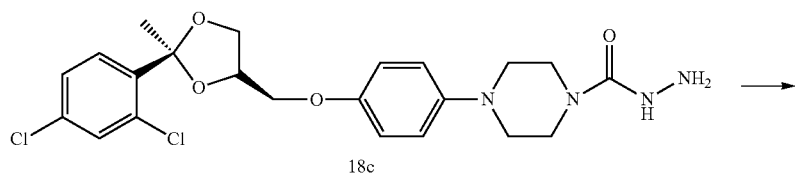

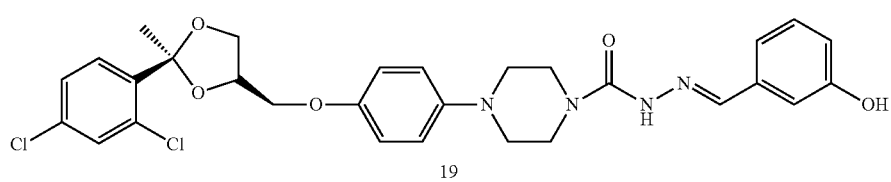

General Schiff Reaction. Exemplified by N-(4-(4-(((2S,4R)-2-(2,4-Dichlorophenyl)-2-Methyl-1,3-Dioxolan-4-yl)Methoxy)Phenyl)Piperazin-l-yl)-2-((3-hydroxyphenyl)methylene)Hydrazinecarboxamide (18). To a solution of 18c (20 mg, 0.04 mmol) in dry ethanol (20 mL), was added 3-hydroxybenzaldehyde (7 mg, 0.05 mmol). The mixture was heated to reflux for 4 h. Analogue 18 was provided as a white solid after column purification (SiO$_2$, 50% EtOAc in Hexanes). Yield: 86%. $^1$H NMR (500 MHz, CDCl$_3$) δ 8.82 (s, 1H), 7.81 (s, 1H), 7.78-7.73 (m, 1H), 7.67 (d, J=8.5 Hz, 1H), 7.60-7.55 (m, 1H), 7.42 (d, J=2.1 Hz, 1H), 7.25-7.22 (m, 1H), 7.19 (d, J=7.8 Hz, 1H), 6.97 (dd, J=7.8, 1.3 Hz, 1H), 6.91-6.88 (m, 1H), 6.86 (d, J=9.1 Hz, 2H), 6.74 (d, J=9.1 Hz, 2H), 4.64 (p, J=5.9 Hz, 1H), 4.35-4.33 (m, 1H), 3.97 (dd, J=9.7, 5.4 Hz, 1H), 3.80-3.75 (m, 6H), 3.09 (t, J=5.0 Hz, 4H), 1.82 (s, 3H); $^{13}$C NMR (126 MHz, CDCl$_3$) δ 156.45, 155.91, 152.98, 145.72, 143.43, 139.31, 135.45, 132.79, 130.97, 129.80, 128.85, 128.56, 126.71, 120.08, 118.66 (2C), 117.43, 115.22 (2C), 112.55, 109.17, 75.04, 68.38, 67.33, 50.68 (2C), 44.83 (2C), 25.89; HRMS: m/z calcd. for C$_{29}$H$_{31}$Cl$_2$N$_4$O$_5$ [MH]$^+$, 585.1666; Found: 585.1671; HPLC purity 93.20%, t$_r$=2.60 min.

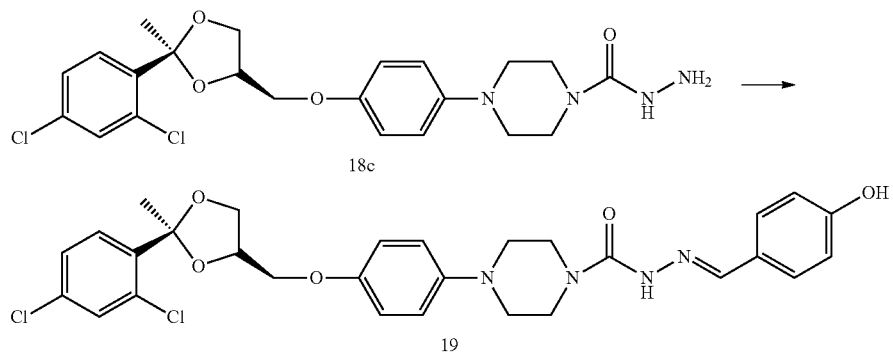

N-(4-(4-(((2S,4R)-2-(2,4-Dichlorophenyl)-2-Methyl-1,3-Dioxolan-4-yl)Methoxy)Phenyl)Piperazin-l-yl)-2-((4-hydroxyphenyl)methylene)Hydrazinecarboxamide (19). Following the general Schiff reaction protocol, 19 was synthesized as a white solid. Yield: 92%. $^1$H NMR (500 MHz, CDCl$_3$) δ 8.62 (s, 1H), 7.78 (s, 1H), 7.66 (d, J=8.5 Hz, 1H), 7.40 (d, J=2.1 Hz, 1H), 7.37 (d, J=8.3 Hz, 2H), 7.22 (dd, J=8.5, 2.1 Hz, 1H), 6.88 (s, 1H), 6.84 (d, J=9.1 Hz, 2H), 6.80 (d, J=8.3 Hz, 2H), 6.73 (d, J=9.1 Hz, 2H), 4.63 (p, J=6.0 Hz, 1H), 4.33 (dd, J=8.6, 6.3 Hz, 1H), 3.95 (dd, J=9.7, 5.4 Hz, 1H), 3.75 (td, J=8.0, 3.2 Hz, 6H), 3.07 (s, 4H), 1.81 (s, 3H); $^{13}$C NMR (126 MHz, CDCl$_3$) δ 158.10, 155.97, 152.99, 145.70, 144.17, 139.30, 134.35, 132.78, 130.96 (2C), 128.77, 128.57 (2C), 126.72, 126.11, 118.69 (2C), 115.97, 115.24 (2C), 109.17, 75.04, 68.38, 67.31, 50.69 (2C), 44.81 (2C), 25.89; HRMS: m/z calcd. for C$_{29}$H$_{31}$Cl$_2$N$_4$O$_5$ [MH]$^+$, 585.1666; Found: 585.1678; HPLC purity 91.99%, t$_r$=2.43 min.

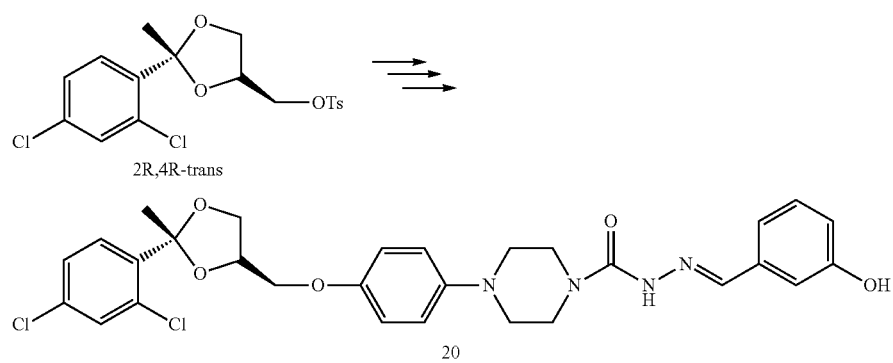

N-(4-(4-(((2R,4R)-2-(2,4-Dichlorophenyl)-2-Methyl-1,3-Dioxolan-4-yl)Methoxy)Phenyl)Piperazin-l-yl)-2-((3-hydroxyphenyl)methylene)Hydrazinecarboxamide (20). Taking dioxolane in 2R,4R-trans as the starting material, follow the same reactions in the described synthesis of 18, 20 was synthesized as a white solid. Yield: 62%. $^1$H NMR (500 MHz, CDCl$_3$) δ 8.79 (s, 1H), 7.81 (s, 1H), 7.66 (t, J=9.0 Hz, 1H), 7.43 (dd, J=17.8, 2.0 Hz, 1H), 7.30-7.23 (m, 1H), 7.23-7.19 (m, 2H), 7.00 (d, J=7.6 Hz, 1H), 6.90 (s, 3H), 6.87 (t, J=8.6 Hz, 2H), 6.74 (d, J=8.8 Hz, 1H), 4.36 (dq, J=10.8, 5.8 Hz, 1H), 4.15-4.12 (m, 1H), 4.07-3.94 (m, 2H), 3.88 (t, J=7.7 Hz, 1H), 3.84-3.73 (m, 4H), 3.11 (q, J=8.9, 6.8 Hz, 4H), 1.86 (s, 3H); $^{13}$C NMR (126 MHz, CDCl$_3$) δ 156.42, 155.98, 153.16, 145.80, 143.32, 135.48, 134.58, 131.20, 129.82, 128.90, 126.80, 120.05, 118.70 (2C), 118.66, 117.39, 115.46 (2C), 115.23, 112.61, 109.11, 73.93, 69.23, 66.97, 50.70 (2C), 44.89 (2C), 25.73; HRMS: m/z calcd. for C$_{29}$H$_{31}$Cl$_2$N$_4$O$_5$ [MH]$^+$, 585.1666; Found: 585.1670; HPLC purity 93.29%, t$_r$=2.89 min.

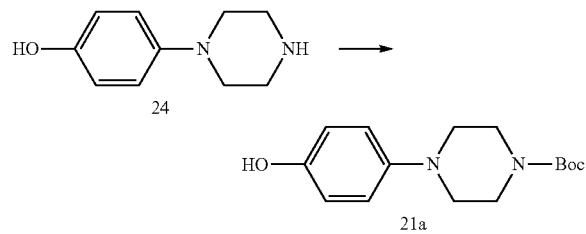

tert-Butyloxy-N-(4-(4-Hydroxyphenyl)Piperazin-1-yl)Formamide (21a)

To a solution of 1-(4-hydroxyphenyl)piperazine (24, 0.3 g, 1.68 mmol) in DCM (20 mL), was added TEA (1 mL) and (Boc)$_2$O (0.4 g, 1.83 mmol). After stirring at room temperature for 2 h, the reaction was quenched with water. The mixture was partitioned between DCM (100 mL) and brine (100 mL). The organic layer was washed with brine (100 mL×2). The crude product was purified by column chromatography (SiO$_2$, 30% EtOAc in hexanes) to give 21a as a white solid (0.43 g, 93%). $^1$H NMR (500 MHz, DMSO-d$_6$) δ 8.91 (s, 1H), 6.81 (d, J=8.9 Hz, 2H), 6.67 (d, J=8.9 Hz, 2H), 3.44 (t, J=5.0 Hz, 4H), 2.90 (t, J=5.1 Hz, 4H), 1.43 (s, 9H); $^{13}$C NMR (126 MHz, DMSO) δ 154.32, 151.83, 144.53, 119.00 (2C), 115.92 (2C), 79.37, 50.77, 28.54 (3C).

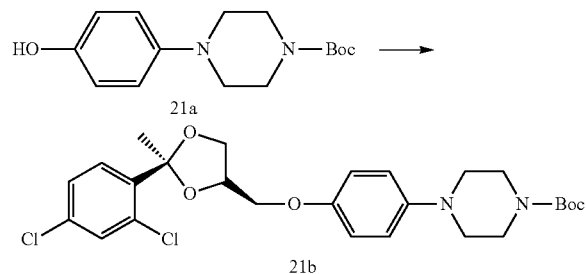

tert-Butyloxy-N-(4-(4-(((2S,4R)-2-(2,4-Dichlorophenyl)-2-Methyl-1,3-Dioxolan-4-yl)Methoxy)Phenyl)Piperazin-1-yl) Formamide (21b).

Following the general ether coupling method, 21b was synthesized as a colorless oil. Yield: 98%. $^1$H NMR (500 MHz, CDCl$_3$) δ 7.67 (d, J=8.5 Hz, 1H), 7.42 (d, J=2.1 Hz, 1H), 7.23 (dd, J=8.4, 2.1 Hz, 1H), 6.89 (d, J=9.0 Hz, 2H), 6.75 (d, J=9.0 Hz, 2H), 4.64 (p, J=6.1 Hz, 1H), 4.34 (dd, J=8.6, 6.3 Hz, 1H), 3.98 (dd, J=9.7, 5.4 Hz, 1H), 3.80-3.74 (m, 2H), 3.64-3.57 (m, 4H), 3.04 (t, J=5.1 Hz, 4H), 1.82 (s, 3H), 1.52 (s, 9H); $^{13}$C NMR (126 MHz, CDCl$_3$) δ 154.74, 152.87, 146.09, 139.33, 134.35, 132.80, 130.96, 128.56, 126.70, 118.66 (2C), 115.21 (2C), 109.15, 79.86, 77.28, 77.03, 76.77, 75.05, 68.40, 67.37, 50.78 (4C), 28.46 (3C), 25.89.

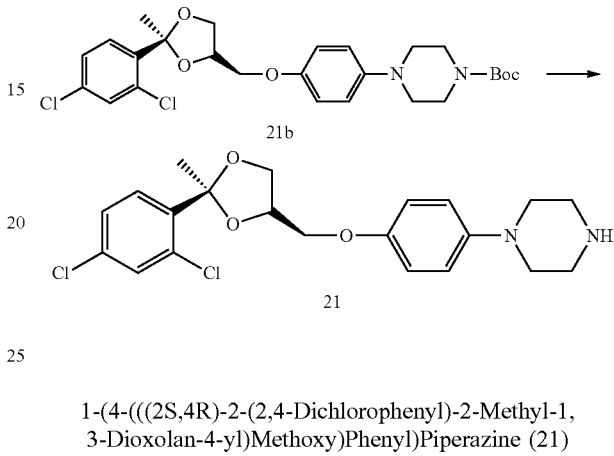

1-(4-(((2S,4R)-2-(2,4-Dichlorophenyl)-2-Methyl-1, 3-Dioxolan-4-yl)Methoxy)Phenyl)Piperazine (21)

To a solution of 21b (40 mg, 0.076 mmol) in DCM (20 mL), was added 2,6-lutidine (1 mL). TMSOTf (33 mg, 0.15 mmol) was added to the mixture dropwise while in an ice-cooled bath. After stirring at room temperature for 12 hr, the reaction was quenched with saturated NH$_4$Cl. Then the mixture was partitioned between DCM (50 mL) and brine (50 mL). The organic layer was washed with brine (50 mL×2). Crude product was purified by column chromatography (SiO$_2$, 50% EtOAc in hexanes) to give 21 as a white solid (23 mg, 72%). $^1$H NMR (500 MHz, CDCl$_3$/MeOD-d$_4$) δ 7.61 (d, J=8.4 Hz, 1H), 7.34 (d, J=2.1 Hz, 1H), 7.18 (dd, J=8.5, 2.1 Hz, 1H), 6.86 (d, J=8.9 Hz, 2H), 6.70 (d, J=8.9 Hz, 2H), 4.58 (p, J=6.0 Hz, 1H), 4.28 (dd, J=8.6, 6.4 Hz, 1H), 4.12-4.08 (m, 1H), 3.89 (dd, J=9.9, 5.4 Hz, 1H), 3.79-3.69 (m, 2H), 3.28 (q, J=3.8, 3.0 Hz, 4H), 3.23-3.20 (m, 4H), 1.75 (s, 3H); $^{13}$C NMR (126 MHz, CDCl$_3$/MeOD) δ 153.80, 144.57, 139.16, 134.29, 132.67, 130.83, 128.48, 126.64, 119.27 (2C), 115.27 (2C), 109.13, 75.03, 68.22, 66.99, 44.01 (4C), 25.66. HRMS: m/z calcd. for C$_{21}$H$_{25}$Cl$_2$N$_2$O$_3$ [MH]$^+$, 423.124; Found: 423.122; HPLC purity 92.02%, t$_r$=1.85 min.

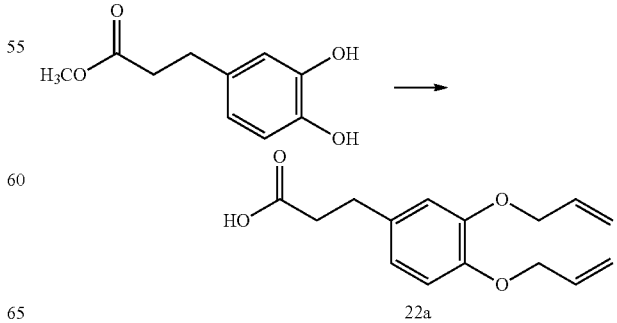

4-(Allyloxy)Benzoic Acid (22a)

Following the general allyl protection method, 22a was synthesized as a white solid. No purification was needed. Yield: 79%. $^1$H NMR (500 MHz, DMSO-$d_6$) δ 12.10 (s, 1H), 6.92-6.84 (m, 2H), 6.73 (dd, J=8.2, 2.0 Hz, 1H), 6.05 (dddt, J=15.7, 10.4, 8.2, 5.2 Hz, 2H), 5.45-5.37 (m, 2H), 5.25 (ddq, J=10.4, 7.1, 1.6 Hz, 2H), 4.54 (ddt, J=11.8, 5.2, 1.7 Hz, 4H), 2.75 (t, J=7.7 Hz, 2H), 2.50 (d, J=7.6 Hz, 2H); $^{13}$C NMR (126 MHz, DMSO) δ 174.30, 148.31, 146.74, 134.58, 134.46, 134.26, 120.90, 117.63, 117.52, 114.89, 114.69, 69.60, 69.45, 35.92, 30.40.

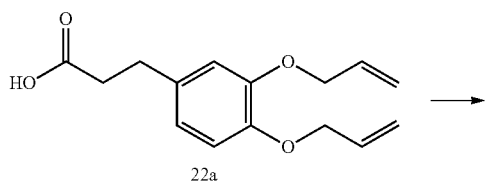

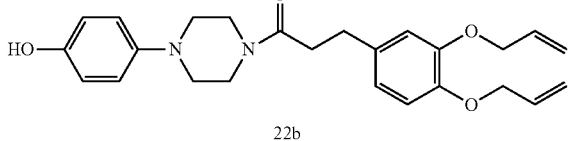

3,4-Bis-Allyloxy-N-(4-(4-Hydroxyphenyl)Piperazin-1-yl)Hydrocinnamamide (22b)

Following the general amide coupling method, 22b was synthesized as a colorless oil. Yield: 81%. $^1$H NMR (500 MHz, DMSO-$d_6$) δ 8.89 (s, 1H), 6.91-6.88 (m, 1H), 6.87 (d, J=8.2 Hz, 1H), 6.79 (d, J=8.9 Hz, 2H), 6.75 (dd, J=8.2, 1.9 Hz, 1H), 6.67 (d, J=8.9 Hz, 2H), 6.04 (dtt, J=21.7, 10.4, 5.2 Hz, 2H), 5.40 (t, J=17.9 Hz, 2H), 5.24 (t, J=11.6 Hz, 2H), 4.53 (dd, J=24.7, 5.1 Hz, 4H), 3.56 (dt, J=26.8, 5.0 Hz, 4H), 2.86 (dt, J=14.4, 5.1 Hz, 4H), 2.79-2.72 (m, 2H), 2.63 (t, J=7.7 Hz, 2H); $^{13}$C NMR (126 MHz, DMSO) δ 170.49, 151.82, 148.36, 146.72, 144.43, 134.72, 134.58, 134.50, 121.17, 118.91 (2C), 117.60, 117.49, 115.94 (2C), 115.12, 114.77, 109.98, 69.65, 69.50, 51.13, 50.77, 45.52, 41.63, 34.51, 30.94.

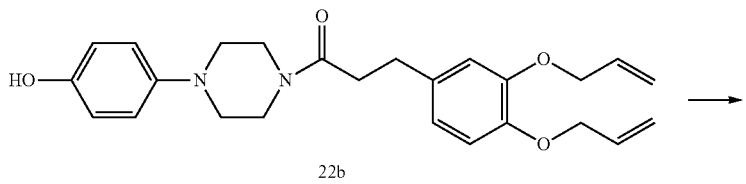

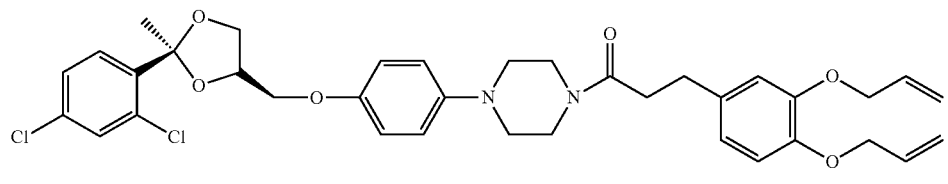

3,4-Bis-Allyloxy-N-(4-(4-(((2S,4R)-2-(2,4-Dichlorophenyl)-2-Methyl-1,3-Dioxolan-4-yl)Methoxy)Phenyl)Piperazin-1-yl)Hydrocinnamamide (22c). Following the general ether coupling method, 22c was synthesized as a white wax. Yield: 92%. $^1$H NMR (500 MHz, CDCl$_3$) δ 7.67 (d, J=8.5 Hz, 1H), 7.42 (d, J=2.1 Hz, 1H), 7.23 (dd, J=8.5, 2.1 Hz, 1H), 6.92-6.74 (m, 7H), 6.11 (dtt, J=16.2, 10.7, 5.3 Hz, 2H), 5.50-5.40 (m, 2H), 5.34-5.24 (m, 2H), 4.63 (dt, J=5.3, 1.5 Hz, 3H), 4.60 (dt, J=5.2, 1.5 Hz, 2H), 4.34 (dd, J=8.6, 6.4 Hz, 1H), 3.97 (dd, J=9.7, 5.3 Hz, 1H), 3.84-3.75 (m, 4H), 3.56 (t, J=5.1 Hz, 2H), 3.03 (t, J=5.2 Hz, 2H), 2.99-2.92 (m, 5H), 2.70-2.63 (m, 2H), 1.82 (s, 3H); $^{13}$C NMR (126 MHz, CDCl$_3$) δ 170.76, 153.27, 153.07, 148.63, 147.11, 145.69, 139.33, 134.34, 133.68, 133.59, 132.81, 130.97, 128.55, 126.69, 120.88, 118.79, 118.74 (2C), 117.52, 117.44, 115.23 (2C), 114.95, 114.61, 75.03, 70.19, 70.09, 68.38, 67.34, 51.02, 50.79, 45.67, 41.70, 35.17, 31.16, 25.89.

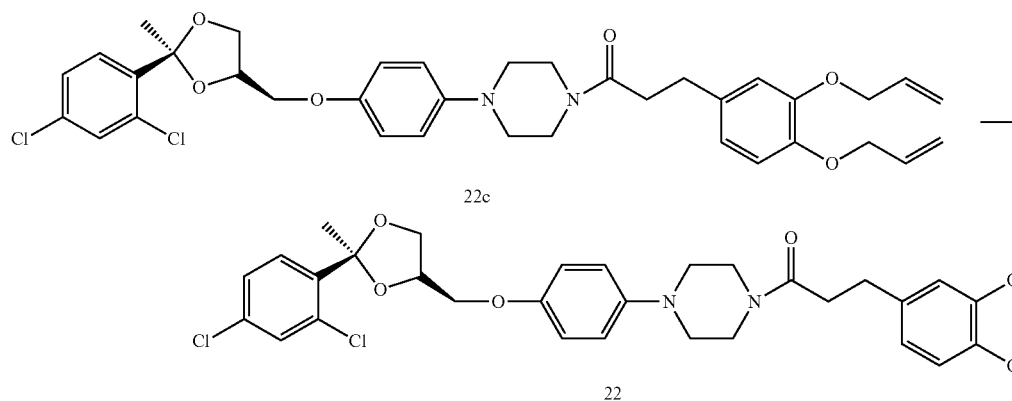

3,4-Bis-Hydroxy-N-(4-(4-(((2S,4R)-2-(2,4-Dichlorophenyl)-2-Methyl-1,3-Dioxolan-4-yl)Methoxy)Phenyl)Piperazin-1-yl)Hydrocinnamamide (22). Following the general de-protection method, 22 was synthesized as a white wax. Yield: 71%. $^1$H NMR (500 MHz, CDCl$_3$) δ 7.67 (d, J=8.6 Hz, 1H), 7.42 (d, J=2.1 Hz, 1H), 7.23 (dd, J=8.5, 2.1 Hz, 1H), 6.91 (dd, J=2.9, 1.1 Hz, 1H), 6.86 (dd, J=8.6, 3.0 Hz, 3H), 6.82-6.71 (m, 3H), 6.26-6.12 (brs, 1H), 6.12-5.96 (brs, 1H), 4.64 (p, J=6.1 Hz, 1H), 4.34 (dd, J=8.6, 6.4 Hz, 1H), 4.24-4.20 (m, 2H), 3.98 (dd, J=9.7, 5.3 Hz, 1H), 3.91 (t, J=5.3 Hz, 2H), 3.81-3.75 (m, 2H), 3.60-3.46 (m, 2H), 3.24-3.11 (m, 2H), 2.93-2.83 (m, 2H), 2.69-2.60 (m, 2H), 1.82 (s, 3H); $^{13}$C NMR (126 MHz, CDCl$_3$) δ 170.79, 152.95, 148.47, 146.53, 144.93, 139.33, 134.34, 132.80, 130.96, 128.54, 126.69, 120.80, 118.70, 118.03 (2C), 115.30 (2C), 115.22, 113.15, 109.17, 75.03, 68.40, 67.33, 57.71, 50.97, 50.72, 45.69, 45.21, 41.68, 25.89. HRMS: m/z calcd. for C$_{30}$H$_{33}$Cl$_2$N$_2$O$_6$ [MH]$^+$, 587.171; Found: 587.169; HPLC purity 92.38%, t$_r$=2.92 min.

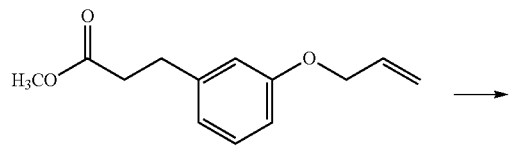

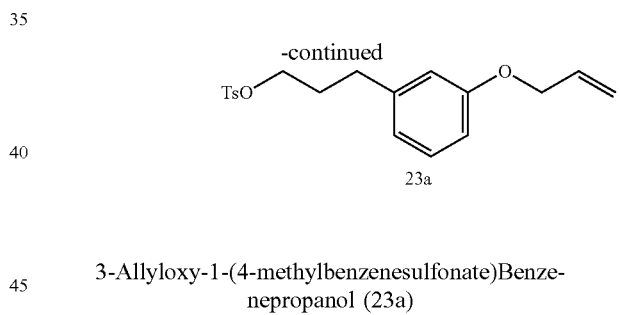

3-Allyloxy-1-(4-methylbenzenesulfonate)Benzenepropanol (23a)

To a solution of methyl 3-allyloxy-benzenepropionate (1 g, 4.5 mmol) in THF (50 mL), was added LiAlH$_4$ (5 mL, 1M in THF) dropwise under ice-cold bath. After stirring at room temperature for 2 h, 20 mL water was added to the mixture to quench the reaction. The mixture was then partitioned between EtOAc and brine. The organic layer was dried over sodium sulfate. The crude product was redissolved in DCM (50 mL) before pyridime (5 mL) and TsCl (1.9 g, 10 mmol) was added. After stirring at room temperature for 12 hr, the mixture was quenched with water before partitioning the mixture between DCM and brine. The organic layer was washed with brine. The crude product was purified by column chromatography (SiO$_2$, 20% EtOAc in hexanes) to give 23a as a colorless oil (1.4 g, 93%). $^1$H NMR (500 MHz, CDCl$_3$) δ 7.88-7.78 (m, 2H), 7.39 (d, J=8.0 Hz, 2H), 7.19 (t, J=8.0 Hz, 1H), 6.83-6.76 (m, 1H), 6.71 (d, J=7.0 Hz, 2H), 6.10 (ddt, J=17.3, 10.5, 5.3 Hz, 1H), 5.51-5.30 (m, 2H), 4.55 (dt, J=5.2, 1.6 Hz, 2H), 4.08 (t, J=6.2 Hz, 2H), 2.67 (t, J=7.6 Hz, 2H), 2.49 (s, 3H), 2.00 (dt, J=13.5, 6.4 Hz, 2H); $^{13}$C NMR (126 MHz, CDCl$_3$) δ 158.78, 144.80, 142.02, 133.39, 133.17, 129.91 (2C), 129.46, 127.91 (2C), 120.98, 117.57, 115.05, 112.31, 69.69, 68.71, 31.53, 30.37, 21.67.

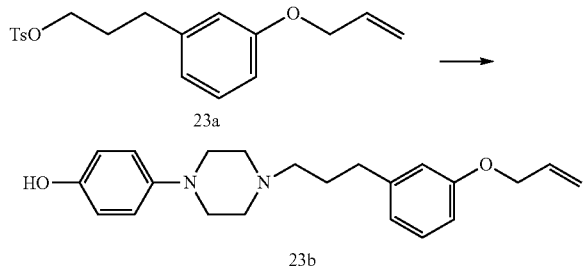

3-Allyloxy-N-(4-(4-Hydroxyphenyl)Piperazin-1-yl) Phenylpropylamine (23b)

To a solution of 24 (80 mg, 0.45 mmol) in DMF, was added potassium carbonate (125 mg) and 23a (187 mg, 0.54 mmol). The reaction was stirring at 40° C. for 4 h. The mixture was partitioned between EtOAc and brine and the organic layer was washed with brine. The crude product was purified by column chromatography (SiO$_2$, EtOAc) to give 23b as a colorless oil (65 mg, 41%). $^1$H NMR (500 MHz, DMSO-d$_6$) δ 8.81 (s, 1H), 7.19 (t, J=7.8 Hz, 1H), 6.83-6.74 (m, 5H), 6.65 (d, J=8.9 Hz, 2H), 6.05 (ddt, J=17.3, 10.5, 5.2 Hz, 1H), 5.46-5.20 (m, 2H), 4.56 (dt, J=5.2, 1.6 Hz, 2H), 2.96 (t, J=4.9 Hz, 4H), 2.58 (t, J=7.6 Hz, 2H), 2.49 (t, J=4.9 Hz, 4H), 2.32 (t, J=7.3 Hz, 2H), 1.76 (p, J=7.4 Hz, 2H); $^{13}$C NMR (126 MHz, CDCl$_3$) δ 158.68, 149.64, 145.79, 143.74, 133.45, 129.26, 121.03, 118.41 (2C), 117.56, 115.88 (2C), 115.07, 111.91, 68.74, 58.00, 53.36 (2C), 50.68 (2C), 33.78, 28.40.

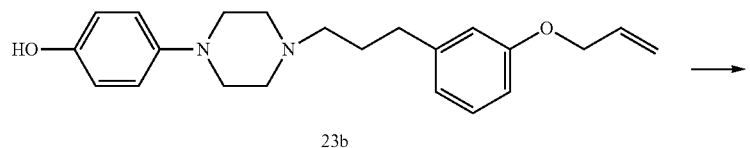

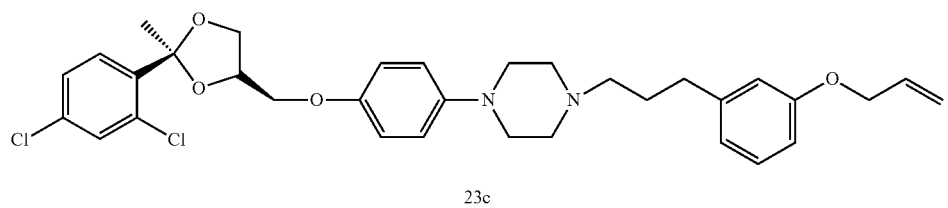

3-Allyloxy-N-(4-(4-(((2S,4R)-2-(2,4-Dichlorophenyl)-2-Methyl-1,3-Dioxolan-4-yl)Methoxy)Phenyl)Piperazin-1-yl) Phenylpropylamine (23c). Following the general ether coupling method, 23c was synthesized as a colorless oil. Yield: 39%. $^1$H NMR (500 MHz, CDCl$_3$) δ 7.70-7.63 (m, 1H), 7.42 (d, J=2.1 Hz, 1H), 7.23 (dd, J=11.5, 3.1 Hz, 2H), 6.96-6.86 (m, 3H), 6.86-6.77 (m, 3H), 6.74 (d, J=9.1 Hz, 1H), 6.10 (ddd, J=16.9, 10.6, 5.3 Hz, 1H), 5.49-5.29 (m, 2H), 4.64 (p, J=6.1 Hz, 1H), 4.57 (dd, J=5.3, 1.3 Hz, 2H), 4.34 (dd, J=8.6, 6.4 Hz, 1H), 4.15-4.12 (m, 1H), 3.98 (dd, J=9.6, 5.2 Hz, 1H), 3.78-3.72 (m, 1H), 3.14 (dt, J=10.0, 4.9 Hz, 4H), 2.66 (dq, J=15.3, 5.3 Hz, 6H), 2.50-2.42 (m, 2H), 1.89 (ddd, J=10.9, 5.0, 2.2 Hz, 2H), 1.82 (s, 3H); $^{13}$C NMR (126 MHz, CDCl$_3$) δ 171.15, 158.67, 152.39, 146.20, 143.78, 133.44, 130.96, 129.26, 128.60, 126.70, 121.03, 117.98 (2C), 117.94, 117.57, 115.40, 115.15 (2C), 115.07, 111.87, 109.12, 75.06, 68.73, 67.41, 57.98, 53.33 (2C), 50.49 (2C), 33.77, 28.50, 25.89, 21.08.

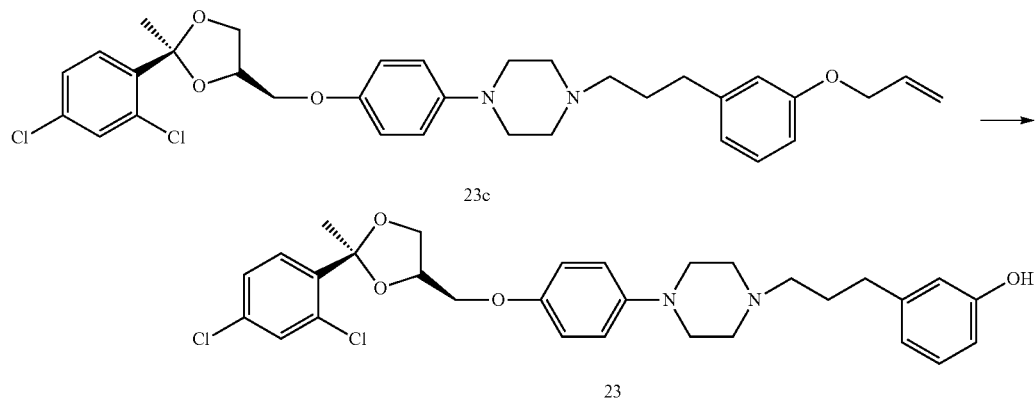

3-Hydroxy-N-(4-(4-(((2S,4R)-2-(2,4-Dichlorophenyl)-2-Methyl-1,3-Dioxolan-4-yl)Methoxy)Phenyl)Piperazin-1-yl) Phenylpropylamine (23). Following the general de-protection method, 23 was synthesized as a white wax. Yield: 41%. $^1$H NMR (500 MHz, CDCl$_3$) δ 7.69-7.63 (m, 1H), 7.43 (dd, J=15.1, 2.1 Hz, 1H), 7.23 (dd, J=8.3, 2.3 Hz, 2H), 6.96-6.78 (m, 6H), 6.78-6.71 (m, 2H), 4.64 (p, J=6.1 Hz, 1H), 4.34 (dd, J=8.7, 6.4 Hz, 1H), 4.09-4.05 (m, 1H), 3.98 (dt, J=9.7, 6.1 Hz, 1H), 3.76 (ddd, J=10.2, 6.6, 3.4 Hz, 1H), 3.19-3.11 (m, 4H), 2.73-2.63 (m, 6H), 2.54-2.47 (m, 2H), 1.97 (dd, J=13.1, 6.4 Hz, 2H), 1.82 (s, 3H); $^{13}$C NMR (126 MHz, CDCl$_3$) δ 158.50, 139.33, 138.15, 134.34, 132.78, 131.19, 130.96, 129.40, 128.91, 128.59, 126.78, 126.70, 121.39, 118.08, 118.01, 115.41, 115.17, 114.71, 111.82, 109.10, 75.06, 70.35, 68.42, 67.40, 53.23, 53.18, 50.35, 50.24, 29.72, 25.89. HRMS: m/z calcd. for $C_{30}H_{35}Cl_2N_2O_4$ [MH]$^+$, 557.197; Found: 557.197; HPLC purity 93.00%, t$_r$=3.00 min.

Biological Assay Protocols:

General protocols for cell culture, qPCR, and Hh inhibition in ASZ001 cells, C3H10T1/2 cells, and Sufu$^{-/-}$ MEFs cells are as previously described (Pace et al. "Repurposing the clinically efficacious antifungal agent itraconazole as an anticancer chemotherapeutic. *J. Med. Chem.* 2016, 59, 3635-3649; Maschinot et al. "Synthesis and evaluation of third generation vitamin D3 analogues as inhibitors of Hedgehog signaling." *Eur. J. Med. Chem.* 2019, 162, 495-506.). HC-04 cells were maintained in Dulbecco's modified Eagle's medium (Gibco Life Technologies) supplemented with 10% heat-inactivated fetal bovine serum (Gibco) and 1% pen-strep (Gibco) at 37° C. in 5% CO$_2$. Cells were split 1:5 every 2-3 days, once they reached ~80% confluency. Antiproliferation assay against HC-04 cells was using MTS method. The general protocol was the same as described earlier. (Banerjee et al. "Evaluation of vitamin D3 A-ring analogues as hedgehog pathway inhibitors." *Bioorg. Med. Chem. Lett.* 2012, 22, pp. 1330-1334.) All data were analyzed with GraphPad Prism 5 and reported values represent the mean±SEM for at least two separate experiments carried out in triplicate for qPCR assay; or performed for at least three separate experiments carried out in quadruplicate for MTS assay.

Included are the following aspects:

Aspect 1: A compound having the structure of Formula (I)

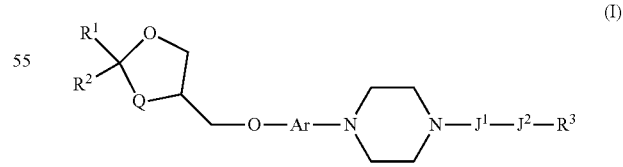

wherein Q is O or CH$_2$; Ar is unsubstituted or substituted aryl or heteroaryl; J$^1$ is absent, —C(=O)—, —C(=O)O—, —C(=O)NH—, —C(=O)NH—NH—, or —C(=O)NH—N=CH—; J$^2$ is absent, C$_{1-4}$ alkyl, C$_{2-4}$ alkenyl, or C$_{2-4}$ alkynyl; R$^1$ is C$_{1-6}$ alkyl optionally substituted with an amino, C$_{1-6}$ alkylamino, C$_{1-6}$ dialkylamino, N-acylamino, —COOH, aryl, heterocycle, pyrrolidine, pyrrole, or pyridinyl group; $R^2$ is $C_{1-6}$ alkyl or unsubstituted or substituted aryl or heteroaryl; $R^3$ is H, $C_{1-6}$ alkyl, $C_{1-6}$ alkoxy, $C_{2-6}$ alkanoyl, $C_{1-6}$ alkoxycarbonyl, $C_{1-6}$ haloalkyl, $C_{3-8}$ cycloalkyl, heterocycloalkyl, or unsubstituted or substituted aryl or heteroaryl, wherein each substituted aryl or heteroaryl individually is substituted with 1, 2, or 3 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy; or a pharmaceutically acceptable salt, a stereoisomeric form thereof, or a combination thereof.

Aspect 2: The compound of Aspect 1, wherein Q is O; Ar is phenyl, pyridine, pyrazine, or pyridazine; $J^1$ is a —C(=O)— or —C(=O)NH—N=CH—; $J^2$ is absent, $C_{1-4}$ alkyl, or $C_{2-4}$ alkenyl; $R^1$ is $C_{1-6}$ alkyl; $R^2$ is unsubstituted or substituted aryl; and $R^3$ is H or unsubstituted or substituted aryl or heteroaryl; wherein each substituted aryl or heteroaryl individually is substituted with 1 or 2 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

Aspect 3: The compound of Aspect 1 or 2, wherein Ar is phenyl.

Aspect 4: The compound of any one of Aspects 1-3, wherein $R^1$ is methyl optionally substituted with 1-pyrrole, 3-pyridine, 4-pyridine, phenyl, m-aminophenyl, p-aminophenyl, acetylamine, 1-pyrrolidine, amino, or dimethylamino; and $R^2$ is unsubstituted or substituted phenyl.

Aspect 5: The compound of any one of Aspects 1-4, wherein $R^1$ is methyl and $R^2$ is 2,4-dichlorophenyl or 2,4-difluorophenyl.

Aspect 6: The compound of Aspect 1, having the Formula (Ia)

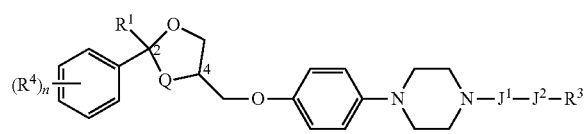

(Ia)

wherein each of Q, $R^1$, $R^3$, $J^1$, and $J^2$ are as previously defined; n is 1, 2, or 3; and each $R^4$ independently is $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

Aspect 7: The compound of Aspect 6, having the Formula (Ia-1), (Ia-2), (Ia-3), or (Ia-4)

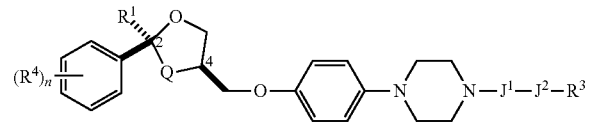

(Ia-1)

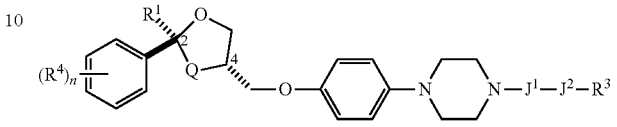

(Ia-2)

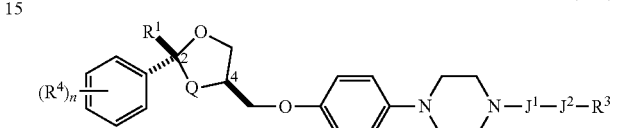

(Ia-3)

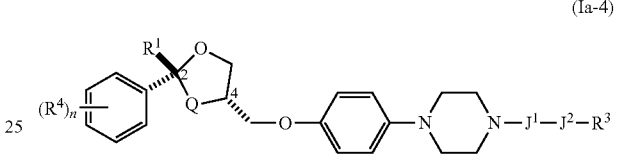

(Ia-4)

wherein each of Q, $R^1$, $R^3$, $J^1$, and $J^2$ are as previously defined; n is 1, 2, or 3; and each $R^4$ independently is $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

Aspect 8: The compound of Aspect 6 or 7, wherein Q is O; $J^1$ is absent, —C(=O)—, or —C(=O)NH—N=CH—; $J^2$ is absent, $C_{1-4}$ alkyl, or $C_{2-4}$ alkenyl; $R^1$ is $C_{1-6}$ alkyl; and $R^3$ is H or unsubstituted or substituted aryl or heteroaryl; wherein each substituted aryl or heteroaryl individually is substituted with 1 or 2 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy.

Aspect 9: The compound of Aspect 8, wherein n is 2 and each $R^4$ is halo.

Aspect 10: 10. The compound of Aspect 1, wherein the compound is compound 2, 3, 4, 5, 6, 7, 8, 9, 10, 11, 12, 13, 14, 15, 16, 17, 18, 19, or 20 of Table 1 or compound 21, 22, or 23 of Table 3.

Aspect 11: A pharmaceutical composition comprising the compound of any one of Aspects 1-10 and a pharmaceutically acceptable excipient.

Aspect 12: A method of treating a cell proliferation disorder in a subject in need thereof, comprising administering a therapeutically effective amount of the compound of any one of Aspects 1-10 or a pharmaceutical composition of Aspect 11.

Aspect 13: The method of Aspect 12, wherein the cell proliferation disorder is dependent upon the Hh signaling pathway.

Aspect 14: The method of Aspect 12 or 13, wherein the cell proliferation disorder is cancer.

Aspect 15: The method of Aspect 14, wherein the cancer is basal cell carcinoma (BCC) or medulloblastoma (MB).

Aspect 16: The method of Aspect 14, wherein the cancer is resistant to Vismodegib.

Aspect 17: The method of Aspect 14, wherein the cancer is chronic myeloid leukemia, lung cancer, prostate cancer, pancreatic cancer or bone cancer.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. Recitation of ranges of values are merely intended to serve as a shorthand method of referring individually to each separate value falling within the range, unless otherwise indicated herein, and each separate value is incorporated into the specification as if it were individually recited herein. The endpoints of all ranges directed to the same component or property are inclusive of the endpoints, are independently combinable, and include all intermediate points and ranges. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. The term "or" means "and/or."

In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims. "Optional" or "optionally" means that the subsequently described event or circumstance may or may not occur, and that the description includes instances where the event occurs and instances where it does not.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

The invention claimed is:

1. A compound having the structure of Formula (Ia-1), (Ia-2), (Ia-3), or (Ia-4)

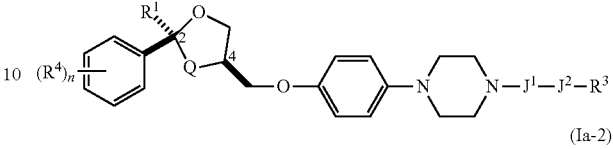

(Ia-1)

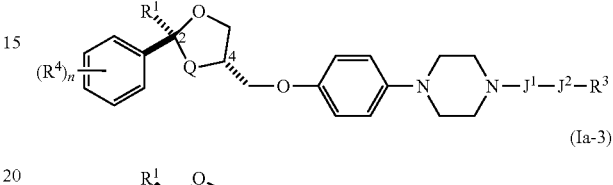

(Ia-2)

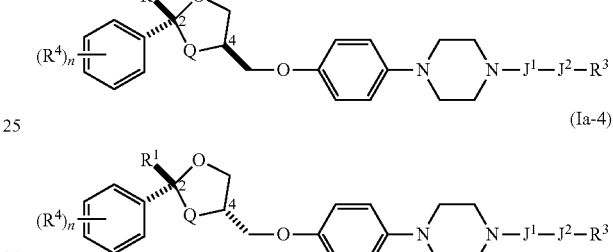

(Ia-3)

(Ia-4)

wherein
Q is O;
$R^1$ is methyl;
$R^4$ is chloro;
n is 2; and
one of a), b), or c):
a) $J^1$ and $J^2$ are absent and $R^3$ is H;
b) $J^1$ is —C(=O)— or —C(=O)NH—N=CH—;
$J^2$ is absent, $C_{1-4}$ alkyl, or $C_{2-4}$ alkenyl; and
$R^3$ is unsubstituted or substituted phenyl or pyridyl; or
c) $J^1$ is absent; $J^2$ is $C_{3-4}$ alkyl; and $R^3$ is unsubstituted or substituted phenyl;
wherein each substituted phenyl or pyridyl individually is substituted with 1, 2, or 3 substituents, each substituent is independently $C_{1-6}$ alkyl, halo, —OH, —COOH, cyano, nitro, amino, $C_{1-6}$ monoalkylamine, $C_{1-6}$ dialkylamine, $C_{1-6}$ haloalkyl, or $C_{1-6}$ haloalkoxy; or
a pharmaceutically acceptable salt, a stereoisomeric form thereof, or a combination thereof.

2. The compound of claim 1, wherein
Q is O;
$J^1$ is a —C(=O)— or —C(=O)NH—N=CH—;
$J^2$ is absent, $C_{1-4}$ alkyl, or $C_{2-4}$ alkenyl;
and
$R^3$ is unsubstituted or substituted phenyl or pyridyl.

3. The compound of claim 1, wherein the phenyl substituted with $(R^4)n$ is 2,4-dichlorophenyl.

4. The compound of claim 1, wherein
$J^1$ is absent;
$J^2$ is $C_{3-4}$ alkyl;
and
$R^3$ is unsubstituted or substituted phenyl.

5. The compound of claim 1 or a pharmaceutically acceptable salt thereof, wherein the compound is
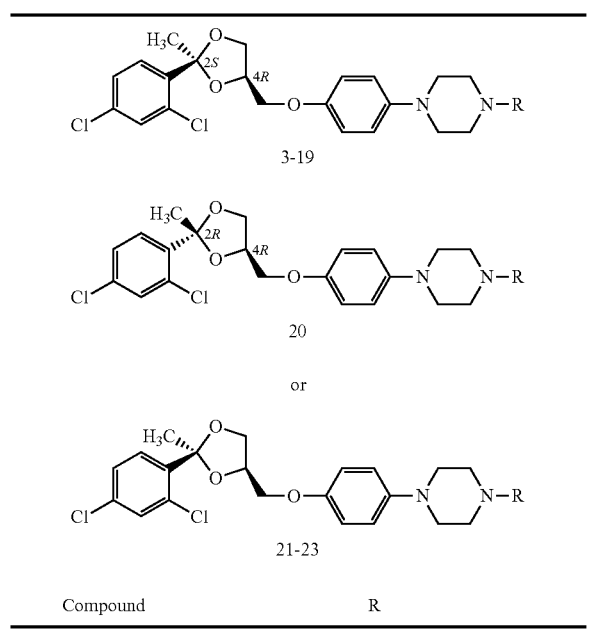
3-19
20
or
21-23
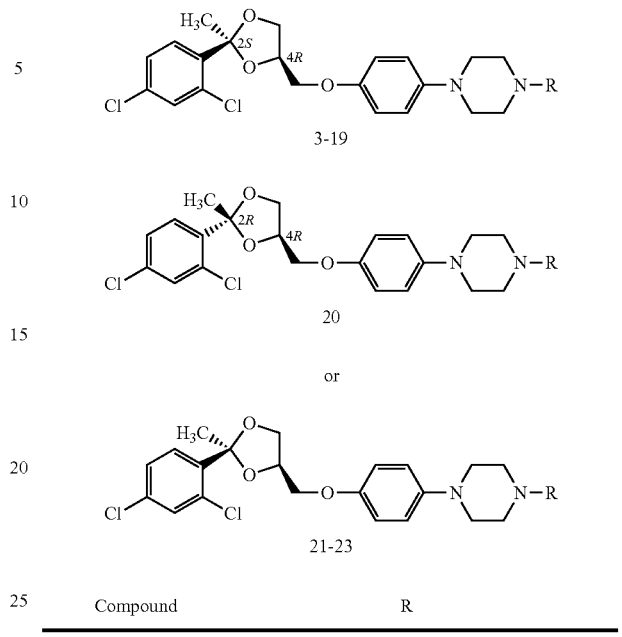
3-19
20
or
21-23
| Compound | R |
|---|---|
| 3 | |
| 4 | |
| 5 | |
| 6 | |
| 7 | |
| 8 | |
| 9 | |
| 10 | acetyl) |
| 11 | propanoyl) |
| 12 | acryloyl) |
| 13 | propanoyl) |
| 14 | acryloyl) |

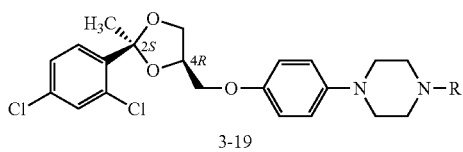

3-19

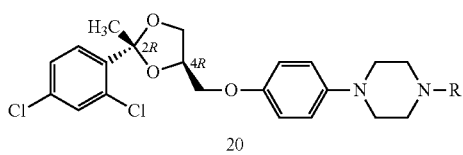

20 or

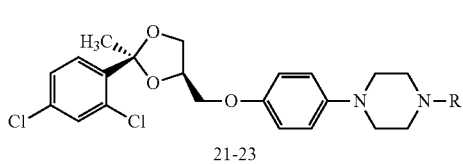

21-23

| Compound | R |
|---|---|
| 15 | 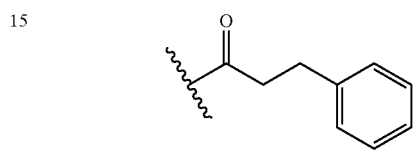 |
| 16 | 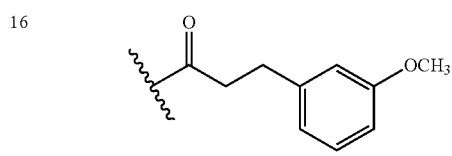 |
| 17 | 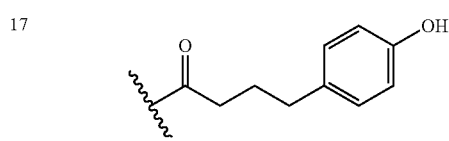 |
| 18 | 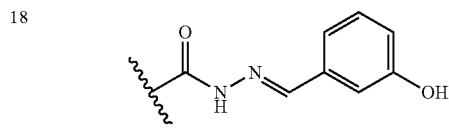 |
| 19 | 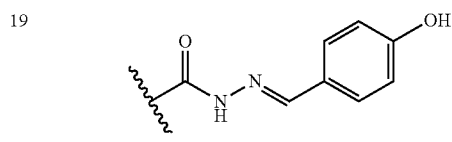 |
| 20 | 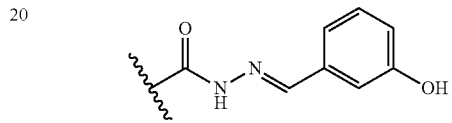 |
| 21 | —H |

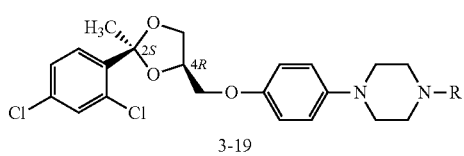

3-19

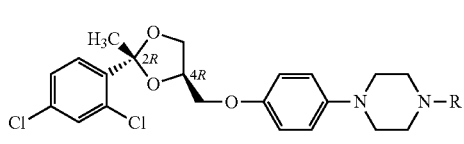

20 or

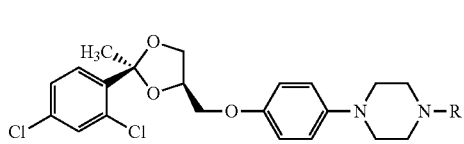

21-23

| Compound | R |
|---|---|
| 22 | 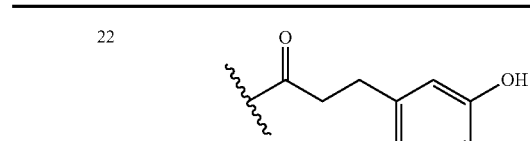 |
| 23 | 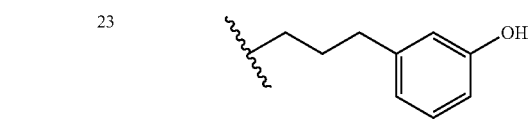 |

6. A pharmaceutical composition comprising the compound of claim 1 and a pharmaceutically acceptable excipient.

7. A method of treating a cell proliferation disorder in a subject in need thereof, comprising administering a therapeutically effective amount of the compound of claim 1, wherein the cell proliferation disorder is basal cell carcinoma or medulloblastoma, and wherein the treating reduces the severity of the cell proliferation disorder, slows the progression of the cell proliferation disorder, or a combination thereof.

8. The method of claim 7, wherein the cell proliferation disorder is resistant to Vismodegib.

9. A method of treating a cell proliferation disorder in a subject in need thereof, comprising administering a therapeutically effective amount of the pharmaceutical composition of claim 6,
wherein the cell proliferation disorder is basal cell carcinoma or medulloblastoma, and
wherein the treating reduces the severity of the cell proliferation disorder, slows the progression of the cell proliferation disorder, or a combination thereof.

10. The compound of claim 1, wherein the compound is

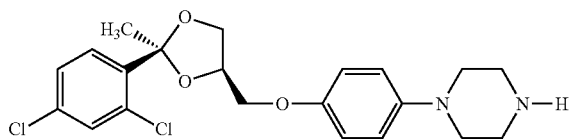 [SMILES: C[C@]1(c2ccc(Cl)cc2Cl)OC[C@@H](COc2ccc(N3CCNCC3)cc2)O1]

or a pharmaceutically acceptable salt thereof.

11. A pharmaceutical composition comprising the compound of claim 5 and a pharmaceutically acceptable excipient.

12. A method of treating a cell proliferation disorder in a subject in need thereof, comprising administering a therapeutically effective amount of the compound of claim 5,
wherein the cell proliferation disorder is basal cell carcinoma or medulloblastoma, and
wherein the treating reduces the severity of the cell proliferation disorder, slows the progression of the cell proliferation disorder, or a combination thereof.

13. The method of claim 12, wherein the cell proliferation disorder is resistant to Vismodegib.

14. A method of treating a cell proliferation disorder in a subject in need thereof, comprising administering a therapeutically effective amount of the pharmaceutical composition of claim 11,
wherein the cell proliferation disorder is basal cell carcinoma or medulloblastoma, and
wherein the treating reduces the severity of the cell proliferation disorder, slows the progression of the cell proliferation disorder, or a combination thereof.

15. The method of claim 14, wherein the cell proliferation disorder is resistant to Vismodegib.

* * * * *